(12) United States Patent
Daniels et al.

(10) Patent No.: US 11,651,561 B2
(45) Date of Patent: May 16, 2023

(54) REAL-TIME SHARED AUGMENTED REALITY EXPERIENCE

(71) Applicant: YouAR INC., Portland, OR (US)

(72) Inventors: Oliver Clayton Daniels, Portland, OR (US); Raymond Victor Di Carlo, Portland, OR (US); David Morris Daniels, Portland, OR (US)

(73) Assignee: YouAR INC., Portland, OR (US)

( * ) Notice: Subject to any disclaimer, the term of this patent is extended or adjusted under 35 U.S.C. 154(b) by 4 days.

(21) Appl. No.: 17/121,397

(22) Filed: Dec. 14, 2020

(65) Prior Publication Data

US 2021/0241532 A1    Aug. 5, 2021

Related U.S. Application Data

(63) Continuation of application No. 15/592,073, filed on May 10, 2017, now abandoned, which is a continuation-in-part of application No. PCT/US2015/060215, filed on Nov. 11, 2015, which is a continuation-in-part of application No. 14/538,641, filed on Nov. 11, 2014, now abandoned.

(60) Provisional application No. 62/371,750, filed on Aug. 6, 2016.

(51) Int. Cl.
| | |
|---|---|
| *G06T 19/00* | (2011.01) |
| *G06F 3/14* | (2006.01) |
| *G06T 19/20* | (2011.01) |
| *G06F 3/147* | (2006.01) |

(52) U.S. Cl.
CPC ............ *G06T 19/006* (2013.01); *G06F 3/147* (2013.01); *G06F 3/1454* (2013.01); *G06T 19/20* (2013.01); *G06T 2219/024* (2013.01); *G09G 2370/022* (2013.01); *G09G 2370/04* (2013.01)

(58) Field of Classification Search
CPC . G06T 19/006; G06T 19/20; G06T 2219/024; G06F 3/147; G06F 3/1454; G09G 2370/022; G09G 2370/04
See application file for complete search history.

(56) References Cited

U.S. PATENT DOCUMENTS

| | | | | |
|---|---|---|---|---|
| 2004/0189675 | A1* | 9/2004 | Pretlove | G05B 19/427 345/633 |
| 2012/0142415 | A1* | 6/2012 | Lindsay | H04N 5/2224 463/33 |
| 2012/0249586 | A1* | 10/2012 | Wither | H04N 1/00323 345/633 |

(Continued)

*Primary Examiner* — Matthew Salvucci
(74) *Attorney, Agent, or Firm* — Kolitch Romano Dascenzo Gates LLC

(57) ABSTRACT

A method and system are provided for enabling a shared augmented reality experience. The system may include one or more onsite devices for generating AR representations of a real-world location, and one or more offsite devices for generating virtual AR representations of the real-world location. The AR representations may include data and/or content incorporated into live views of a real-world location. The virtual AR representations of the AR scene may incorporate images and data from a real-world location and include additional AR content. The onsite devices may synchronize content used to create the AR experience with the offsite devices in real time, such that the onsite AR representations and the offsite virtual AR representations are consistent with each other.

20 Claims, 40 Drawing Sheets

(56) References Cited

U.S. PATENT DOCUMENTS

| | | | | |
|---|---|---|---|---|
| 2012/0320039 A1* | 12/2012 | Ha | ........................ | G06T 19/006 |
| | | | | 345/419 |
| 2013/0178257 A1* | 7/2013 | Langseth | .............. | A63F 13/812 |
| | | | | 463/4 |
| 2013/0311868 A1* | 11/2013 | Monney | .................. | G06F 16/70 |
| | | | | 715/230 |

* cited by examiner

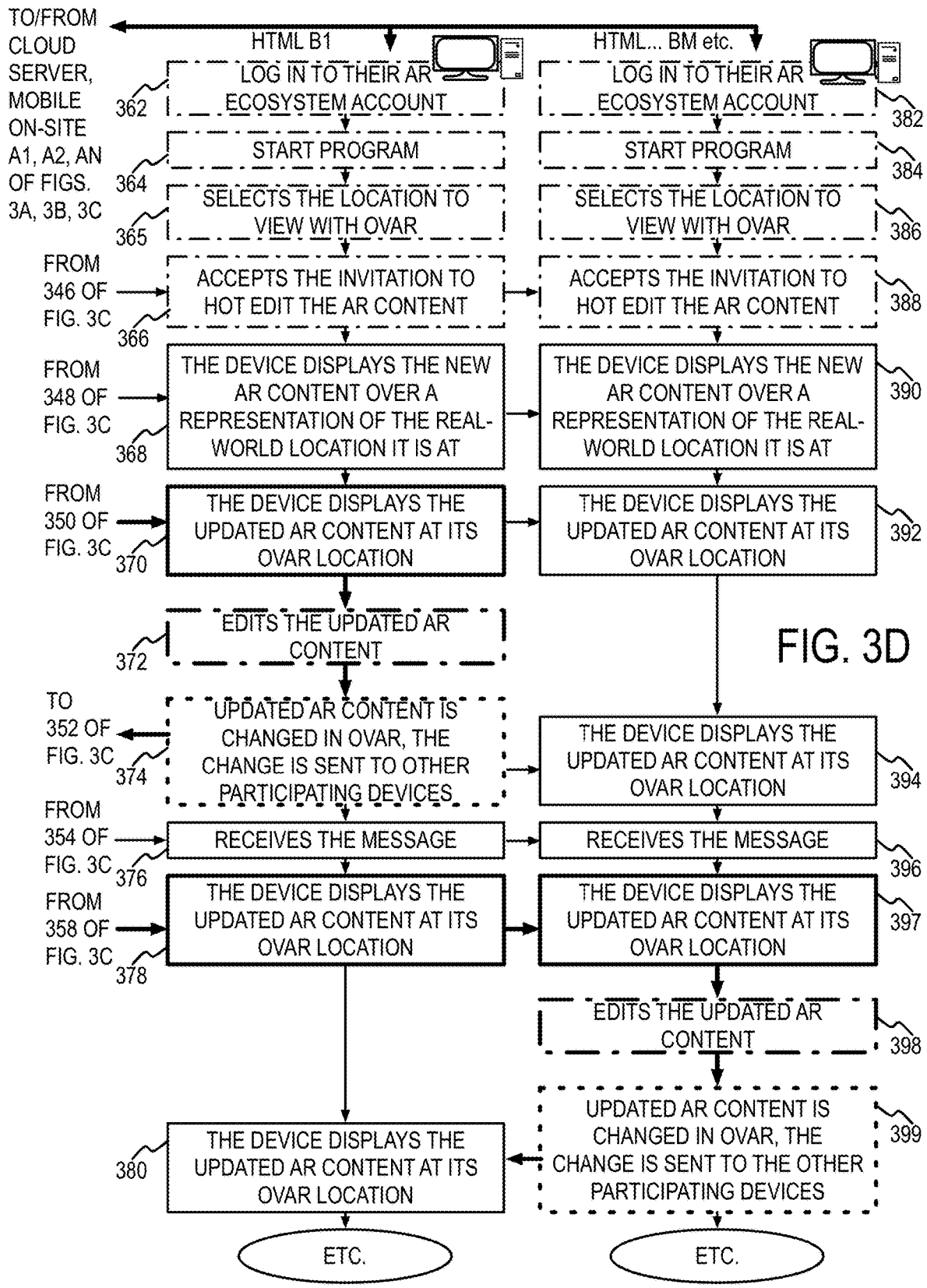

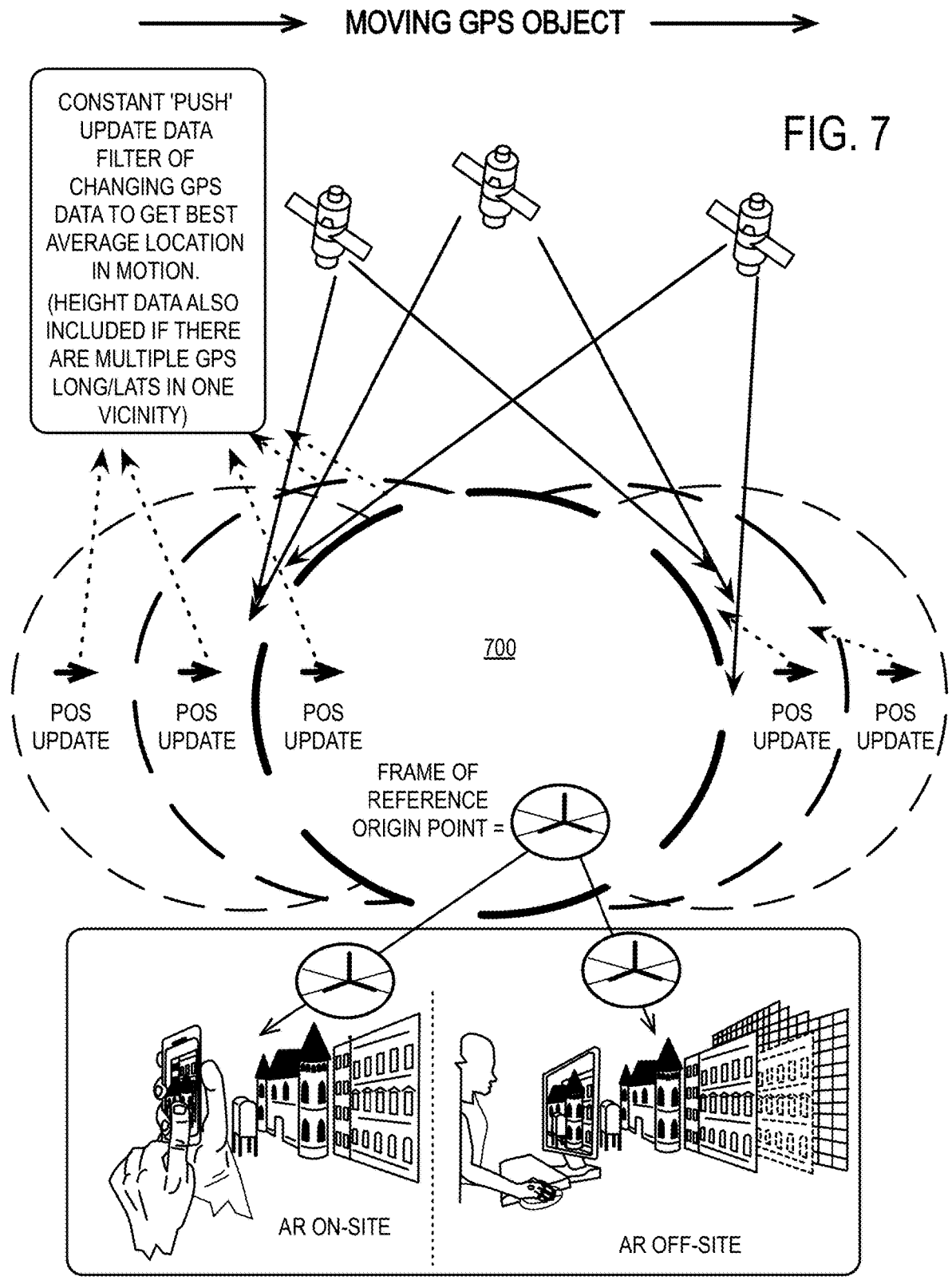

FIG. 31C

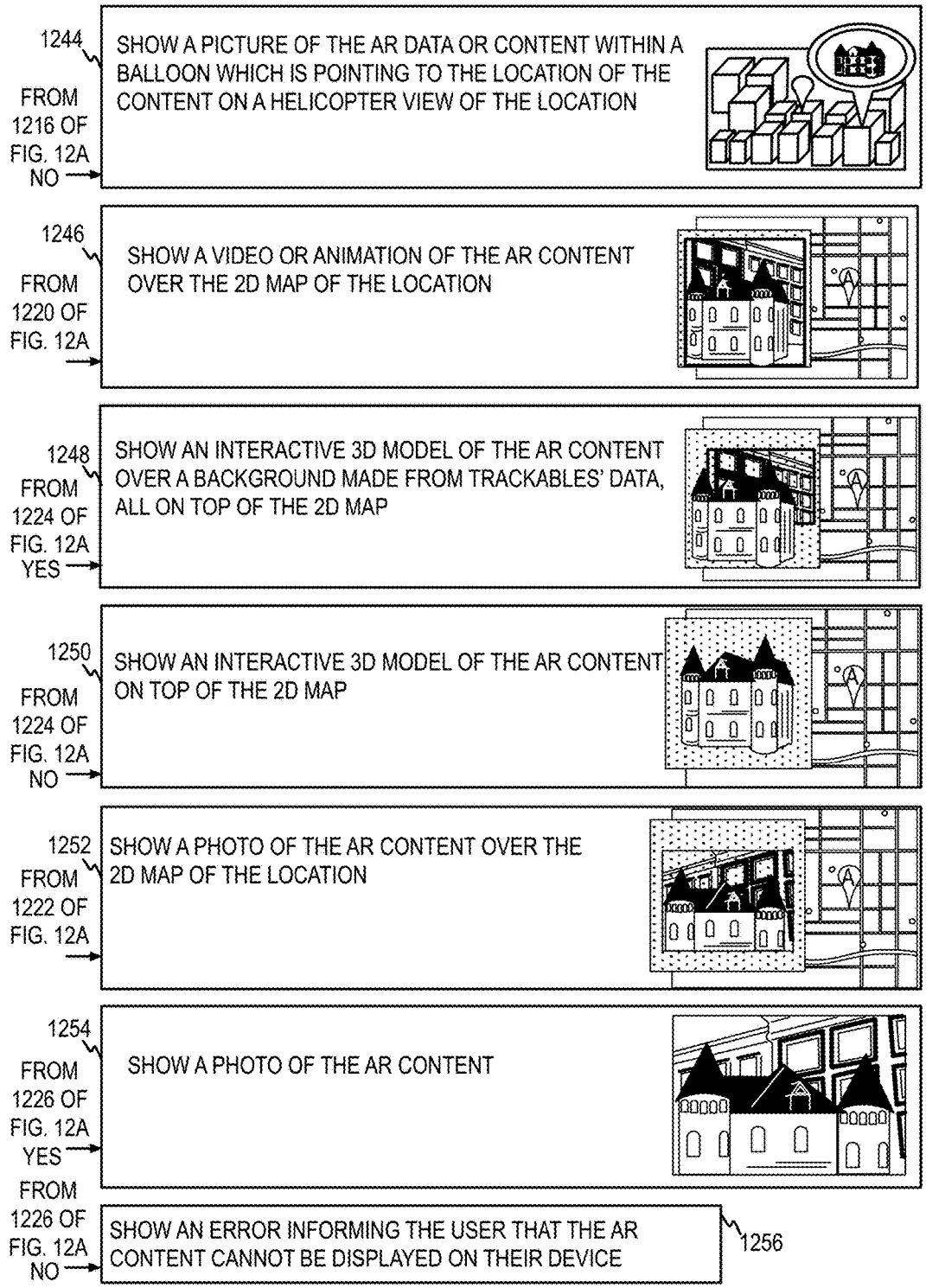

1244 FROM 1216 OF FIG. 12A NO → SHOW A PICTURE OF THE AR DATA OR CONTENT WITHIN A BALLOON WHICH IS POINTING TO THE LOCATION OF THE CONTENT ON A HELICOPTER VIEW OF THE LOCATION

1246 FROM 1220 OF FIG. 12A → SHOW A VIDEO OR ANIMATION OF THE AR CONTENT OVER THE 2D MAP OF THE LOCATION

1248 FROM 1224 OF FIG. 12A YES → SHOW AN INTERACTIVE 3D MODEL OF THE AR CONTENT OVER A BACKGROUND MADE FROM TRACKABLES' DATA, ALL ON TOP OF THE 2D MAP

1250 FROM 1224 OF FIG. 12A NO → SHOW AN INTERACTIVE 3D MODEL OF THE AR CONTENT ON TOP OF THE 2D MAP

1252 FROM 1222 OF FIG. 12A → SHOW A PHOTO OF THE AR CONTENT OVER THE 2D MAP OF THE LOCATION

1254 FROM 1226 OF FIG. 12A YES → SHOW A PHOTO OF THE AR CONTENT

FROM 1226 OF FIG. 12A NO → SHOW AN ERROR INFORMING THE USER THAT THE AR CONTENT CANNOT BE DISPLAYED ON THEIR DEVICE 1256

FIG. 34
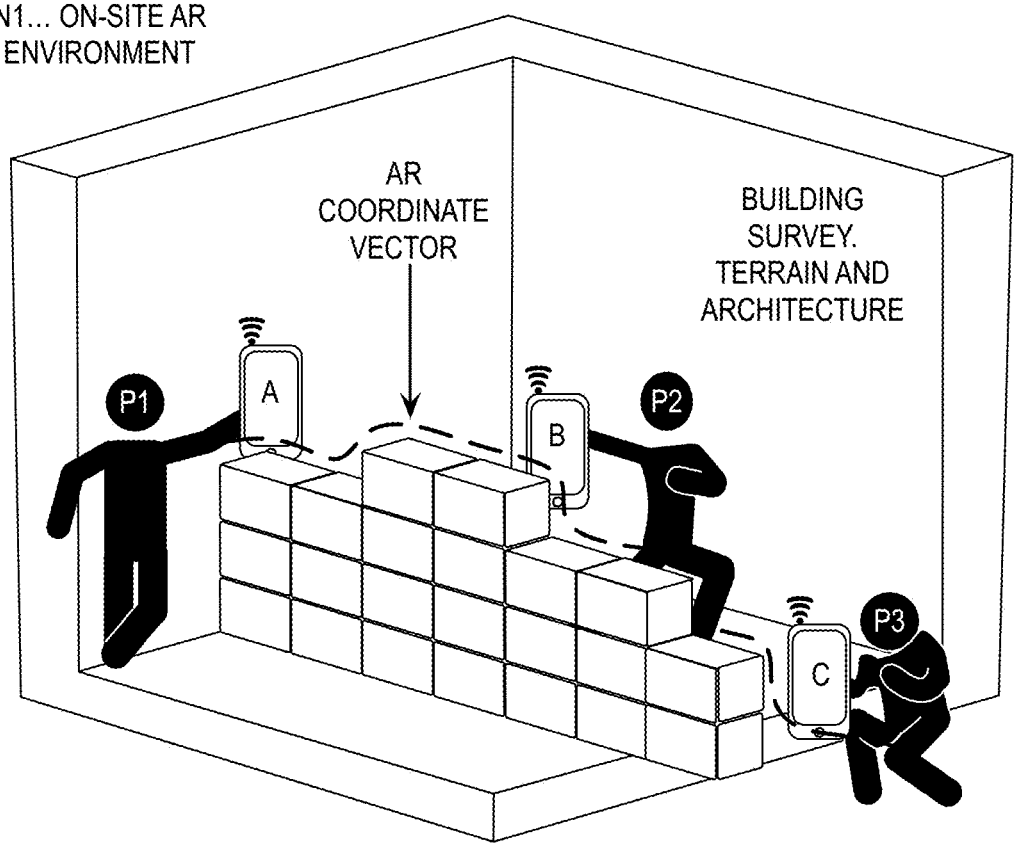
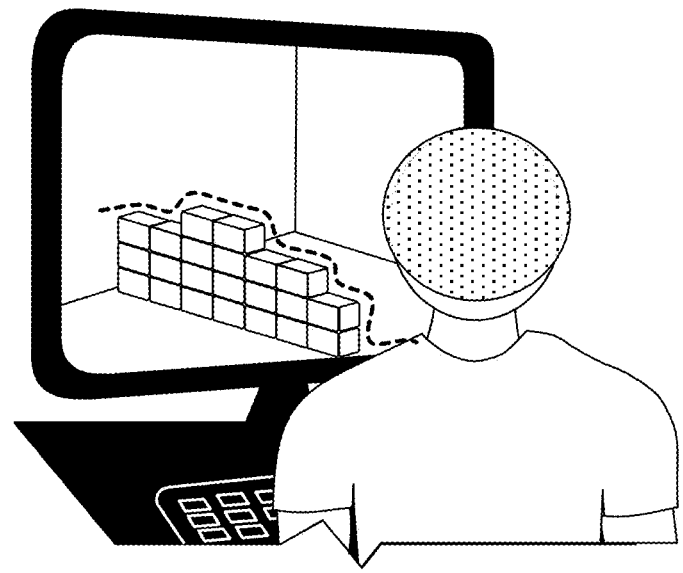

REAL-TIME SHARED AUGMENTED REALITY EXPERIENCE

CROSS REFERENCES

The following applications and materials are incorporated herein, in their entireties, for all purposes: PCT Patent Application Serial No. PCT/US2015/060215, filed Nov. 11, 2015; U.S. patent application Ser. No. 14/538,641, filed Nov. 11, 2014; and U.S. Provisional Patent Application Nos. 62/371,750, filed Aug. 6, 2016, and 62/078,287, filed on Nov. 11, 2014. However, such material is only incorporated to the extent that no conflict exists between the incorporated material and the statements and drawings set forth herein. In the event of any such conflict, including any conflict in terminology, the present disclosure is controlling.

FIELD

The subject matter of the present disclosure relates to positioning, locating, interacting, and/or sharing augmented reality (AR) content and other location-based information between users through the use of digital devices. More particularly, the subject matter of the present disclosure concerns a framework for onsite devices and offsite devices to interact in a shared AR scene.

INTRODUCTION

Augmented Reality, (AR) is a live view of a real-world environment that includes supplemental computer generated elements (e.g., sound, video, graphics, text) with positioning data (e.g., global positioning system (GPS) data). For example, a user can use a mobile device or digital camera to view a live image of a real-world location, and the mobile device or digital camera can then be used to create an augmented reality experience by displaying computer-generated elements over the live image of the real world. The device presents the augmented reality to a viewer as if the computer-generated content was a part of the real world.

A fiducial marker (e.g., an image with clearly defined edges, a quick response (QR) code, etc.), can be placed in a field of view of the capturing device. This fiducial marker serves as a reference point. Additionally, using the fiducial marker, the scale for rendering computer-generated content can be determined by comparison calculations between the real-world scale of the fiducial marker and its apparent size in the visual feed.

An augmented reality application can overlay any computer-generated information on top of the live view of the real-world environment. This augmented reality scene can be displayed on many types of devices, including computers, phones, tablets, pads, headsets, head-up displays (HUDs), glasses, visors, and/or helmets. For example, the augmented reality of a proximity-based application can include floating store or restaurant reviews on top of a live street view captured by a mobile device running the augmented reality application.

However, traditional augmented reality technologies generally present a first person view of the AR experience to a person who is near the actual real-world location. Traditional augmented reality always takes place "onsite" in a specific location, or when viewing specific objects or images, with computer-generated artwork or animation placed over the corresponding real-world live image using a variety of methods. Using the above methods, this means only those who are actually viewing the AR content in a real environment can fully understand and enjoy the experience. The requirement of proximity to a real-world location or object significantly limits the number of people who can appreciate and experience an onsite augmented reality event at any given time.

SUMMARY

The present disclosure provides systems, apparatuses, and methods relating to augmented reality (AR) sharing systems. In some embodiments, a computer-implemented method for providing a shared augmented reality (AR) experience may include: communicating, from a server to an onsite device in proximity to a real-world location, a data bundle comprising a first data set consisting of an available AR content item, a second data set consisting of initial trackable data, and a third data set consisting of initial position and geometry data relating to one or more physical features of the real-world location, based on a location coordinate of the onsite device, wherein the initial trackable data comprises information relating to one or more trackable features that are disposed at the real-world location and findable by the onsite device; capturing imaging information of the real-world location using an imaging sensor of the onsite device; visualizing, using the onsite device, an onsite AR representation of the real-world location by presenting the available AR content item incorporated into a live view of the real-world location; updating at least one data set of the data bundle to generate an updated data bundle, using the onsite device; communicating the updated data bundle from the onsite device to a remote offsite device via the server; and visualizing, at the offsite device and using the updated data bundle, a virtual reality (VR) representation of the real-world location by creating virtual copies of the one or more physical features of the real-world location and incorporating the AR content item into the VR representation to generate an offsite virtual AR representation.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIGS. 3A, 3B, 3C, and 3D depict a flow diagram showing a mechanism for exchanging and synchronizing augmented reality information among multiple devices in an ecosystem, according to an embodiment of the invention.

FIGS. 7 and 8 are illustrative diagrams showing how a mobile position orientation point (MPOP) allows for the creation and viewing of augmented reality that has a moving location, according to embodiments of the invention.

FIGS. 31A, 31B, and 31C depict a flow diagram showing a process of deciding the level of geometry simulation for an offsite virtual augmented reality (ovAR) scene, according to an embodiment of the invention.

FIGS. 33 and 34 are illustrative diagrams showing an illustrative AR Vector being viewed both onsite and offsite, simultaneously.

DETAILED DESCRIPTION

Figure 1:
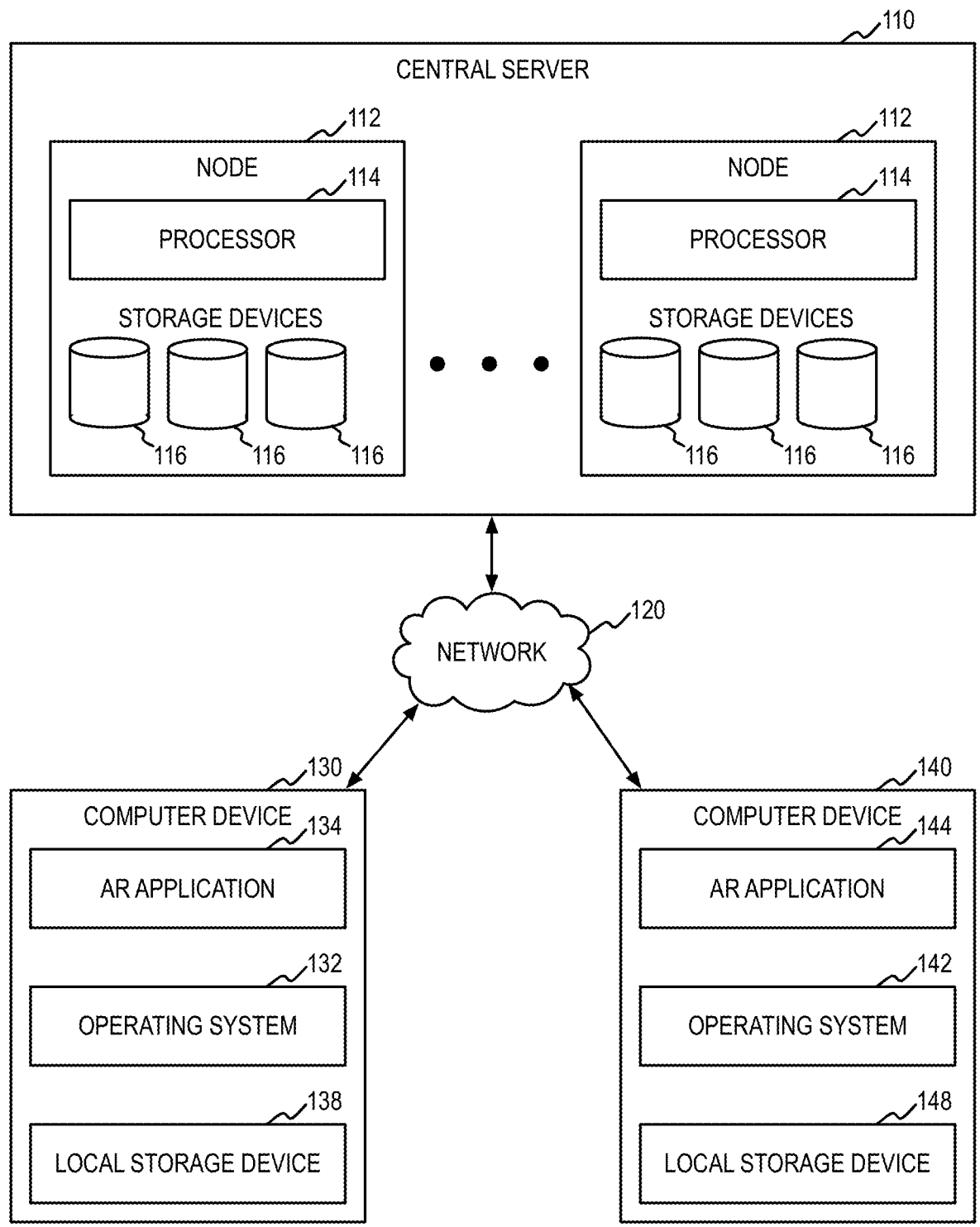
FIG. 1 is a block diagram of the components and interconnections of an augmented reality (AR) sharing system, according to an embodiment of the invention.

Various aspects and examples of an augmented reality sharing system, as well as related methods, are described below and illustrated in the associated drawings. Unless otherwise specified, an augmented reality sharing system according to the present teachings, and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Overview

Traditional augmented reality (AR) is first person and single-player: a single user views and interacts with the AR content, e.g., through a phone or head-mounted display (HMD). The AR content is usually placed in reference to (e.g., on top of) a marker (e.g., a QR code, etc.), ground plane, or temporary point cloud. In some examples, the AR content may be positioned using GPS and/or a compass heading. This type of AR results in a presentation where only a specific person, at a specific physical location, can observe any given AR content item. This is extremely limiting. With the offsite virtual augmented reality (ovAR) described herein, a user has the ability to observe and interact with AR content that is located anywhere in the world, from anywhere in the world, together with any other user or users.

A mentioned above, augmented reality (AR) refers to a live view of a real-world environment that is augmented with computer-generated content, such as visual content presented by a graphical display device, audio content presented via an audio speaker, and/or haptic feedback generated by a haptic device. Mobile devices, by nature of their mobility, enable their users to experience AR at a variety of different locations. These mobile devices typically include a variety of on-board sensors and associated data processing systems that enable the mobile device to obtain measurements of the surrounding real-world environment, or of a state of the mobile device within the environment.

Some examples of these sensors include a GPS receiver for determining a geographic location of the mobile device, other RF receivers for measuring wireless RF signal strength and/or orientation relative to a transmitting source, a camera or optical sensor for imaging the surrounding environment, accelerometers and/or gyroscopes for measuring orientation and acceleration of the mobile device, a magnetometer/ compass for measuring orientation relative to Earth's magnetic field, and an audio speaker/microphone for measuring sounds generating by audio sources within the environment.

Within the context of AR, the mobile device uses sensor measurements to determine a positioning of the mobile device (e.g., a position and an orientation of the mobile device) within the real-world environment. For example, positioning may be determined relative to a trackable feature (also referred to as a Trackable) to which AR content is tethered. The determined positioning of the mobile device may be used to align a coordinate system within a live view of the real-world environment. The AR content item has a defined positioning relative to the coordinate system. Accordingly, the AR content may be presented within this live view at the defined positioning relative to the aligned coordinate system to provide an appearance of the AR content being integrated with the real-world environment. The live view with incorporated AR content may be referred to as an AR representation.

Because AR involves augmentation of a live view with computer-generated content, devices that are remotely located from the physical location within the live view have previously been unable to take part in the AR experience. However, using systems and methods according to the present teachings, an AR experience may be shared between onsite devices/users and remotely located offsite devices/users. In an example implementation, offsite devices present a virtual reality (VR) representation of a real-world environment that incorporates AR content as VR objects within the VR representation. Positioning of the AR content within the offsite VR representation is caused to be consistent with positioning of that AR content within the onsite AR representation, thereby providing a shared AR experience.

A system is described herein for one or more people (also referred to as a user or users) to view, change, and interact with one or more shared location-based events, including simultaneously. Some of these people can be onsite and view the AR content placed in the location using the augmented live view of their mobile devices, such as mobile phones or optical head-mounted displays. Other people can be offsite and view the AR content placed in a virtual simulation of reality, (i.e., offsite virtual augmented reality, or ovAR), via a computer, or other digital devices such as televisions, laptops, desktops, tablet computers, VR glasses/goggles, and/or the like.

The disclosed system provides location-based scenes containing images, artwork, games, programs, animations, scans, data, videos, and/or the like that are created or provided by multiple digital devices, and combines them with live views and virtual views of locations' environments, separately or in parallel. For onsite users, the augmented reality includes the live view of the real-world environment captured by their devices. Offsite users, who are not at or near the physical location (or who choose to view the location virtually instead of physically), can still experience the AR event by viewing the scene, within a virtual (e.g., VR) simulated recreation of the environment or location. All participating users may be permitted to interact with, change, and revise the shared AR event. For example, an offsite user can add images, artwork, games, programs, animations, scans, data, and/or videos to the common environment, which will then be propagated to all onsite and offsite users so that the additions can be experienced (and possibly altered once again). In this way, users from different physical locations can contribute to and participate in a shared social and/or community AR event that is set in any location.

Based on known geometry, images, and position data, the system can create an offsite virtual augmented reality (ovAR) environment for the offsite users. Through the ovAR environment, the offsite users can actively share AR content, games, art, images, animations, programs, events, object creation, and/or AR experiences with other offsite or onsite users who are participating in the same AR event.

The ovAR environment, which again is offsite (i.e., remote with respect to the real-world location), possesses a close resemblance to the topography, terrain, AR content, and overall environment of the augmented reality events that the onsite users experience. The offsite digital device creates the ovAR experience based on information related to the onsite location, such as accurate or near-accurate geometry scans, textures, and/or images, as well as known WGS/GPS locations of terrain features, objects, and buildings present at the real-world location.

An onsite user of the system can participate, change, play, enhance, edit, communicate, and/or interact with an offsite user. Users all over the world can participate together by playing, editing, sharing, learning, creating AR content, and collaborating as part of AR events, e.g., in AR games and programs.

The term "Trackable" may refer to a feature (e.g., a physical feature or object in a real-world environment), or set of such features, that can be tracked with AR technology. A Trackable may have been recognized and had the data recorded or stored which would enable a mobile device to identify the feature and calculate its position relative to the mobile device, in some cases along with an estimated global coordinate position, (such as World Geodetic System (WGS) coordinates). The Trackable may provide relative position and pose information to a mobile computing device.

The nature, objectives, and advantages of the invention will become more apparent to those skilled in the art after considering the following detailed description in connection with the accompanying drawings.

EXAMPLES, COMPONENTS, AND ALTERNATIVES

The following sections describe selected aspects of exemplary AR systems including a real-time, shared onsite/offsite AR experience, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

I. Environment of an Augmented Reality Sharing System

FIG. 1 is a block diagram of the components and interconnections of an augmented reality sharing system, according to an embodiment of the invention. The central server 110 is responsible for storing and transferring the information for creating the augmented reality. The central server 110 is configured to communicate with multiple computer devices. In one embodiment, the central server 110 can be a server cluster having computer nodes interconnected with each other by a network. The central server 110 can contain nodes 112. Each of the nodes 112 contains one or more processors 114 and storage devices 116. The storage devices 116 can include optical disk storage, RAM, ROM, EEPROM, flash memory, phase change memory, magnetic cassettes, magnetic tapes, magnetic disk storage or any other computer storage medium which can be used to store the desired information.

The computer devices 130 and 140 can each communicate with the central server 110 via network 120. The network 120 can be, e.g., the Internet. For example, an onsite user in proximity to a particular physical location can carry the computer device 130; while an offsite user who is not proximate to the location can carry the computer device 140. Although FIG. 1 illustrates two computer devices 130 and 140, a person having ordinary skill in the art will readily understand that the technology disclosed herein can be applied to a single computer device or more than two computer devices connected to the central server 110. For example, there can be multiple onsite users and multiple offsite users who participate in one or more AR events by using one or more computing devices.

The computer device 130, 140 includes an operating system 132, 142 to manage the hardware resources of the computer device 130 and provides services for running an AR application 134, 144. AR application 134, 144 may include any suitable computer application configured to display (or otherwise present) AR content overlaid on (or incorporated into) a real-time view of a real-world environment. AR application 134, 144 (e.g., AR applications described herein), may be stored in the computer device 130, 140, and may require operating system 132, 142 to properly run on the device. Computer device 130, 140 includes at least one local storage device 138, 148 to store the computer applications and user data. Computer device 130 or 140 can be a desktop computer, a laptop computer, a tablet computer, an automobile computer, a game console, a smart phone, a personal digital assistant, smart TV, set top box, DVR, Blu-Ray, residential gateway, over-the-top Internet video streamer, or other computer devices capable of running computer applications, as contemplated by a person having ordinary skill in the art.

II. Augmented Reality Sharing Ecosystem Including Onsite and Offsite Devices

Figure 2A:
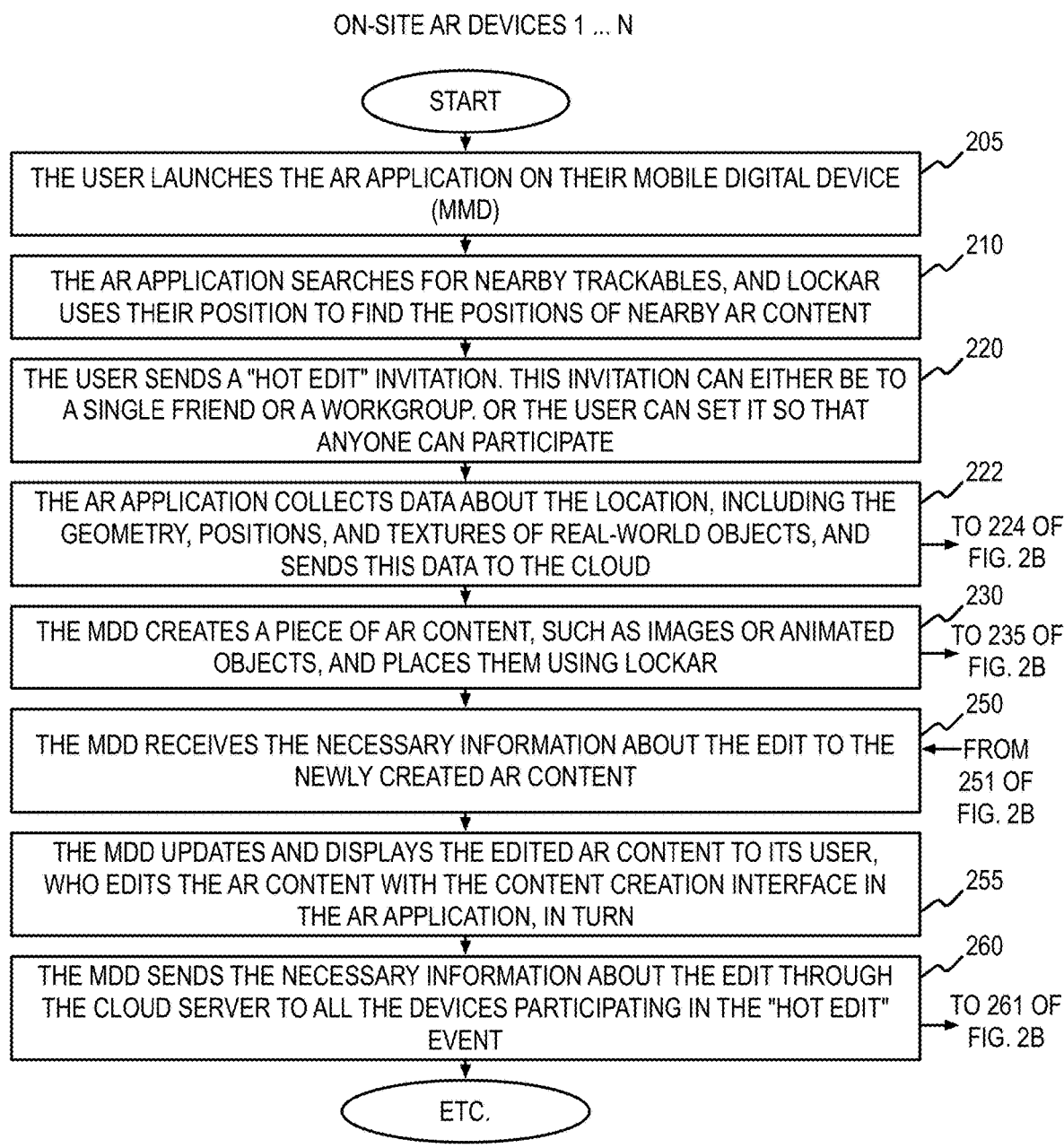
FIGS. 2A and 2B depict a flow diagram showing an example mechanism for exchanging AR information, according to an embodiment of the invention.
Figure 2B:
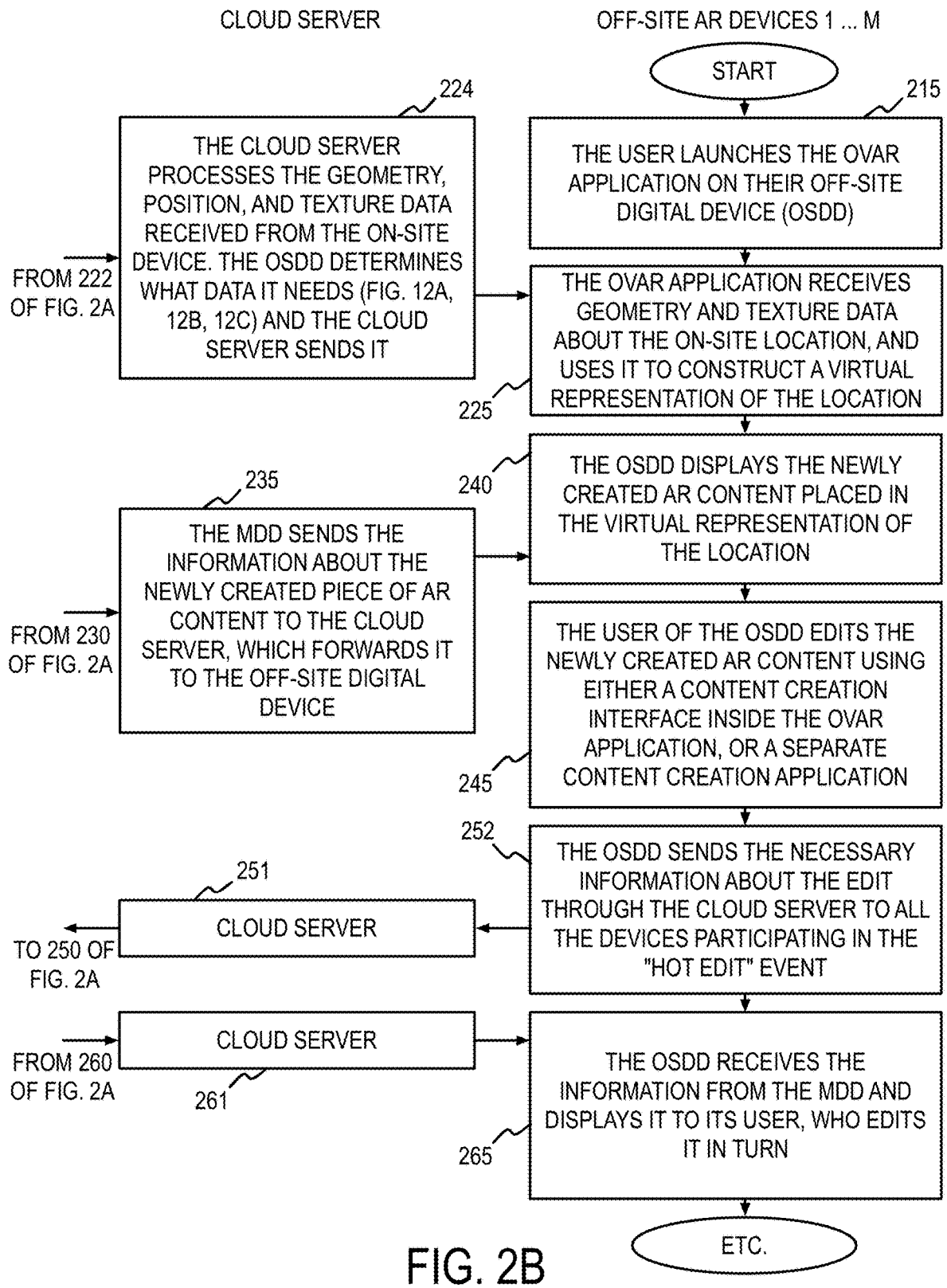
Figure 3A:
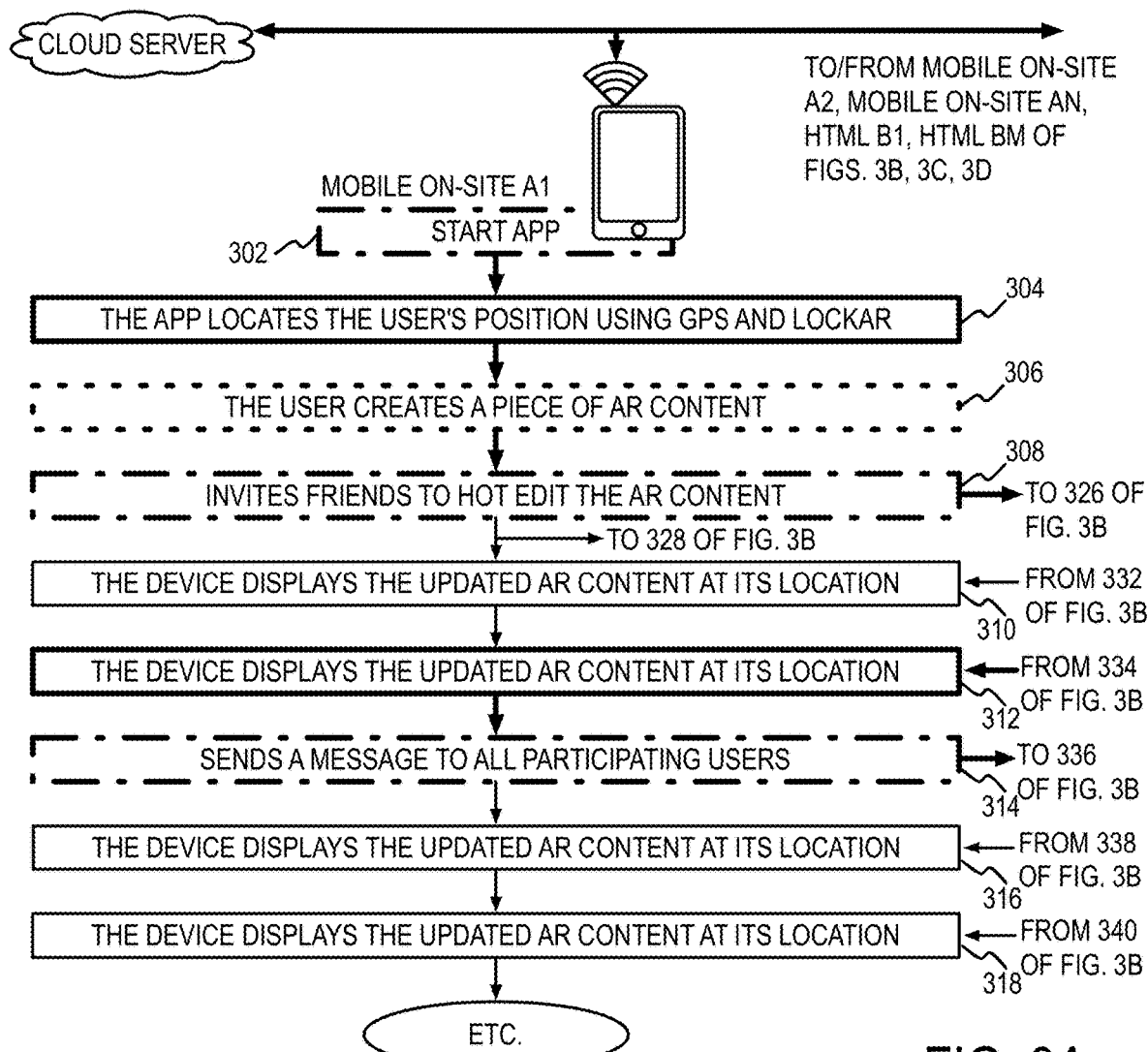
Figure 3B:
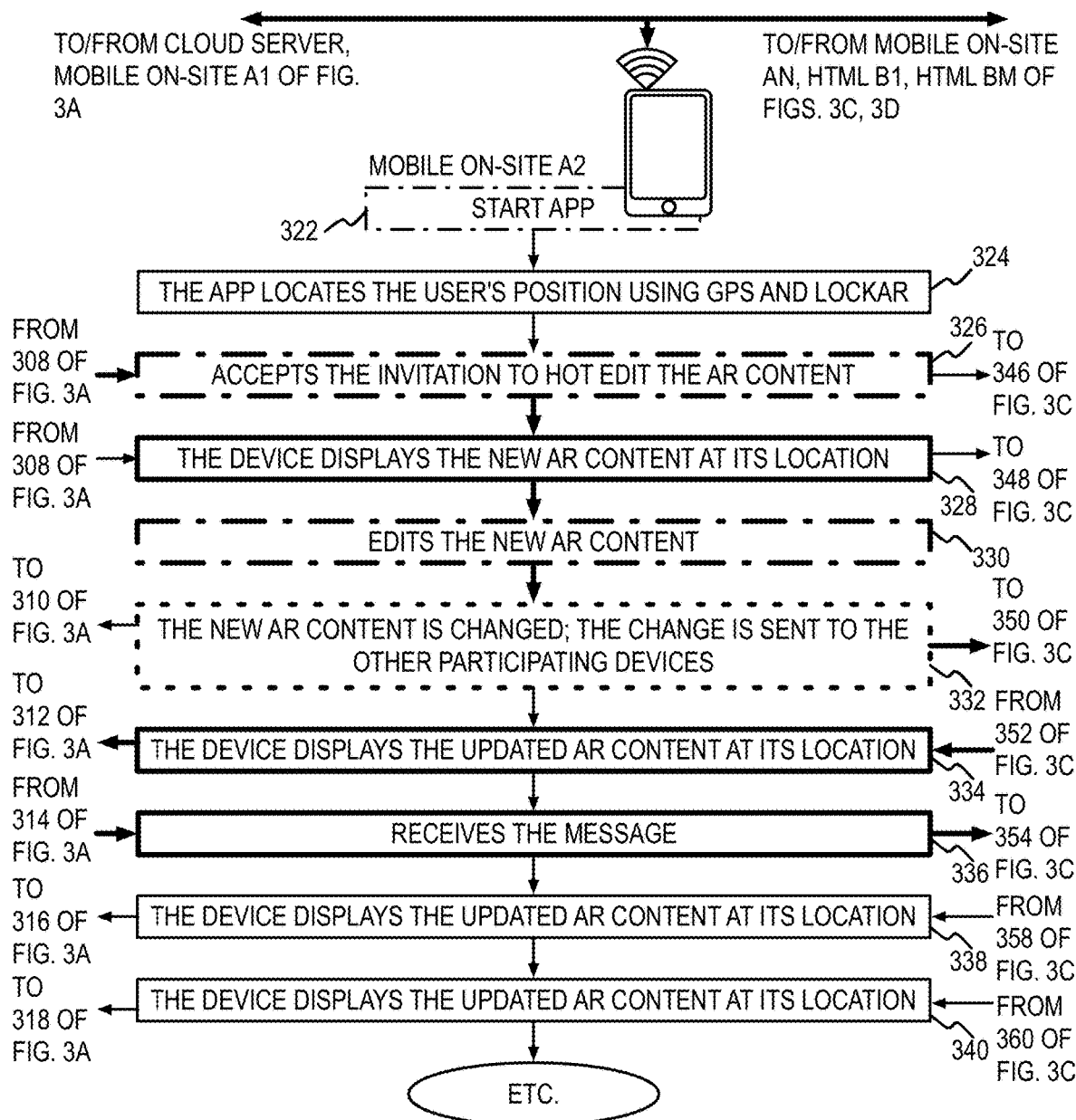
Figure 3C:
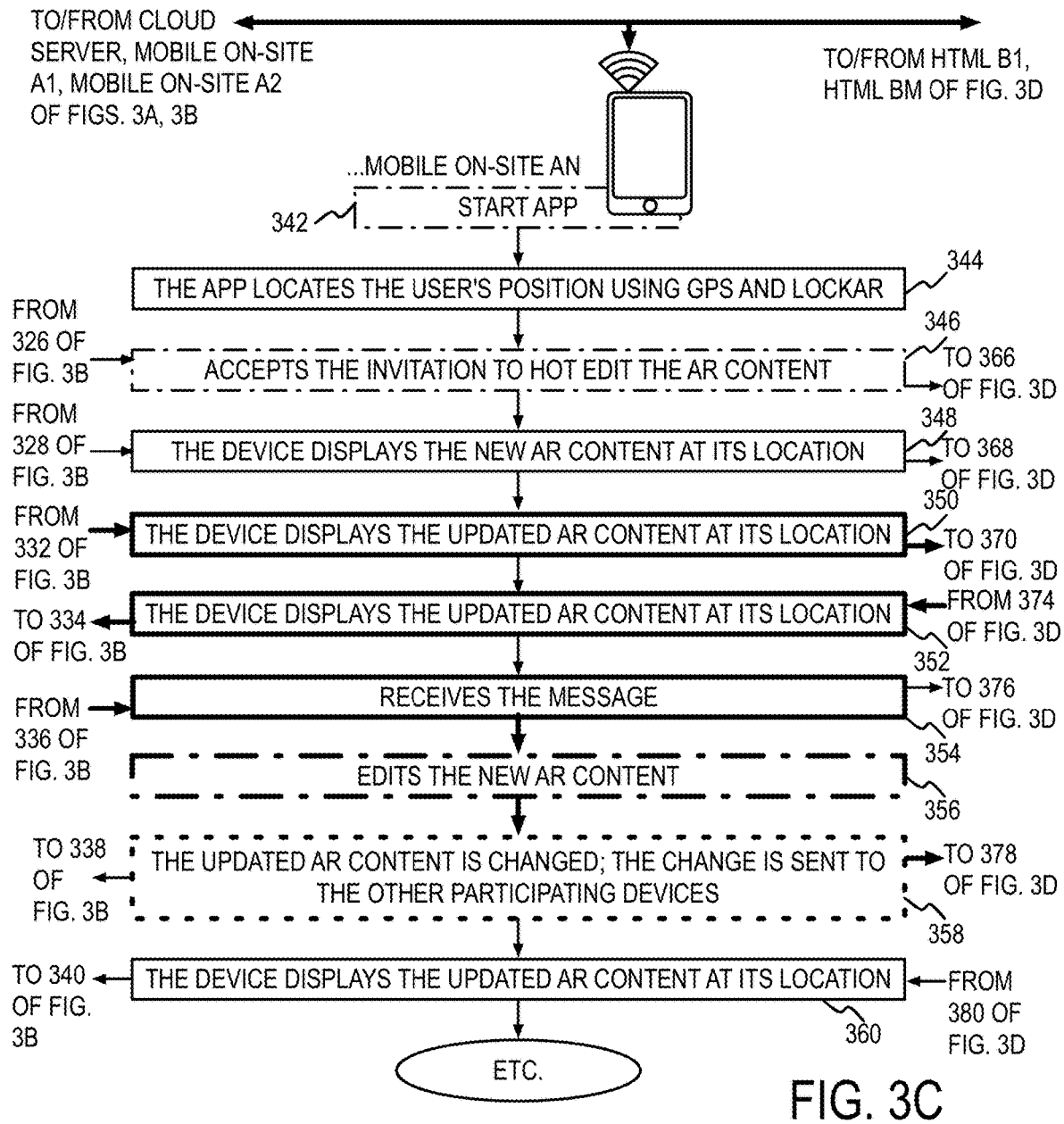

The computing devices of onsite and offsite AR users can exchange information through a central server so that the onsite and offsite AR users experience the same AR event at approximately the same time. FIGS. 2A-2B depict a flow diagram showing an example mechanism for the purpose of facilitating multiple users to simultaneously edit AR content and objects (also referred to as hot-editing), according to an embodiment of the invention. In the embodiment illustrated in FIGS. 2A-2B, one or more onsite users (represented by "User 1") use respective mobile digital devices (MDDs); while one or more offsite users (represented by "User 2") use respective offsite digital devices (OSDDs). Each MDD and OSDD can be various computing devices as disclosed in previous paragraphs.

At block 205, the mobile digital device (MDD) executes an AR application that links to a larger AR ecosystem, allowing the user to experience shared AR events with any other user connected to the ecosystem. In some embodiments, an onsite user can use an onsite computer (e.g., a non-mobile onsite personal computer) instead of an MDD. At block 210, the MDD acquires real-world positioning data using techniques including, but not limited to: GPS, visual imaging, geometric calculations, gyroscopic or motion tracking, point clouds, and other data about a physical location, and prepares an onsite canvas for creating the AR event. Selected methods of fusing these techniques are collectively referred to herein as "LockAR." See detailed LockAR description, below.

Each piece of LockAR positioning data (referred to as a Trackable) is tied to a coordinate position (e.g., World Geodetic System (WGS) coordinates) and has associated metadata, such as estimated error and weighted measured distances to other features. The LockAR data set may include Trackables such as textured markers, fiducial markers, geometry scans of terrain and objects, simultaneous localization and mapping (SLAM) maps, electromagnetic maps, localized compass data, landmark recognition, and triangulation data, as well as the positions of these Trackables relative to other LockAR Trackables. The user carrying the MDD is onsite, i.e., in proximity to the physical location.

At block 215 (see FIG. 2B), the OSDD of offsite User 2 executes another application that links to the same AR ecosystem as the onsite user. The application may be a web app running within the browser. It may also be, but is not limited to, a native, Java, or Flash application. In some alternative embodiments, the offsite user can use a mobile computing device instead of an OSDD. In other words, the OSDD may be mobile or non-mobile.

At block 220, the MDD of User 1 sends editing invitations to the AR applications of one or more offsite users (e.g., friends) running on their OSDDs via the cloud server (or a central server). The offsite users can be invited singularly or en masse, e.g., by inviting an entire workgroup or friend list.

At block 222, the MDD of User 1 sends site-specific data (e.g., onsite environmental information and the associated coordinates) to the server, which then propagates it to the OSDD of User 2 and/or any other invited offsite users. At 224, the cloud server processes the site-specific data (e.g., geometry, position, and/or texture data) from the onsite MDD. This processing may include any suitable manipulation or handling of the site-specific date, such as refinement (e.g., via bundle adjustment), textured geometry construction (e.g., via photogrammetry techniques), virtual representation abstraction (e.g., rendering, image compression, etc.), and/or the like. The OSDD determines what data the OSDD needs, e.g., to generate a selected level of VR abstraction in the ovAR scene (e.g., using the process described with respect to FIGS. 31A, 31B, and 31C), and the cloud server sends the data to the OSDD.

At block 225, the OSDD creates a simulated, virtual background or environment based on the site-specific data and coordinates it received. Within this offsite virtual AR scene, the user sees a world that is fabricated by the computer based on the onsite data. The ovAR scene is different from the augmented reality scene, but can closely resemble it. The ovAR is a virtual representation of the location that includes one or more (e.g., many) of the same AR objects as the onsite augmented reality experience; for example, the offsite user may see virtual copies of the same fiducial markers as the onsite user as part of the ovAR, as well as the AR objects tethered to those markers.

At block 230, the MDD creates AR data or content, tethered to a specific location in the augmented reality world, based on user instructions it received (e.g., from User 1) through the user interface of the AR application. The specific location of the AR data or content is identified with respect to environmental information within the LockAR data set. At block 235, the MDD sends the information about the newly created piece of AR content to the cloud server, which forwards the piece of AR content to the OSDD. Also at block 235, the OSDD receives the AR content and the LockAR data specifying the location of the AR content. At block 240, the AR application of the OSDD places the received AR content within the offsite, simulated, virtual background/environment. Accordingly, User 2 sees an offsite virtual augmented reality, which is a completely VR experience substantially resembling the augmented reality (i.e., reality plus AR content) seen by User 1 onsite.

At block 245, the OSDD alters the AR content based on user instructions received (e.g., from User 2) from the user interface of the AR application running on the OSDD. The user interface may include elements enabling User 2 to specify the changes made to the data and to selected 2-D and 3-D AR content. At block 252, the OSDD sends the altered AR content to other users participating in the AR event (also referred to as a hot-edit event), such as User 1, other offsite users, etc.

After receiving the altered AR data or content from the OSDD via the cloud server or some other system at block 251, the MDD (at block 250) updates the original piece of AR data or content to the altered version and then incorporates it into the AR scene, using the LockAR location data to place it in the virtual location that corresponds to its onsite location (block 255).

At blocks 255 and 260, the MDD may further alter the AR content and send the alterations back to the other participants in the AR event (e.g., hot-edit event) via the cloud server at block 261. At block 265, User 2 again receives, visualizes, alters and sends back the AR content using the OSDD, creating a "change" event based on the interactions of the user. The process may continue, with devices participating in the AR event continuously changing the AR content and synchronizing their changes via the cloud server (or other system).

The AR event can be an experience shared by multiple onsite and offsite users through onsite AR and offsite VR (i.e., ovAR) respectively. These users can be invited en masse, as a group, individually (e.g., from among social network friends), and/or choose to join the AR event individually. When multiple onsite and offsite users participate in the AR event, multiple "change" events based on the interactions of the users can be processed simultaneously. The AR event may allow various types of user interaction, such as editing AR artwork or audio, changing AR images, doing AR functions within a game, viewing and interacting with live AR projections of offsite locations and people, choosing which layers to view in a multi-layered AR image, choosing which subset of AR channels/layers to view, and/or the like. The term "channels" refers to sets of AR content that have been created or curated by a developer, user, or administrator. An AR channel event may have any AR content, including but not limited to images, animations, live action footage, sounds, and/or haptic feedback (e.g., vibrations or forces applied to simulate a sense of touch).

Systems for sharing an augmented reality event may include multiple onsite devices and multiple offsite devices. FIGS. 3A-3D depict a flow diagram showing an illustrative mechanism for exchanging and synchronizing augmented reality information among devices in a system. This example includes N onsite mobile devices (A1 to AN), and M offsite devices (B1 to BM). Onsite mobile devices A1 to AN and offsite devices B1 to BM synchronize their AR content with each other. In this example, devices synchronize their AR content with each other via a cloud-based server system, identified as a cloud server in FIG. 3A. Within FIGS. 3A-3D, a critical path is depicted for four updates or edits to the AR content. This term "critical path" is not used to refer to a required path, but rather to depict minimum steps or processes to achieve these four updates or edits to the AR content.

As FIGS. 3A-3D illustrate, all the involved devices begin by starting an AR application and then connecting to the central system, which is a cloud server in this embodiment. For example, at blocks 302, 322, 342, 364 and 384, each of the devices start or launch (e.g., execute) an application or other program. In context of mobile onsite devices (e.g., MDDs), the application may take the form of a mobile AR application executed by each of the onsite devices. In the context of remote offsite devices (e.g., OSDDs), the application or program may take the form of a virtual reality application, such as the offsite virtual augmented reality (ovAR) application described in further detail herein. For some or all of the devices, users may be prompted by the application or program to log into their respective AR ecosystem accounts (e.g., hosted at the cloud server), such as depicted at 362 and 382 for the offsite devices. Onsite devices may also be prompted by their applications to log into their respective AR ecosystem accounts.

The onsite devices gather positional and environmental data using any suitable method, to create new LockAR data or improve existing LockAR data about the scene. This process is explained in further detail below. The environmental data may include information collected by techniques such as SLAM, structured light, photogrammetry, geometric mapping, and/or the like, or any combination of these. The offsite devices create an offsite virtual AR (ovAR) version of the location, which uses a 3-D map made from data stored in the server's databases. This data may include the relevant data generated by the onsite devices.

For example, at 304, the application running on device A1 locates the user's position using a combination of GPS and LockAR for mobile onsite device A1. Similarly, the respective applications running on other mobile onsite devices locate the respective user's position using a combination of GPS and LockAR for mobile onsite devices A2 through AN, as indicated at 324 and 344. By contrast, the offsite devices B1 through BM select the location to view using the respective application or program running on B1 through BM (e.g., the ovAR application or program), as indicated at 365 and 386.

The user of onsite device A1 may invite one or more friends to participate in the event (e.g., hot-edit event) as indicated at 308. Users of other devices accept the hot-edit event invitations as indicated at 326, 346, 366, and 388. The onsite device A1 sends AR content to the other devices via the cloud server. Onsite devices A1 to AN composite the AR content with live views of the location to create the augmented reality scene for their users. Offsite devices B1 to BM composite the AR content with the simulated ovAR scene.

Any user of an onsite or offsite device participating in the hot-edit event may be permitted to create new AR content or revise the existing AR content. For example, at 306, the user of onsite device A1 creates a piece of AR content (i.e., an AR content item), which is also displayed at other participating devices at 328, 348, 368, and 390. Continuing with this example, onsite device A2 may edit the new AR content at 330 that was previously edited by onsite device A1. The changes are distributed to all participating devices, which then update their presentations of the augmented reality and the offsite virtual augmented reality, so that all devices present variations of the same scene. For example, at 332, the new AR content is changed, and the change is sent to the other participating devices. Each of the devices display the updated AR content as indicated at 310, 334, 350, 370, and 392. Another round of changes may be initiated by users at other devices, such as offsite device B1 at 372, and these changes are sent to the other participating devices at 374. The participating devices receive the changes and display the updated AR content at 312, 334, 352, and 394. Yet another round of changes may be initiated by users at other devices, such as onsite device AN at 356, and the new changes are sent to the other participating devices at 358. The participating devices again receive the changes and display the updated AR content at 316, 338, 378, and 397. Still other rounds of changes may be initiated by users at other devices, such as offsite device BM at 398, and again the latest changes are sent to the other participating devices at 399. The participating devices receive the changes and display the updated AR content at 318, 340, 360, and 380.

Although FIGS. 3A-3D illustrate the use of a cloud server for relaying all of the AR event information, a central server, a mesh network, and/or a peer-to-peer network can serve the same functionality, as a person having ordinary skill in the field can appreciate. In a mesh network, each device on the network may be a mesh node to relay data. All these devices (e.g., nodes) cooperate in distributing data in the mesh network, without needing a central hub to gather and direct the flow of data. A peer-to-peer network is a distributed network of applications that partitions the work load of data communications among the peer device nodes.

Figure 4:
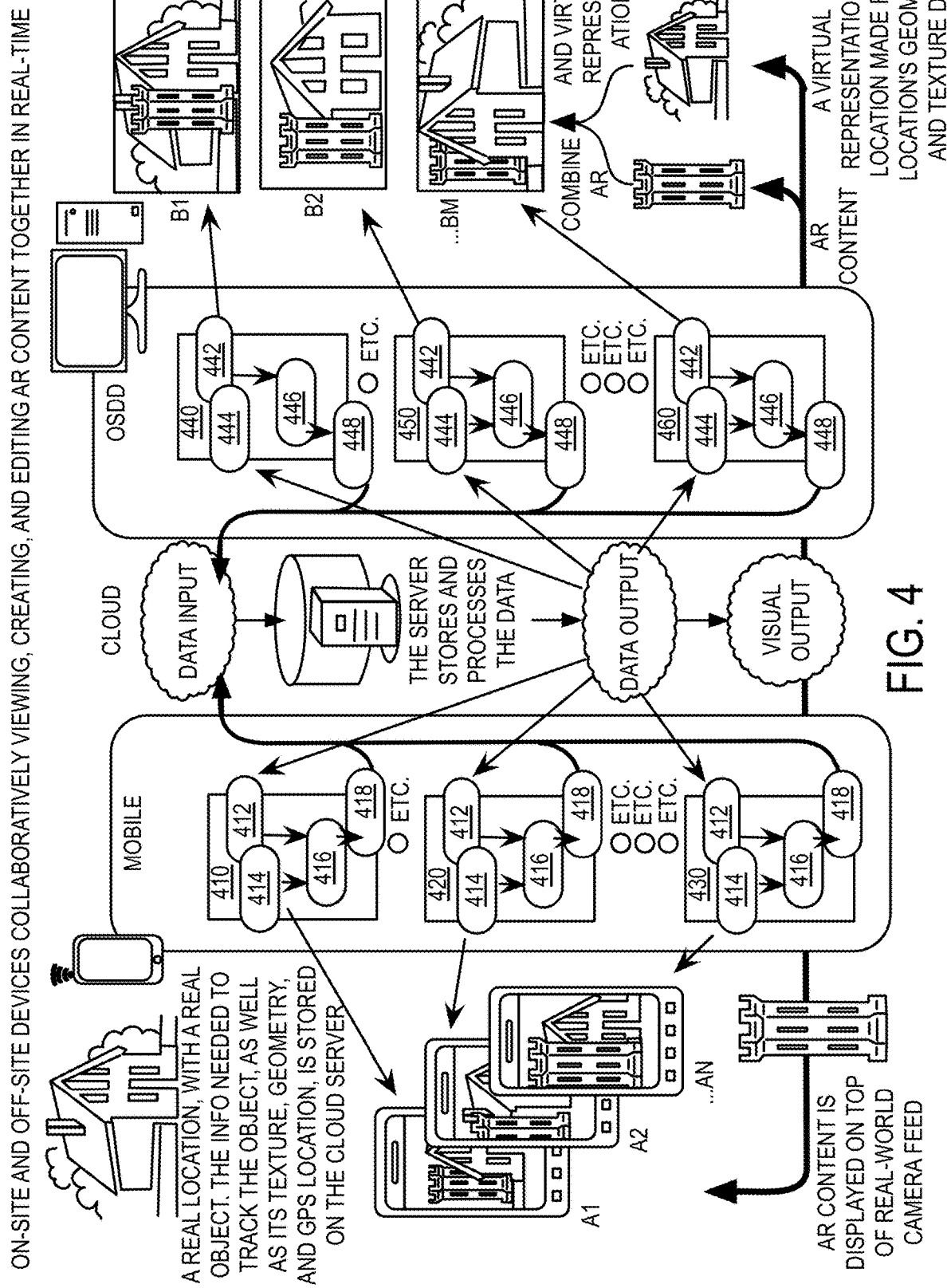
FIG. 4 is a block diagram showing onsite and offsite devices visualizing a shared augmented reality event from different points of views, according to an embodiment of the invention.

The offsite virtual augmented reality (ovAR) application may use data from multiple onsite devices to create a more accurate virtual AR scene. FIG. 4 is a block diagram showing onsite and offsite devices visualizing a shared AR event from different points of view (POVs).

Onsite devices A1 to AN create AR versions of the real-world location based on the live views of the location they capture. The point of view of the real-world location may be different for each of the onsite devices A1 to AN, as the physical locations of the onsite devices A1 to AN are different.

Offsite devices B1 to BM have an offsite virtual AR application, which places and simulates a virtual representation of the real-world scene. Because the offsite scene may be entirely virtual, POV choice is selectable by the offsite user (e.g., without a need for physical relocation). The point of view from which the offsite devices see the simulated real-world scene can be different for each of the offsite devices B1 to BM. This is because the users offsite devices B1 to BM can choose their own respective POV (e.g., the location of the virtual device or avatar) in the virtual AR scene. For example, the user of an offsite device can choose to view the scene from the POV of any other user's avatar (e.g., the POV of an onsite user). Alternatively, the user of the offsite device can choose a third-person POV with respect to another user's avatar, such that part or all of the avatar is visible on the screen of the offsite device, and any movement of the avatar moves the camera a corresponding amount. The user of the offsite device can choose any other POV they wish, e.g., based on an object in the virtual AR scene, or an arbitrary point in space.

Also in FIGS. 3A, 3B, 3C, and 3D, users of onsite and offsite devices may communicate information with each other via messages exchanged between devices (e.g., via the cloud server). For example, at 314, onsite device A1 sends a message to all participating users. The message is received at the participating devices at 336, 354, 376, and 396.

An example process flow is depicted in FIG. 4 for the mobile onsite devices (e.g., MDDs) and for the offsite digital devices (OSDDs). The system depicted in FIG. 4 is best understood in the context of FIGS. 3A-3D, as just explained. Blocks 410, 420, 430 depict process flows for respective users and their respective onsite devices A1, A2, ..., AN. For each of these process flows, input is received at 412, the visual result is viewed by the user at 414, the user created AR content change events are initiated and performed at 416, and output is provided at 418 to the cloud server system as a data input. Blocks 440, 450, 460 depict process flows for offsite users and their respective offsite devices (OSDDs) B1, B2, ..., BM. For each of these process flows, input is received at 442, the visual result is viewed by the user at 444, user created AR content change events are initiated and performed at 446, and output is provided at 448 to the cloud server system as a data input.

Figure 5A:
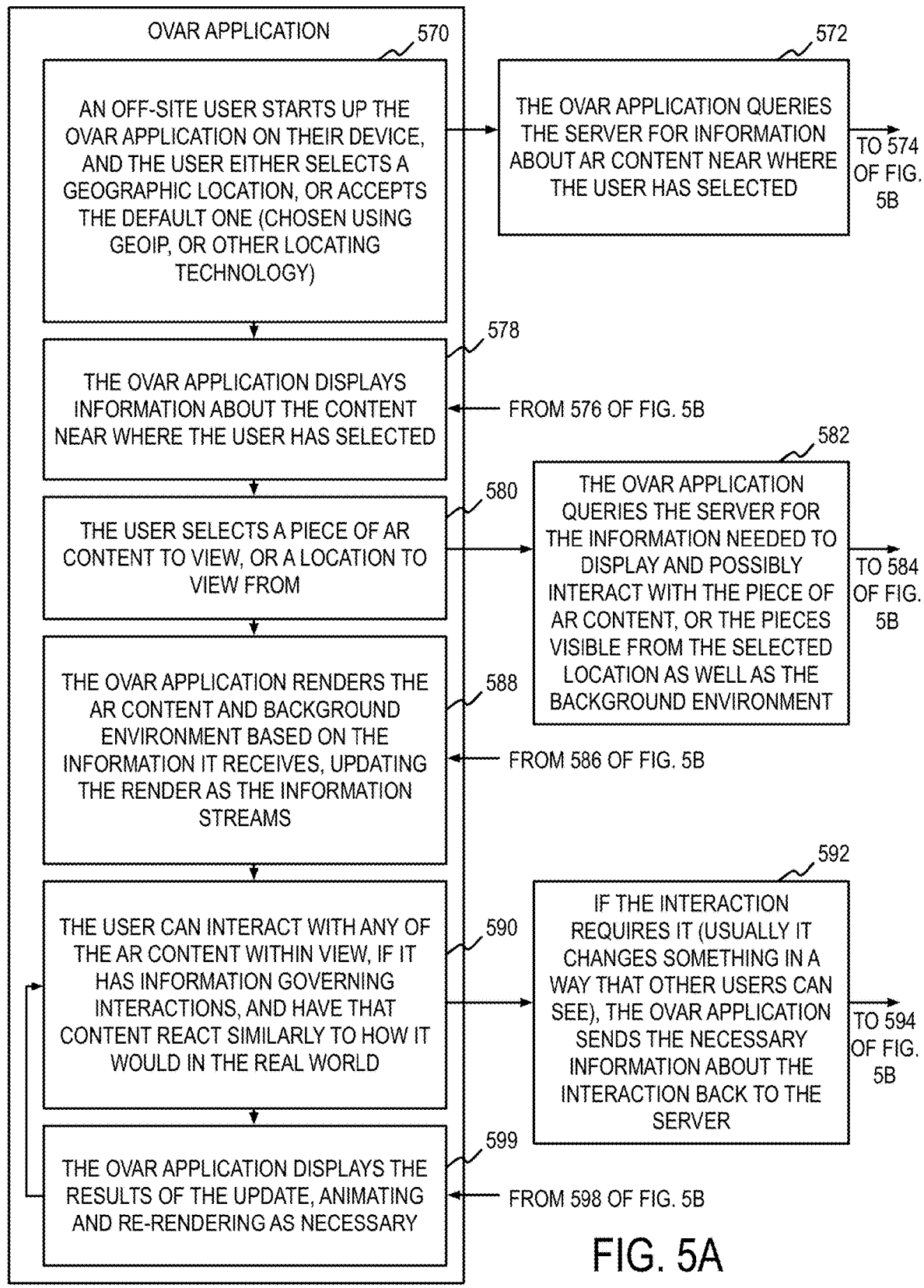
FIGS. 5A and 5B depict a flow diagram showing a mechanism for exchanging information between an offsite virtual augmented reality (ovAR) application and a server, according to an embodiment of the invention.
Figure 5B:
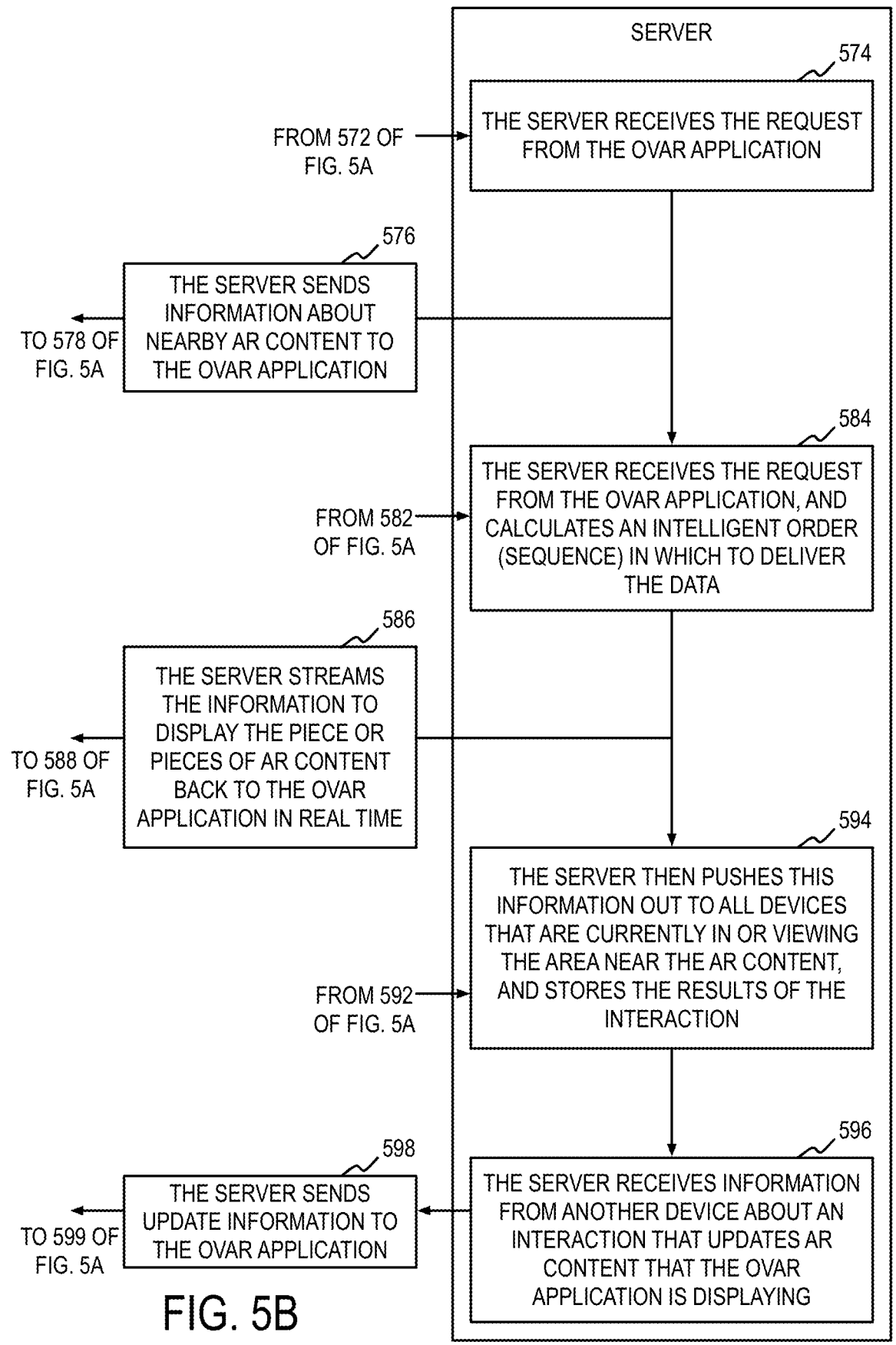

FIGS. 5A and 5B depict a flow diagram showing a mechanism for exchanging information between an offsite virtual augmented reality (ovAR) application and a server, according to an embodiment of the invention. At block 570, an offsite user starts up an ovAR application on an offsite device. The user can either select a geographic location, or stay at the default geographic location chosen for them. If the user selects a specific geographic location, the ovAR application may show the selected geographic location at a selected level of zoom. Otherwise, the ovAR may display a default geographic location, centered on the system's estimate of the offsite user's position (e.g., using known technologies such as GeoIP and/or the like). At block 572, the ovAR application queries the server for information about AR content corresponding to geographic locations at or near the selected (e.g., user-selected or default) geographic location. At block 574, the server receives this request from the ovAR application.

In response, at block 576, the server sends information about nearby AR content to the ovAR application running on the offsite user's device. At block 578, the ovAR application displays information about the content near the selected geographic location, on an output component (e.g., a display screen of the user's device). This displaying of information may include, for example, display of selectable dots on a digital map which provide additional information, or selectable thumbnail images of the content on a map.

At block 580, the offsite user selects a piece of AR content to view, or a geographic location to view AR content from. At block 582, the ovAR application queries the server for (1) the information needed for display of and possibly for interaction with the piece of AR content, or for display/interaction with the pieces of AR content visible from the selected location; and (2) information needed for display of and possibly for interaction with the background environment. At block 584, the server receives the request from the ovAR application and calculates an order in which to deliver the data. For example, data may be delivered in an order that minimizes the likelihood of the user looking at AR content for which the user does not have data. This may involve sending data for several different levels of graceful degradation.

At block 586, the server streams the information needed to display the piece or pieces of AR content back to the ovAR application in real time (or asynchronously). At block 588, the ovAR application renders the AR content and background environment based on the information it receives, and updates the rendering as the ovAR application continues to receive information.

At block 590, the user interacts with any of the AR content within the view. If the ovAR application has information governing interactions with that piece of AR content, the ovAR application processes and renders the interaction in a way similar to how the interaction would be processed and displayed by a device in the real world. At block 592, if the interaction changes something in a way that other users can see or changes something in a way that will persist, the ovAR application sends information about the change, as well as possibly who initiated the change, and how, back to the server. At block 594, the server pushes the received information to all devices that are currently in or viewing the area near the AR content, and stores the results of the interaction.

At block 596, the server receives information from another device about an interaction that updates AR content being displayed by the ovAR application. At block 598, the server sends the update information to the ovAR application. At block 599, the ovAR application updates the scene based on the received information, and displays the updated scene. The user can continue to interact with the AR content (block 590) and the server may continue to push the information about the interaction to the other devices (block 594).

Figure 6A:
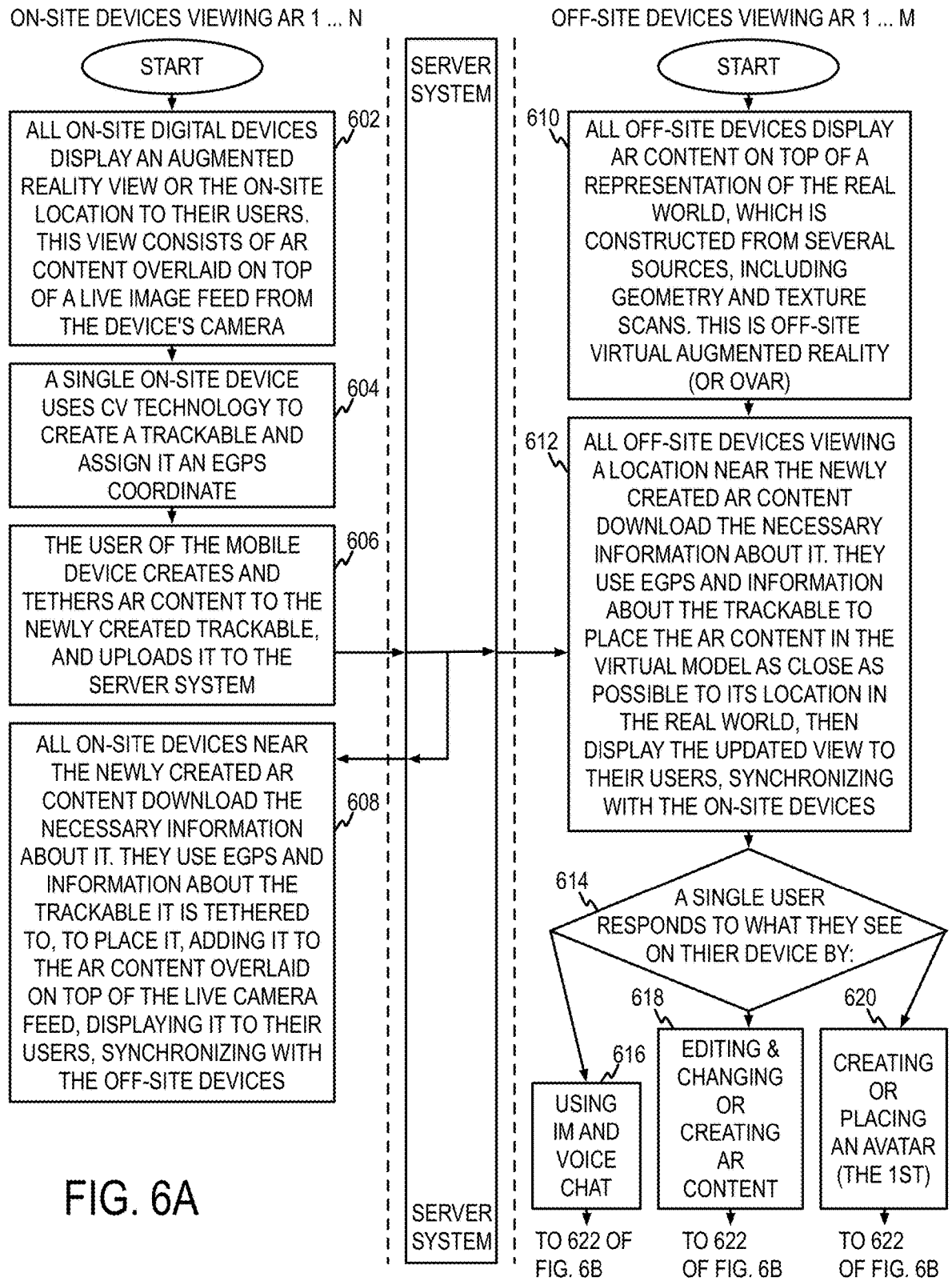
FIGS. 6A and 6B depict a flow diagram showing a mechanism for propagating interactions between onsite and offsite devices, according to an embodiment of the invention.
Figure 6B:
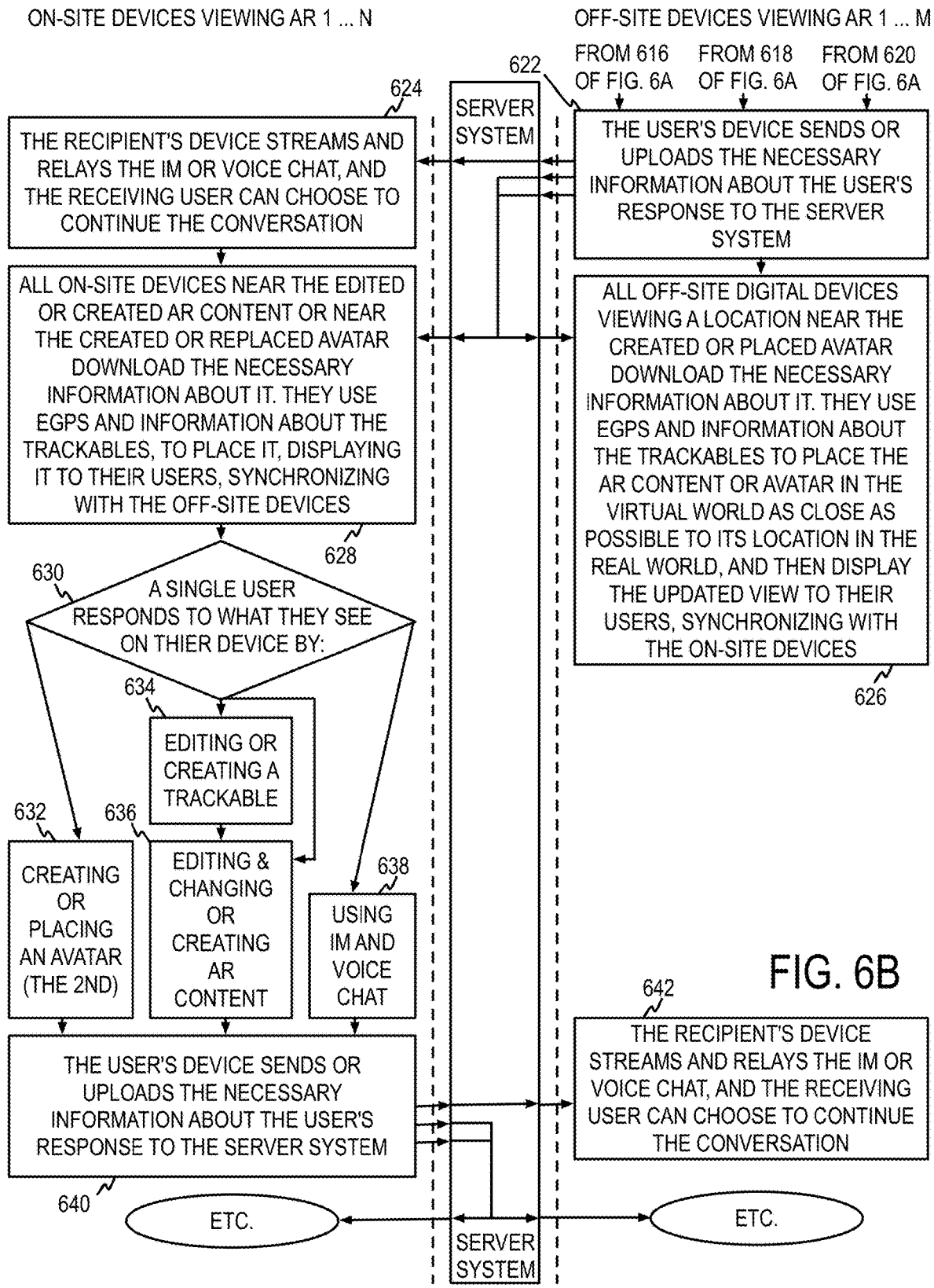

FIGS. 6A and 6B depict a flow diagram showing a mechanism for propagating interactions between onsite and offsite devices, according to an embodiment of the invention. The flow diagram represents a set of use-cases where users are propagating interactions. The interactions can start with the onsite devices, then the interactions occur on the offsite devices, and the pattern of propagating interactions repeats cyclically. Alternatively, the interactions can start with the offsite devices, and then the interactions occur on the onsite devices, etc. Each individual interaction can occur onsite or offsite, regardless of where the previous or future interactions occur. Within FIGS. 6A and 6B, blocks that apply to a single device (i.e., an individual example device), rather than multiple devices (e.g., all onsite devices or all offsite devices), include blocks 604, 606, 624, 630, 634, 632, 636, 638, 640, the server system, blocks 614, 616, 618, 620, 622, and 642.

At block 602, all onsite digital devices display an augmented reality view of the onsite location to the users of the respective onsite devices. The augmented reality view of the onsite devices includes AR content overlaid on top of a live image feed from the device's camera (or another image/video capturing component). At block 604, one of the onsite device users use computer vision (CV) technology to create a trackable object (i.e., a Trackable) and assign the trackable object a location coordinate (e.g., a position within a geographic coordinate system, such as WGS). At block 606, the user of the onsite device creates and tethers AR content to the newly created trackable object and uploads the AR content and the trackable object data to the server system.

At block 608, all onsite devices near the newly created AR content download some or all of the information about the AR content and its corresponding trackable object from the server system. The onsite devices use the location coordinates (e.g., WGS coordinates) of the trackable object to add the AR content to the AR content layer which is overlaid on top of the live camera feed. The onsite devices display the AR content to their respective users and synchronize information with the offsite devices.

At block 610, all offsite digital devices display virtual augmented reality content on top of a virtual representation of the real world, which may be constructed from several sources, including geometry and texture scans. As explained elsewhere in this disclosure, the augmented reality displayed virtually by the offsite devices may be referred to as offsite virtual augmented reality (ovAR).

At block 612, the offsite devices that are viewing a location near the newly created AR content download some or all of the information about the AR content and the corresponding trackable object. The offsite devices use the location coordinates (e.g., WGS coordinates estimated using GPS and/or LockAR-determined coordinates, e.g., within a COFIG) of the trackable object to place the AR content in the coordinate system as close as possible to its location in the real world. The offsite devices then display the updated view to their respective users and synchronize information with the onsite devices.

At block 614, a single user responds to what they see on their device in various ways. For example, the user can respond by using instant messaging (IM) or voice chat (block 616). The user can also respond by editing, changing, or creating AR content (block 618). Finally, the user can also respond by creating or placing an avatar (block 620).

At block 622, the user's device sends or uploads, to the server system, information relating to the user's response. If the user responds by IM or voice chat, at block 624, the receiving user's device streams and relays the IM or voice chat. The receiving user (recipient) can choose to continue the conversation.

At block 626, if the user responds by editing or creating AR content or an avatar, all offsite digital devices that are viewing a location near the edited or created AR content (or near the created or placed avatar) download information about the AR content or avatar. The offsite devices use the location coordinates (e.g., coordinates determined using GPS) of the trackable object to place the AR content or avatar in the virtual world as close as possible to its location in the real world. The offsite devices display the updated view to their respective users and synchronize information with the onsite devices.

At block 628, all the onsite devices near the edited or created AR content or near the created or placed avatar download information about the AR content or avatar. The onsite devices use the location coordinates (e.g., GPS) of the trackable object to place the AR content or avatar. The onsite devices display the AR content or avatar to their respective users and synchronize information with the offsite devices.

At block 630, a single onsite user responds to what they see on their device in various ways. For example, the user can respond to what they see by using instant messaging (IM) or voice chat (block 638). The user can also respond to what they see by creating or placing another avatar (block 632). The user can also respond to what they see by editing or creating a trackable object and assigning the trackable object a location coordinate (block 634). The user can further edit, change or create AR content (636).

At block 640, the user's onsite device sends or uploads, to the server system, information relating to the user's response. At block 642, a receiving user's device streams and relays the IM or voice chat. The receiving user can choose to continue the conversation. The propagating interactions between onsite and offsite devices can continue.

III. Systems and Methods for Improved Position and Geometry Data (LockAR)

The LockAR system described herein uses quantitative analysis and other methods to improve and enhance the AR sharing system, specifically the AR experience, e.g., by facilitating improved accuracy of location information. These methods may include analyzing and/or linking to data regarding the geometry of the objects and terrain, defining the position of AR content in relation to one or more trackable objects (a.k.a. tethering), and/or coordinating, filtering, and analyzing data regarding position, distance, and orientation between trackable objects, as well as between trackable objects and onsite devices. The data set comprising position and geometry data relating to one or more physical features of the real-world location may be referred to herein as environmental data.

To accurately display computer-generated objects or content within a view of a real-world scene, which may be referred to herein as an AR event, the AR system needs to acquire this environmental data as well as the positions of one or more onsite users. LockAR's integration of environmental data for a selected real-world location with the quantitative analysis of other systems may be used to improve the positioning accuracy of new and existing AR technologies. Each environmental data set (e.g., Trackable) of an AR event can be associated with a particular real-world location or scene in many ways, which include application-specific location data, geofencing data, and geofencing events. Geofencing may be GPS-based.

The application of the AR sharing system described herein may use GPS and/or other triangulation technologies to generally identify the location of the user. To minimize the amount of data that must be stored in a mobile device at any given time, the AR sharing system may respond to an estimation of the user's location by loading existing LockAR data corresponding to the real-world location where the user is situated.

Based on the position and geometry data of the real-world location, the AR sharing system can determine the relative locations of AR content in the augmented reality scene. For example, the system can decide the relative distance between an avatar (or any other AR content object) and a fiducial marker, which may be included in the LockAR data. In another example, multiple fiducial markers may be included, with an ability to cross-reference positions, directions, and vector angles to each other. In those examples, the system may be configured to refine and improve position information of the fiducial markers (e.g., with respect to each other) whenever a viewer uses an enabled digital device to perceive content on location. For example, a confidence level in a position may be improved based on additional measurements, or an uncertainty may be reduced.

The improved position and geometry data system for augmented reality (LockAR) includes information in addition to GPS and other beacon and signal outpost methods of triangulation. These technologies can be imprecise in some situations, with inaccuracy up to hundreds of feet. The LockAR system can be used to significantly improve onsite location accuracy. As should be apparent to one skilled in the art, the fiducial markers in these examples may be replaced with any Trackable (e.g., a point cloud).

For an AR system based only on coordinates detected from GPS signals, a user can create an AR content object in a location (based on the GPS-provided coordinates), only to return later and find the object in a different location. This is because GPS signal accuracy and margin of error are inconsistent. The GPS system attempts to provide an estimate of the actual WGS coordinates of the GPS-enabled device. While better than many other methods, the GPS-only method is often relatively inaccurate, inconsistent, and/or unreliable.

If several people were to try to place AR content objects at the same exact location, based on detected GPS, at different times, their AR content would end up being placed at different locations within the assumed coordinate system of the augmented reality world. The inconsistency between the GPS data available to the users at the different times and to the AR application at the time of the event would result in a lack of consistency in object placement. This is especially troublesome if the users are trying to create a coherent AR world, where the desired effect is to have AR content or objects interacting with other AR (or real-world) content or objects in a predictable and/or consistent manner.

The environmental data from the real-world locations (i.e., scenes), and the ability to correlate nearby position data to improve accuracy provides a level of accuracy and precision that is necessary for applications which enable multiple users to interact and edit AR content simultaneously (or over time), in a shared AR space. LockAR may be used to improve the fidelity of the VR representation of the real-world environment. In other words, LockAR data can be used to improve the offsite VR experience (i.e., ovAR), by increasing the accuracy of the representation of the real-world scene. Additionally, LockAR may be used to improve the fidelity of positioning of AR content in an onsite device with respect to the position intended by an offsite user. For example, AR content may be created by an offsite user, and placed in an ovAR experience (on an OSDD) by reference to the onsite position and geometry data. LockAR may be configured to enhance the translation/positional accuracy when this content is then displayed in a real world onsite location. This can be a combination of general and ovAR specific data sets.

The LockAR environmental data for a scene can include and be derived from various types of information-gathering techniques and/or systems for additional precision and accuracy. For example, using computer vision techniques, a 2-D fiducial marker may be recognized as an image on a flat plane or defined surface in the real world. The system may identify the orientation and distance of the fiducial marker and determine other positions or object shapes relative to the fiducial marker. Similarly, 3-D markers of non-flat objects can also be used to mark locations in the augmented reality scene. Combinations of these various fiducial marker technologies can be related to each other by the system, to improve the quality of the data/positioning that each nearby AR technology imparts.

The LockAR data can include data collected by a simultaneous localization and mapping (SLAM) technique. The SLAM technique creates textured geometry of a physical location on the fly, from a camera and/or structured light sensors. This data may be used to pinpoint the AR content's position relative to the geometry of the location. This data may also be used to create virtual geometry with the corresponding real world scene placement, which can be viewed offsite to enhance the ovAR experience. For example, the geometry allows for AR content items to be occluded by real-world objects, as well as the transmission of various perspectives of the virtual AR representation with greater fidelity. Structured light sensors, e.g., IR or lasers, can be used to determine the distance and shapes of objects and to create 3-D point-clouds or other 3-D mapping data of the geometry present in the scene.

The LockAR data may also include accurate information regarding the location, movement, and rotation of the user's device. This data can be acquired by techniques such as pedestrian dead reckoning (PDR) and/or sensor platforms.

The accurate position and geometry data of the real world and the user creates a robust web of positioning data. Based on the LockAR data, the system knows the relative positions of each fiducial marker and each piece of SLAM or pre-mapped geometry. So, by tracking/locating any one of the objects in the real-world location, the system can determine the positions of other objects in the location, and the AR content can be tied to or located relative to actual real-world objects in 3-D space with six degrees of freedom (DOF). The movement tracking and relative environmental mapping technologies allow the system to determine, with a high degree of accuracy, the location of a user, even with no recognizable object in sight, as long as the system can recognizes a portion of the LockAR data set.

In addition to static real-world locations, the LockAR data may be used to place AR content at mobile locations as well. The mobile locations may include, e.g., ships, cars, trains, planes, and/or people. A set of LockAR data associated with a moving location is called "mobile LockAR." The position data in a mobile LockAR data set is determined and maintained relative to coordinates of the mobile location (e.g. from a GPS-enabled device at or on the mobile location which continuously updates the position of the mobile location). The system continuously refines the GPS data of the mobile location, while making predictions of the movement of the mobile location.

In some embodiments, to optimize the data accuracy of mobile LockAR, the system can introduce a mobile position orientation point, (MPOP), which is the GPS coordinates of a mobile location over time interpreted and refined to produce the best estimate of the mobile location's actual position and orientation (e.g., the actual WGS coordinates). This set of GPS coordinates describes a particular location. An AR object, or collection of AR objects or LockAR data objects may not be at the exact center of the mobile location to which they are linked. Accordingly, the system calculates the actual location of a linked object by offsetting its position from the MPOP. For example, for a linked object whose position is known relative to the MPOP at its creation, the linked object's updated position can be based on either a known constant offset from the MPOP or on algorithmic principles (e.g., when the linked object is moving relative to the MPOP).

Figure 8:
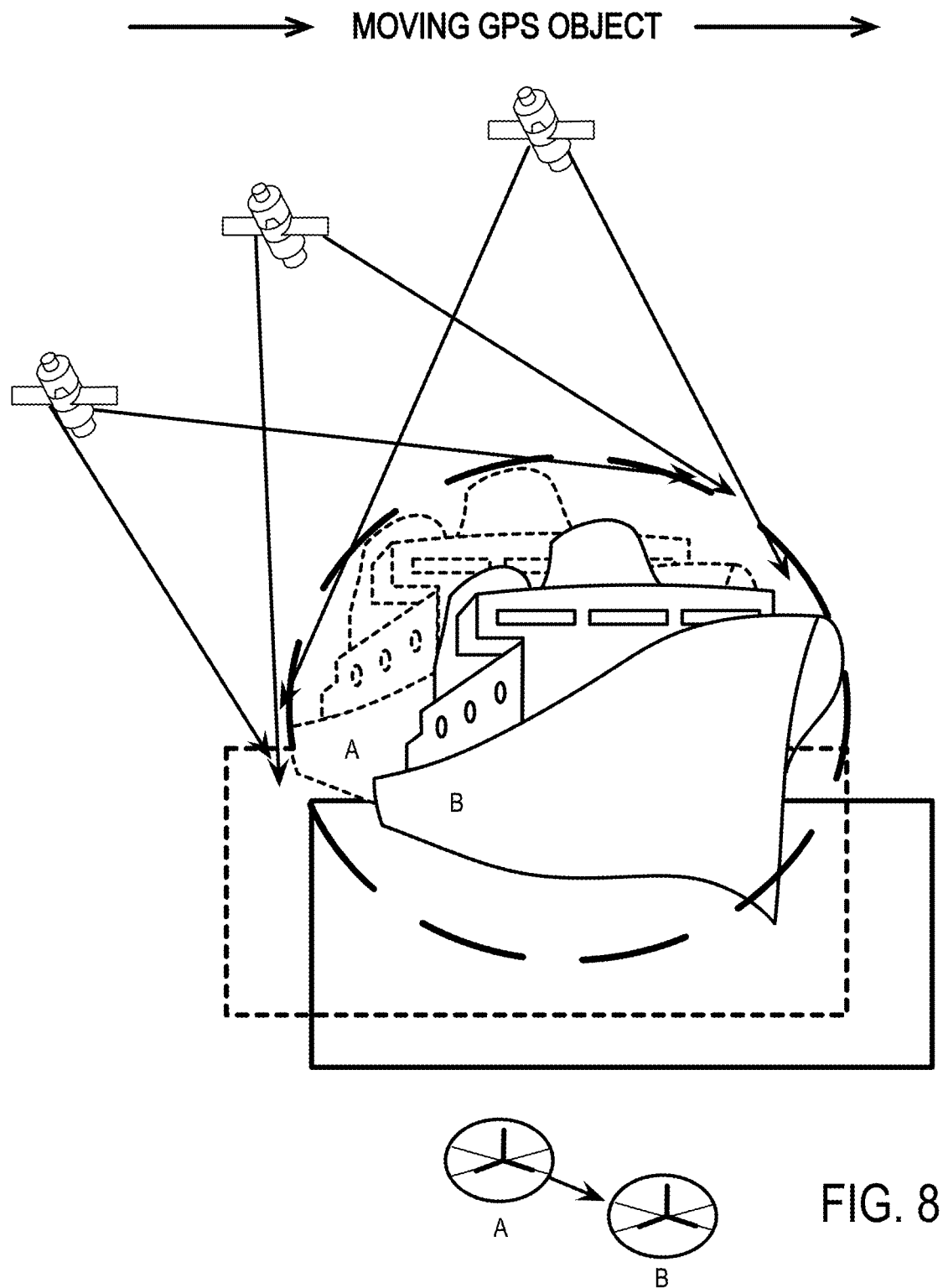

FIGS. 7 and 8 illustrate how an MPOP allows for the creation and viewing of augmented reality that has a moving location. As FIG. 7 illustrates, the mobile position orientation point can be used by onsite devices to know when to look for a Trackable and by offsite devices for roughly determining where to display mobile AR objects. As indicated by reference numeral 700, the process flow includes looking for accurate AR in the bubble of 'error' made by GPS estimation, for example, by object recognition, geometry recognition, spatial cues, markers, SLAM, and/or other computer vision (CV) to 'align' GPS with actual AR or VR location and orientation. In some examples, best CV practices and technologies may be used or otherwise applied at 700.

Also at 700, the process flow includes determining or identifying a variable Frame of Reference Origin Point (FROP), and then offset from FROP all AR correction data and onsite geometry that will correlate with GPS. FROP is found within GPS error bubble(s) using CV, SLAM, motion, PDR, and marker cues. This can be a common guide for both the onsite and offsite AR ecosystem to refer to the exact same physical geometry of the AR content creation spot, and to repeatedly find that exact spot even when an object is moving, or time has elapsed between the LockAR creation event, and subsequent AR viewing event.

As FIG. 8 illustrates, the MPOP allows the augmented reality scene to be accurately lined up with the real geometry of the moving object. The system first finds the approximate location of the moving object based on its GPS coordinates, and then applies a series of additional adjustments to more accurately match the MPOP location and heading to the actual location and heading of the real-world object, thereby allowing the AR world to match an accurate geometric alignment with the real object or a multiple set of linked real objects. The FROP allows real geometry (B) in FIG. 8 to be lined up with AR accurately, using error prone GPS (A) as a first approach to get CV cues into an approximation of location, and then apply a series of additional adjustments to more closely to match accurate geometry and to line up any real object in any location, or virtual location—moving or still. Small objects may only need CV adjustment techniques. Large objects may also need FROP.

In some embodiments, the system can also set up LockAR locations in a hierarchical manner. The position of a particular real-world location associated with a first LockAR data set may be described in relation to the position of another particular real-world location associated with a second LockAR data set, rather than being described using WGS coordinates directly. Each of the real-world locations in the hierarchy has its own associated LockAR data set including, e.g., fiducial marker positions and object/terrain geometry.

The LockAR data set may have various AR-related uses. For example, in one embodiment, the system can use LockAR data to create 3-D vector shapes of objects (e.g., light paintings) in augmented reality. Based on the accurate environmental data (position and geometry information in a real-world location) the system can use an AR light painting technique to draw the vector shape using a simulation of lighting particles in the augmented reality scene for the onsite user devices and the offsite virtual augmented reality scene for the offsite user devices.

Figure 9B:
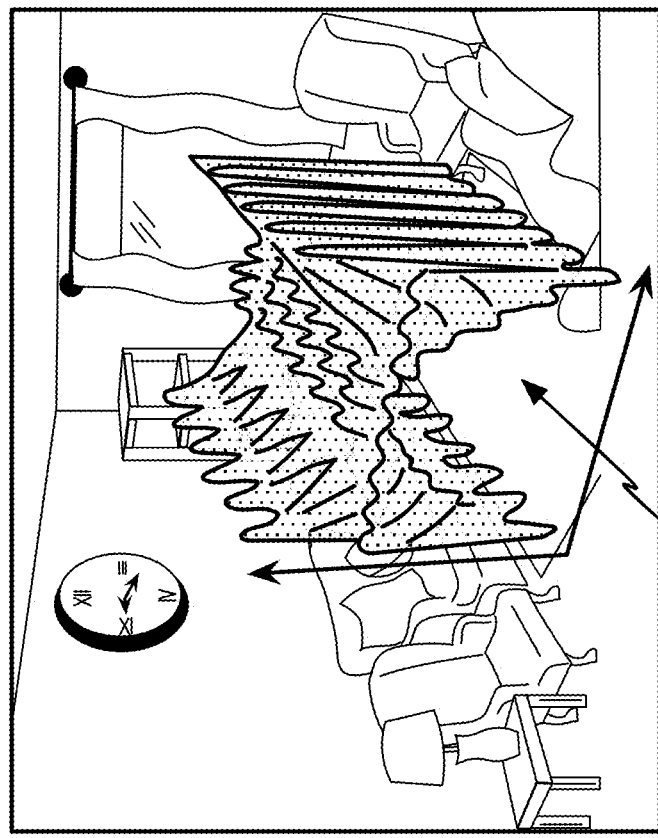
FIGS. 9A, 9B, 10A, and 10B are illustrative diagrams showing how AR content can be visualized by an onsite device in real time, according to embodiments of the invention.
Figure 9A:
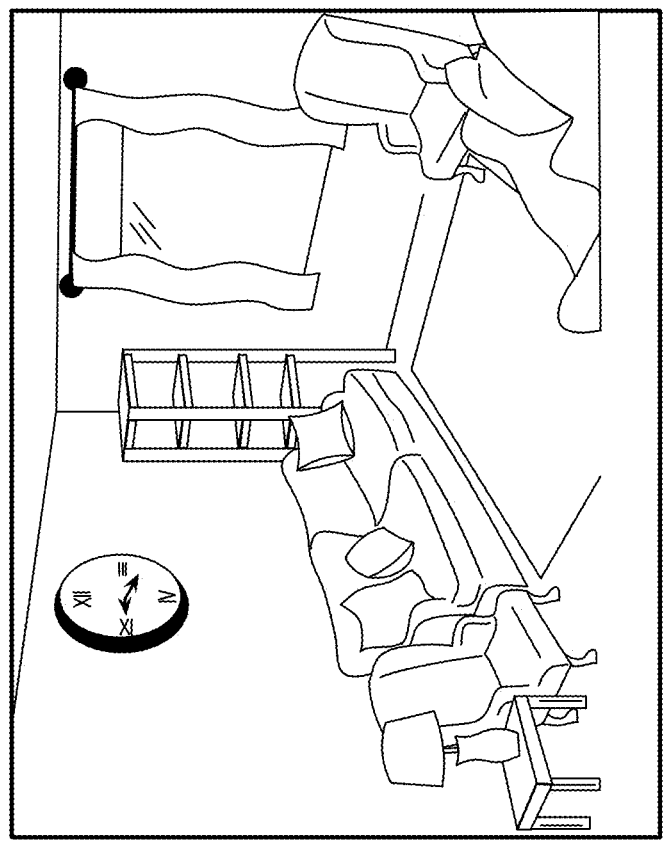

In some other embodiments, a user can wave a mobile phone as if it were aerosol paint can and the system can record the trajectory of the wave motion in the augmented reality scene. As FIGS. 9A and 9B illustrate, the system can find accurate trajectory of the mobile phone based on the static LockAR data or, in mobile LockAR, with respect to a mobile position orientation point (MPOP). FIG. 9A depicts a live view of a real-world environment that is not augmented with AR content. FIG. 9B depicts the live view of FIG. 9A with the addition of AR content 900 to provide an AR representation of the real-world environment.

The system can make animation that follows the wave motion in the augmented reality scene. Alternatively, the wave motion lays down a path for some AR object to follow in the augmented reality scene. Industrial users can use LockAR location vector definitions for surveying, architecture, ballistics, sports predictions, AR visualization analysis, and other physics simulations or for creating spatial 'events' that are data driven and specific to a location. Such events can be repeated and shared at a later time.

In one embodiment, a mobile device can be tracked, walked, or moved as a template drawing across any surface or space, and vector-generated AR content can then appear on that spot via digital device, as well as appearing in a remote (offsite) location. In another embodiment, vector-created spatial drawings can power animations and time/space related motion events of any scale or speed, again to be predictably shared off and onsite, as well as edited and changed offsite and/or onsite, to be available as a system-wide change to other viewers.

Figure 10A:
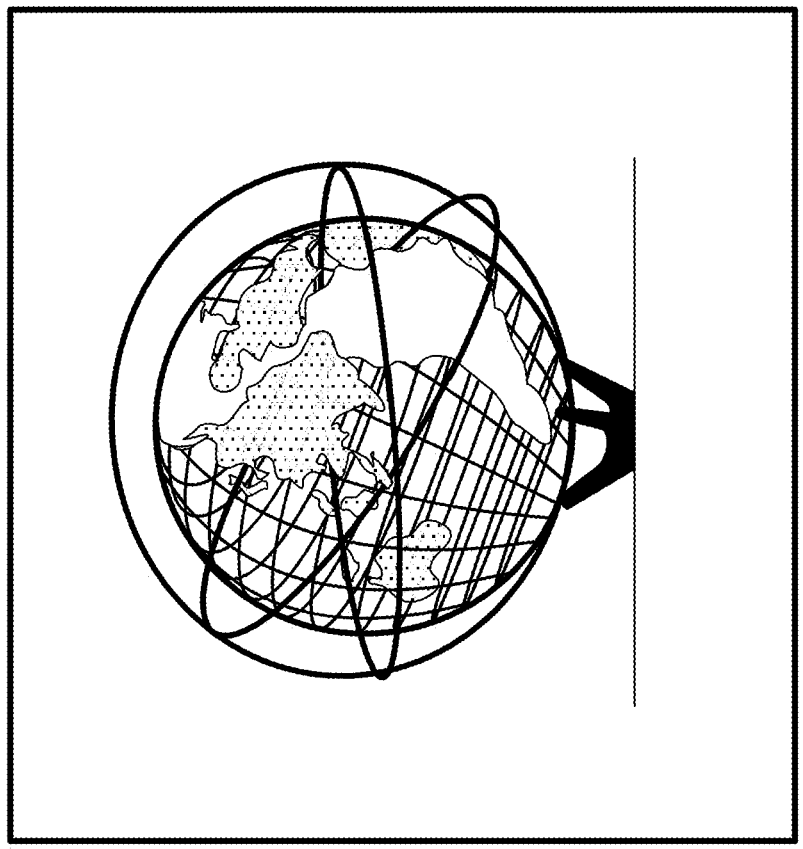
Figure 10B:
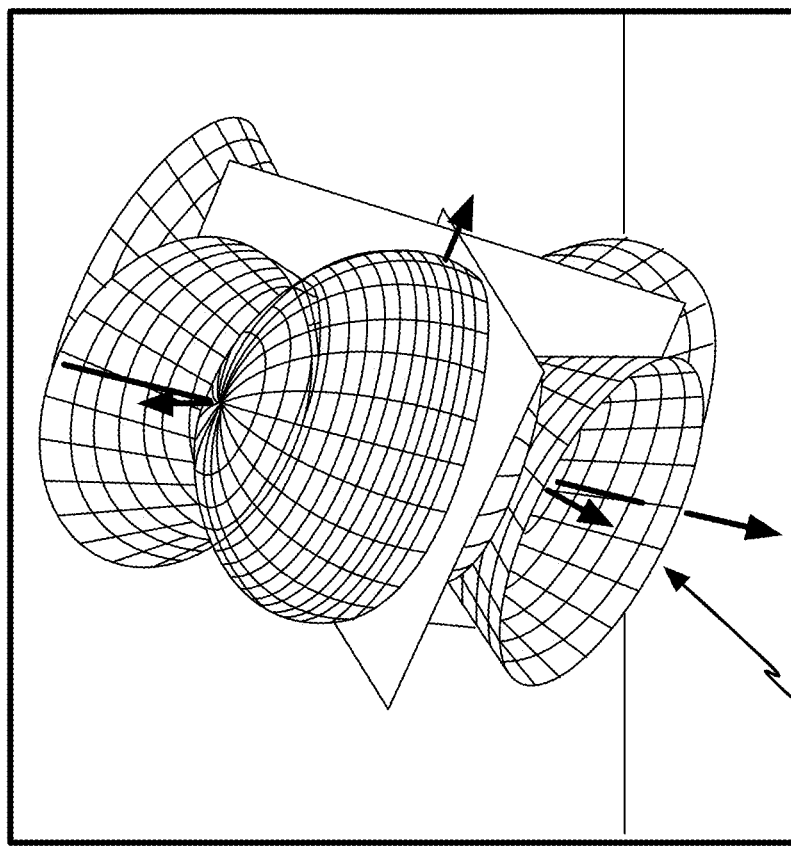

Similarly, as FIGS. 10A and 10B illustrate, inputs from an offsite device can also be transferred to the augmented reality scene facilitated by an onsite device in real time. FIG. 10A depicts a live view of a real-world environment that is not augmented with AR content. FIG. 10B depicts the live view of FIG. 10A with the addition of AR content 1000 to provide an AR representation of the real-world environment.

The system uses the same technique as in FIGS. 9A and 9B to accurately line up to a position in WGS space with proper adjustments and offsets to improve accuracy of the coordinates.

LockAR—Additional Details

Additional details and examples regarding the LockAR system described above will now be provided. LockAR is a method by which AR content may be tied to (or positioned relative to) a physical location with significantly more accuracy than ever before. It may use GPS as well as trackable features of the environment (i.e., "Trackables") to position the AR content. In addition, LockAR incrementally increases the accuracy of the position of AR content over time by incrementally improving its knowledge of the positions of Trackables relative to each other, e.g., through feedback from users' devices. Finally, LockAR allows for the placement of AR content on or in moving objects or environments in a global coordinate system (e.g., WGS), by using a global coordinate system technology (e.g., GPS signals) to estimate the position and orientation of the object/environment. This system can be generalized to any global coordinate system, not just GPS/WGS.

Point Creation

Figure 11:
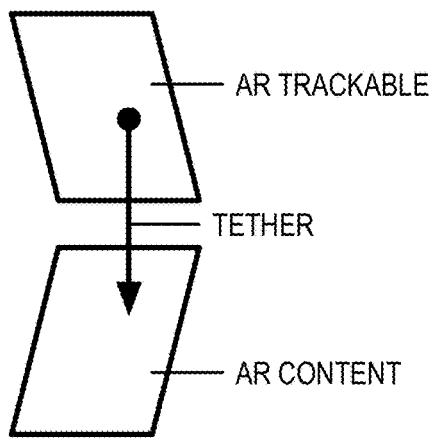
FIG. 11 is a schematic diagram showing how illustrative AR content may be connected to a Trackable using a tether.

FIG. 11 is a diagram that shows point creation, with respect to how AR content is connected to a Trackable using a tether, thereby maintaining a relationship between the Trackable's understood location and the AR content's understood location.

LockAR starts when a user's device recognizes a new trackable feature it wants to use. It then records the data needed to identify and track the feature, as well as its estimated GPS coordinates. This data turns the feature into a "Trackable". Trackables may also be generated from third-party data. If the user's device hasn't tracked another Trackable recently, it places the Trackable into a new Coordinate Filter Improvement Group (COFIG group). If the device has recognized other Trackables recently, it places the new Trackable into a COFIG group that contains whichever recently-seen Trackable has the lowest positional uncertainty. It then sends the Trackable's data to an external server where it is stored.

When the GPS coordinates of a Trackable are estimated by a device, that device takes its current GPS reading, as well as its previous GPS readings, and determines how erratic the GPS in this area is (for instance, by measuring the standard deviation of the data). If the device has tracked any previously recorded Trackables it takes their estimated GPS positions into consideration (The device determines the likely error in these estimated GPS positions by taking into account, how erratic the dead reckoning is, how long the dead reckoning has been running, any algorithmically generated or manually set uncertainty weights, as well as the error in the perceived position of the object when it was tracked). This gives it estimated GPS coordinates, as well as an uncertainty value, (which can be represented as a standard deviation, with a higher standard deviation representing more uncertainty). The confidence value in a datum or measurement can be calculated by taking the inverse of the uncertainty value. One alternative way of storing an uncertainty value would be as the percent chance that the actual value is within a confidence interval, which assuming a normal distribution, can be freely converted to a standard deviation plus a mean value and back again. It is also possible that the uncertainty value could be stored as several values, i.e., the uncertainty in the uncertainty could be part of the uncertainty value. Also, the uncertainty in the uncertainty could be represented, for instance, as the number of samples represented by the distribution, weighted accordingly.

Relaxation and Uncertainty Updates

When two points are both within the same COFIG group, they have COFIG coordinates, which positions and orients each Trackable relative to others using latitude, longitude, and altitude within the COFIG coordinate system, as well as yaw, pitch, and roll. If a user's device looks at one Trackable, it estimates how far away it is, in what direction it is, and what orientation it is in relative to the device. The device then remembers where that Trackable is as the device is moved around, either by visually tracking it, or by using pedestrian dead reckoning (PDR) technologies and GPS. Then, when the device begins tracking a second Trackable, it estimates the distance, direction, and orientation of that Trackable, and calculates the second Trackable's estimated position. Given this information, the device can calculate an estimated distance and orientation between the two Trackables, and can send this information, as well as the uncertainty in the information's accuracy, to the server. The server then uses this measurement to "relax" the COFIG coordinates of both points, so that the distance between the two COFIG coordinates, as well as the relative COFIG orientations of the Trackables, becomes closer to the device's estimate of those values. Trackables can also be defined to exist in an area. In the case of a movable Trackable that is defined to exist in an area, the measurement between it and another Trackable cannot be used to determine the specific position of the other Trackable, meaning the second point does not always relax.

The amount the coordinates change upon relaxation is dependent on both the uncertainty value of the device's measurement of the distance between, and the relative orientation of, the two Trackables, as well as the uncertainty values for their COFIG coordinates. The lower the uncertainty in the COFIG coordinate before the measurement, the less that COFIG coordinate will move, and the lower the uncertainty in the measurement, the more the COFIG coordinate will move. The larger the difference between the actual measurement and what the COFIG coordinates predict the measurement should be, the more the COFIG points will move. After the coordinates update, the uncertainty values will also update. If the measurement was close to what the COFIG group predicted it should be, then the uncertainty value of the updated COFIG points will be lower. In this case, the lower the uncertainty in measurement, the lower the updated COFIG uncertainty will be. Conversely, if the measurement is far from what the COFIG group predicted it would be, then the uncertainty in the updated COFIG points will be higher than they were previously. In this case, the lower the uncertainty of the measurement, the higher the uncertainty in the result, except for when the measurement confidence is significantly higher than the COFIG confidence.

Figure 22:
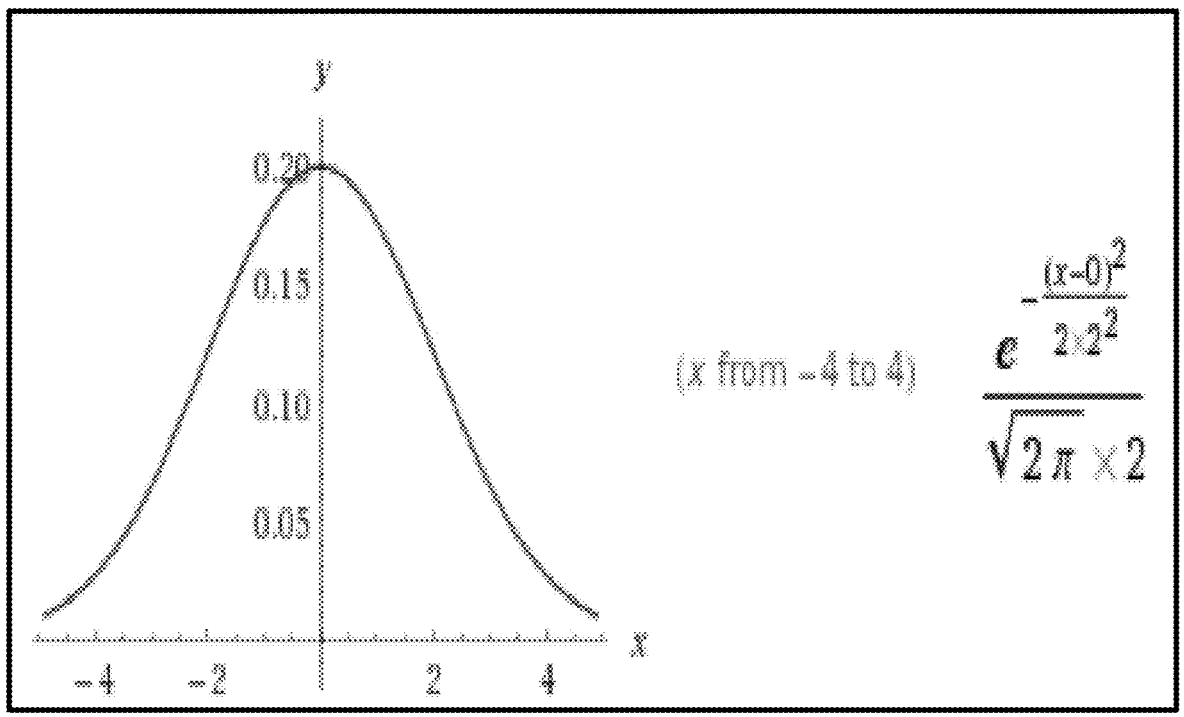
FIG. 22 depicts a first illustrative Gaussian distribution.

An example embodiment of uncertainty updates (which does not strictly follow the parameters set in the above paragraph, as the uncertainty is always decreased) would use Bayesian analysis, taking the Gaussian distribution of an initial point as the prior probability, a Gaussian distribution of a second point as the likelihood function, and the resulting posterior Gaussian distribution giving an updated point and uncertainty value. Bayesian analysis says that the posterior distribution $p(\theta|y)$ is equal to the prior distribution $p(\theta)$ times the likelihood function $p(y|\theta)$ divided by the integral of $p(\theta)$ times $p(y|\theta)$ over the entire range of the distributions, which in this case is negative infinity to infinity. Each dimension of the point can also be calculated individually, with its own uncertainty value. For instance a point A with a value (mean) in the x dimension of 0, and a standard deviation of 2, has a Gaussian distribution as shown in FIG. 22.

Figure 23:
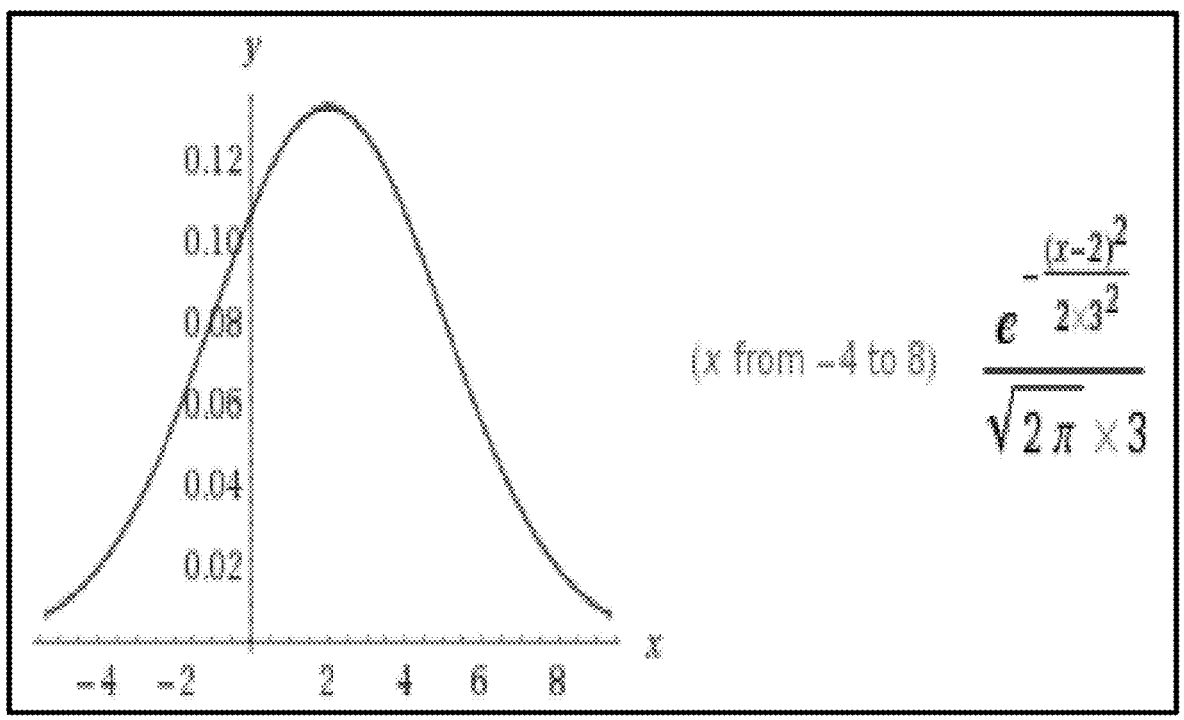
FIG. 23 depicts a second illustrative Gaussian distribution.
Figure 24:
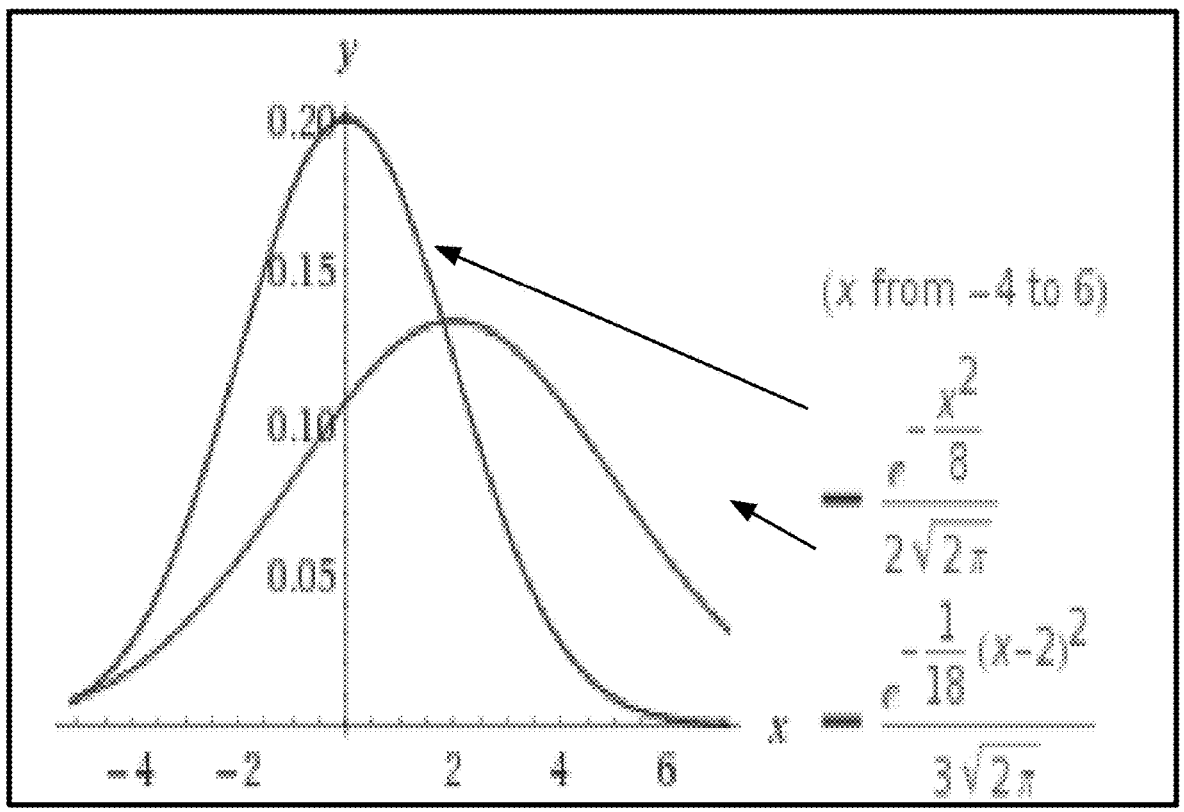
FIG. 24 depicts the Gaussian distributions of FIGS. 22 and 23, plotted on the same axes.
Figure 25:
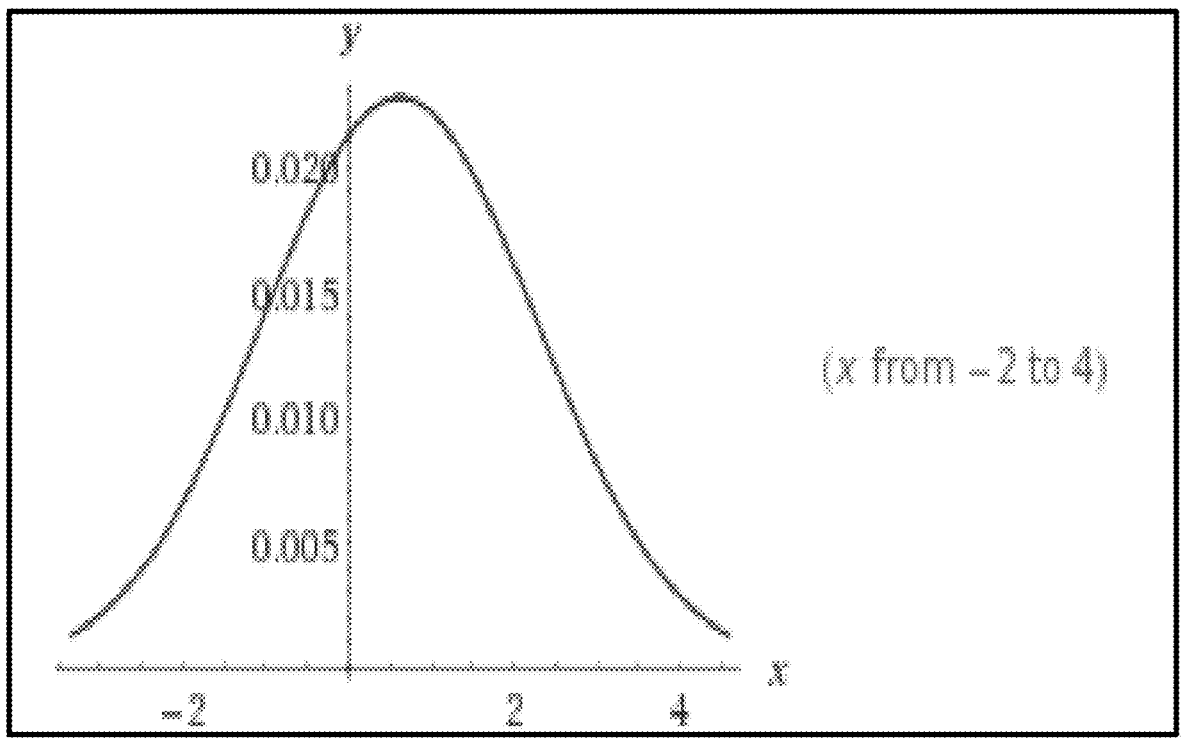
FIG. 25 depicts a product of the Gaussian distributions of FIGS. 22 and 23.
Figure 26:
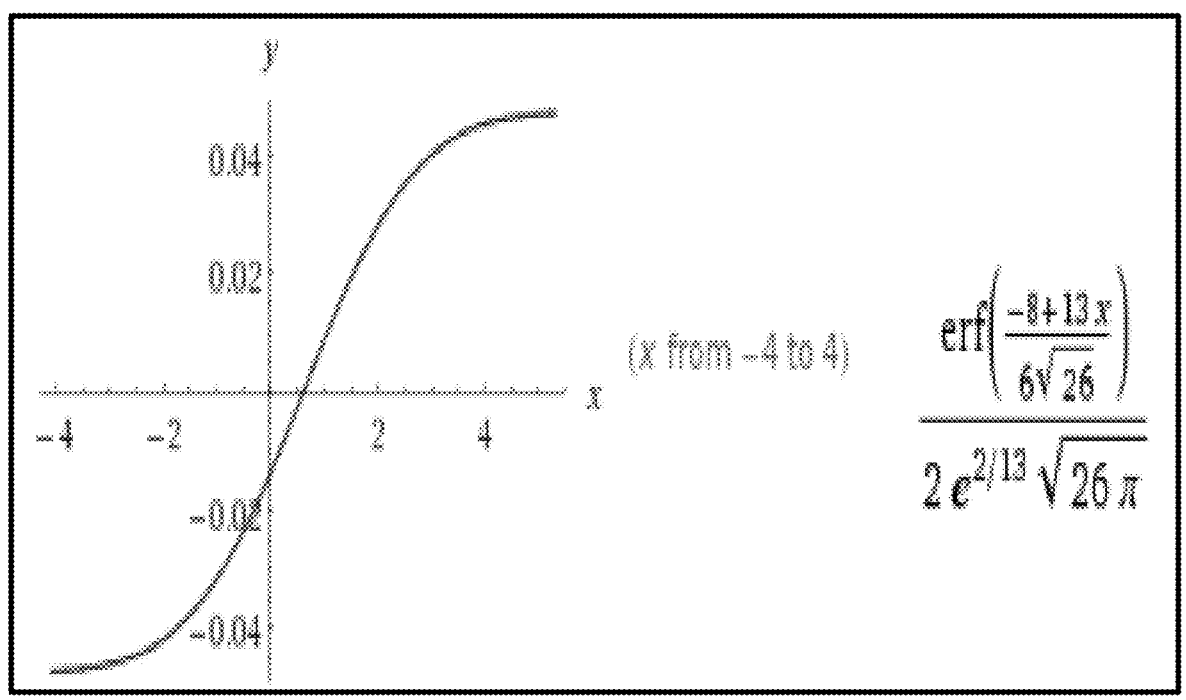
FIG. 26 depicts the integral of the distribution of FIG. 25.

An update to that point, with a predicted x value of 2, and a standard deviation of 3, has a Gaussian distribution as shown in FIG. 23. Both distributions plotted on the same axis, look as shown in FIG. 24. The distributions, when multiplied, result in a distribution as shown in FIG. 25. This resulting distribution is notably not Gaussian, as the probabilities do not sum to one. The integral of this distribution is shown in FIG. 26.

As the erf( ) function has a limit of −1 and 1 as it goes to negative infinity and infinity respectively, this integral will have the value over its entire range be equal to:

$$\frac{1}{e^{2/13}\sqrt{26\pi}}$$

Figure 27:
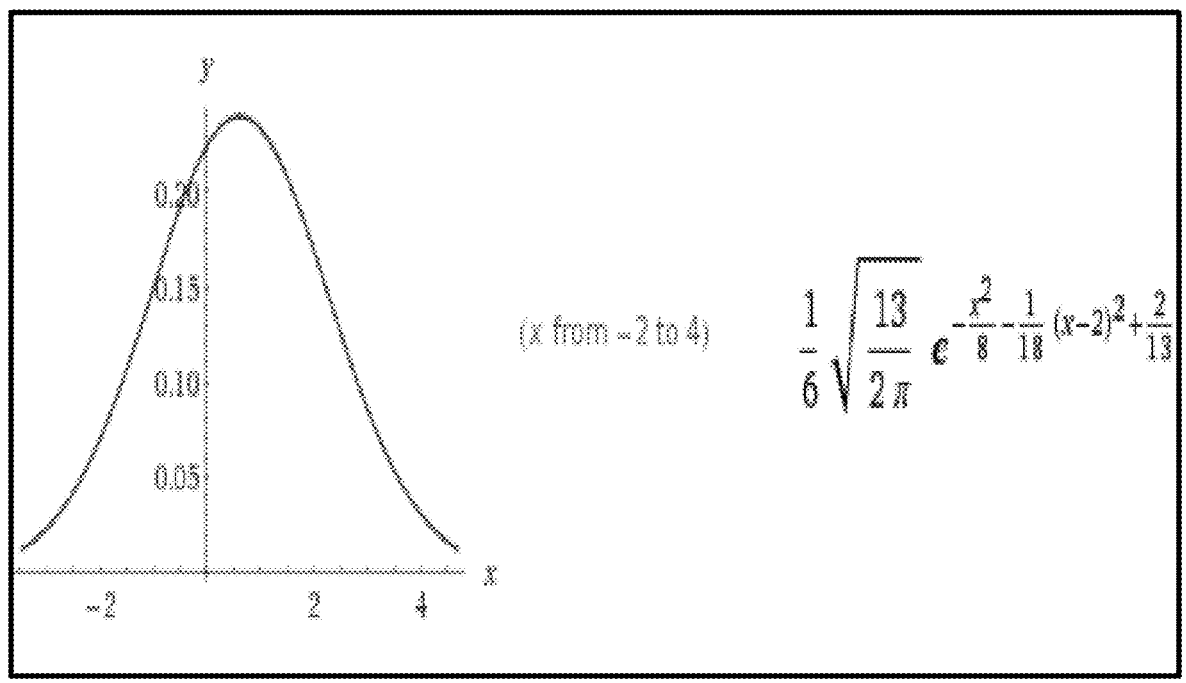
FIG. 27 depicts an illustrative posterior distribution.

This gives us a posterior distribution (see FIG. 27) that can be re-written as:

$$\frac{e^{-\frac{\left(x-\frac{8}{13}\right)^2}{2 \times 1.6641^2}}}{\sqrt{2\pi} \times 1.6641}$$

Figures 28, 29:
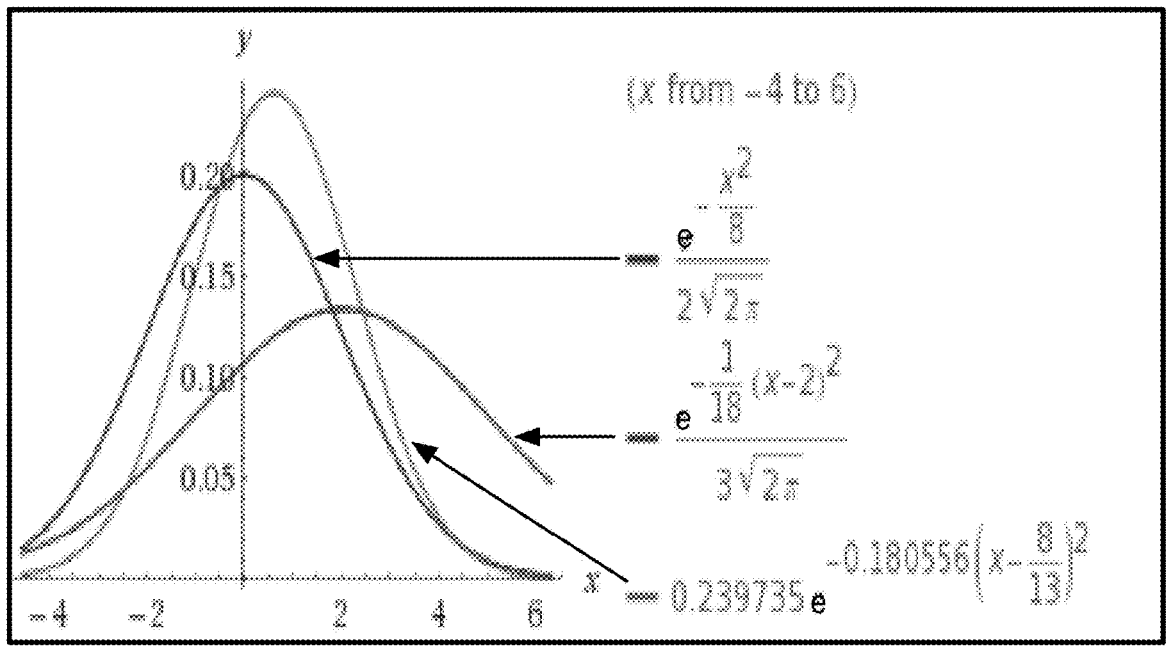
FIG. 28 depicts the Gaussian distributions of FIGS. 22, 23, and 27, plotted on the same axes.
FIG. 29 is a schematic diagram depicting an illustrative hierarchy of COFIG groups in accordance with aspects of the present disclosure.

This distribution has a "value" of 8/13 (0.61538 . . . ) and a standard deviation of 6/√13 (1.6641 . . . ). Graphing all three of the Gaussians on the same axis is shown in FIG. 28.

We see that the updated distribution (with the highest peak) has a smaller standard deviation, and therefore a lower uncertainty value for its value of 8/13 for the x coordinate of the point.

This formula depends on having accurate uncertainty values for the measurements involved. The most basic way to generate these values is by combining the uncertainties of all the measurements taken by the device. For example, as a device is being moved, a reading is made of its accelerometer which has an uncertainty value attached to it. As the device continues to move it keeps a running tally of the total distance traveled by summing all of the accelerometer readings. It also keeps a running tally of the uncertainty value of the total distance traveled, by combining all of the uncertainty values associated with accelerometer readings. When measuring uncertainties with standard deviations, this is done by summing the numerical values of all the standard deviations calculated. This means if standard deviation A is 4.5 and standard deviation B is 5.5, then the total standard deviation would be 10. More sophisticated methods can also be used such as dynamic Bayesian networks or Kalman filters, which can reduce the uncertainty in the total measurement, as well as synthesize input from multiple sensors (A.K.A. "sensor fusion") and provide an uncertainty value for the resulting value.

The uncertainty value assigned to a reading of a sensor can come from many sources. One way is to manually set the uncertainty to a value obtained experimentally from testing the sensor. Another way is to use the value already provided by the sensor and the sensor's accompanying software, which may vary depending upon environmental conditions. An example of this would be a marker recognition program knowing that marker detection is worse under certain lighting conditions, and therefore giving a higher uncertainty value to its measurements when it knows the marker is in less optimal lighting. A third way to set the uncertainty value is to input experimentally derived rules, e.g., "marker recognition is more uncertain in poor lighting", and to have the application calculate the uncertainty value from these rules on the fly. The fourth way is to algorithmically determine the precision of a sensor. This can take the form of a temporary adjustment of uncertainty when a sensor is performing poorly, or of a per-device calculation of how precise a sensor has been so far, or of a shared value using data from all devices with that sensor. This precision can be calculated by how accurate the sensor or program is relative to itself, how accurate it is relative to other sensors or software on the device, and how accurate the sensor's measurements are relative to other device's measurements about the environment. In this case, when a device measures the distance of two points in a COFIG group, not only does the point update its values and their uncertainties, but the device updates the uncertainty values of its sensors as well.

LockAR can use multiple sensor inputs in concert to achieve sensor fusion, which significantly improves positioning accuracy. FIG. 206 illustrates an example of how LockAR utilizes sensor fusion. The MDDs can collect positioning data using various technologies. For instance, a smartphone may collect data from an accelerometer, a gyroscope, a digital compass, a smartphone camera, GNSS satellite, RFID chip, NFC chip, Bluetooth component, WLAN component, cellular network component, COFIG, EGPS, computer vision, structured light, fiducial markers, SLAM, sonar, signal emitters, pedestrian dead reckoning, other geometry sensing technology, and/or a digital TV component. These input data can be cross-compared to improve the positioning accuracy and robustness. For instance, a processing layer (e.g., a Bayesian Network) can combine the sensor input data using sensor fusion to get positioning information that is more accurate than would have been possible by relying on only one technology. This improved positioning information results in better COFIG and EGPS accuracy.

COFIG Groups

Figure 15:
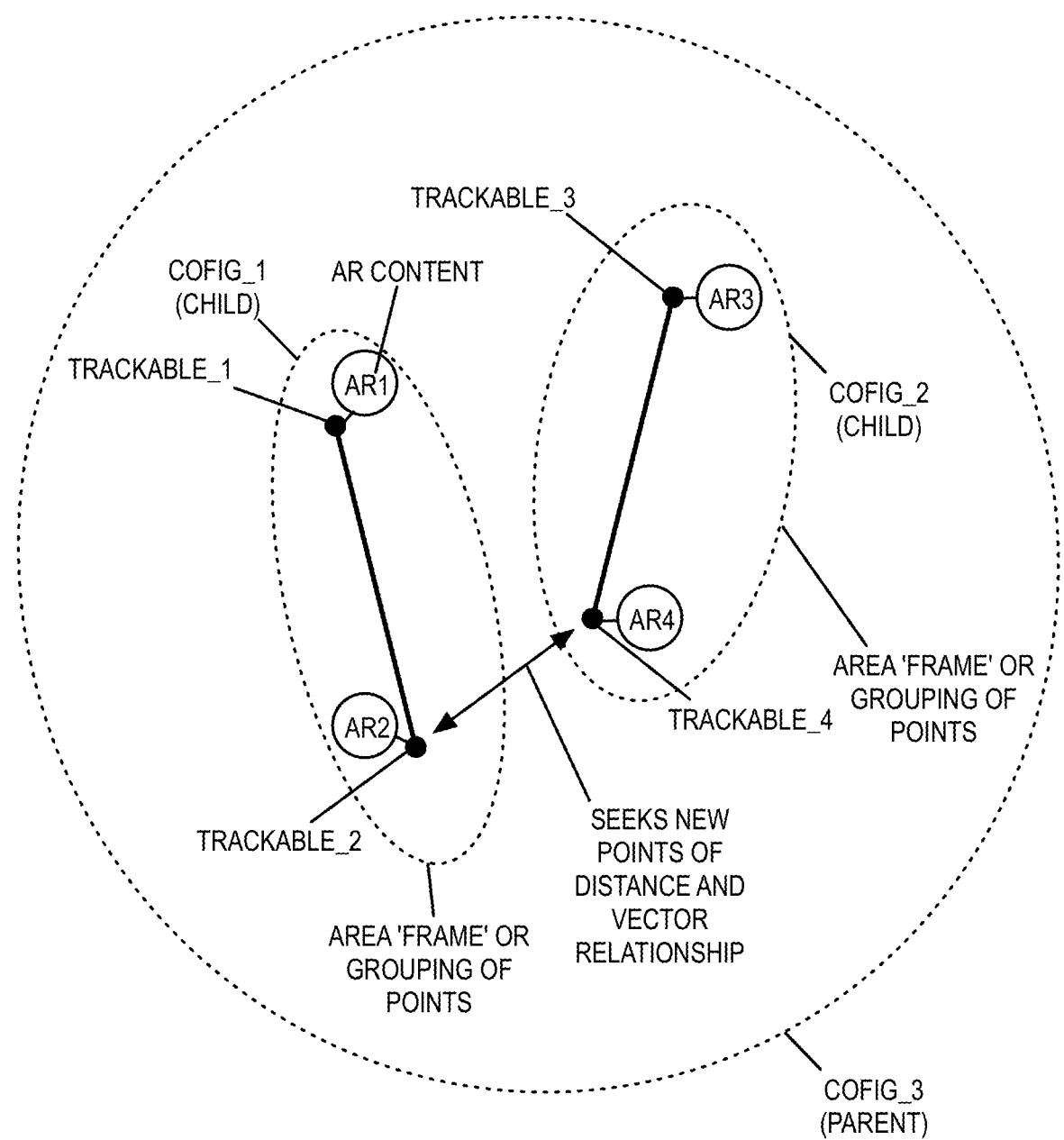
FIG. 15 is a schematic diagram showing how illustrative AR content and Trackables they are tethered to may be gathered into COFIG groups.

FIG. 15 is a diagram showing how AR content items, and the Trackables they are tethered to, may be gathered into COordinate Filter Improvement Groups (COFIGs, or COFIG groups). COFIG groups link Trackables with relative position and direction data. Initially, Trackables may be unconnected. As MDDs traverse the world and view Trackables, the LockAR system adds and compiles the relative position and direction data, and COFIG groups are automatically created. This data initially has a high error component, due to the uncertainty in the measurements, such as GPS signals or pedestrian dead reckoning (PDR). Subsequent measurements made by MDDs incrementally improve quality, e.g., by applying a sifting statistical filter. As additional measurements connect previously unconnected Trackables that already belong to COFIG groups, the COFIG groups are merged into a parent COFIG group. For example, a child COFIG group One and child COFIG group Two merge into parent COFIG group Three.

Figure 16:
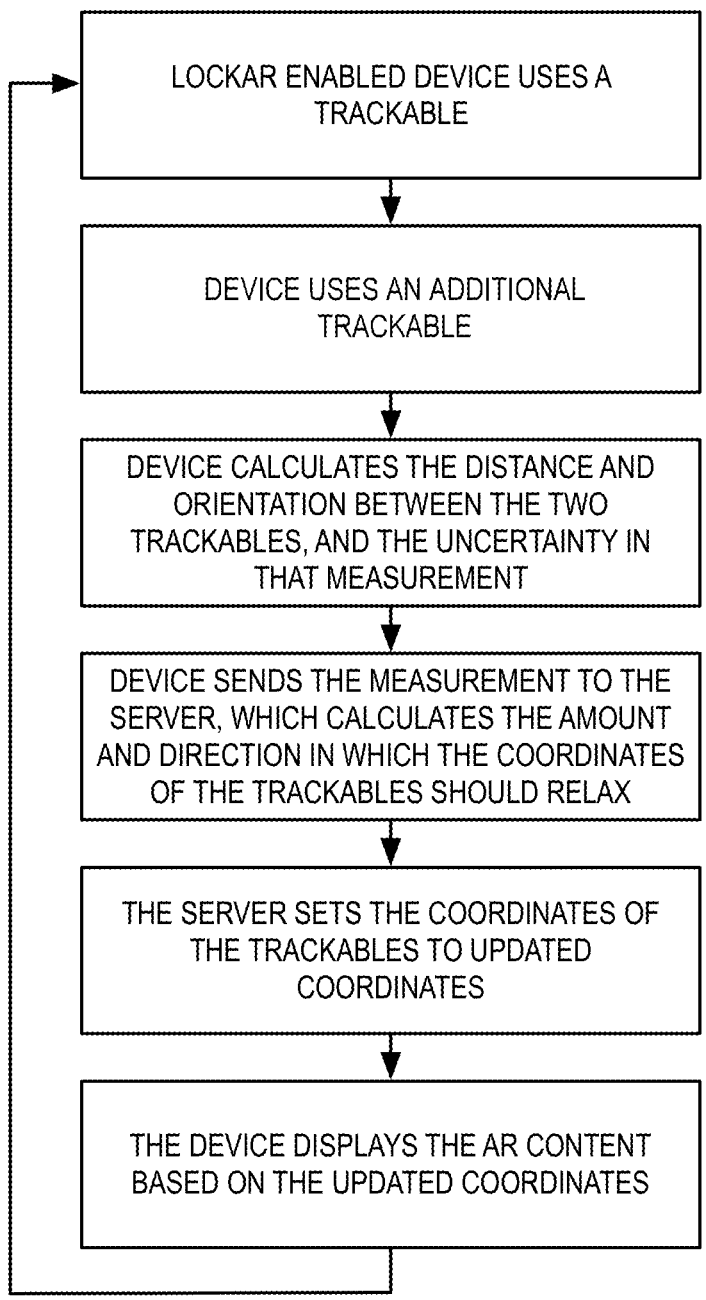
FIG. 16 is a flow diagram showing how an illustrative MDD refines COFIG data to more accurately position AR content.

FIG. 16 is a flow diagram outlining how the MDD may refine COFIG data to more accurately position AR content. When using multiple Trackables to tether AR content, the Trackables can be chosen manually or automatically. If they are chosen automatically, the device chooses the four Trackables whose positions it has the most confidence in. The AR content then stores the Trackables' positions and orientations and uncertainties, relative to itself.

The Trackables relax over time relative to each other in COFIG space, improving the accuracy of their relative positions, as well as the accuracy of their positions in EGPS space. Two points relax relative to each other when a device uses them (e.g., making a measurement of the distance between them based on the estimated distance to each Trackable viewed, as well as the distance travelled between them, as calculated using EGPS and techniques such as PDR.

As the positions of the Trackables relax, the position of the AR content in COFIG and global coordinate space changes. The new COFIG and global coordinates are calculated by taking an average, weighted by uncertainty, of the coordinates the AR content should be at, relative to each of the Trackables it is tethered to individually. This improves the accuracy of the placement of AR content.

Figure 17:
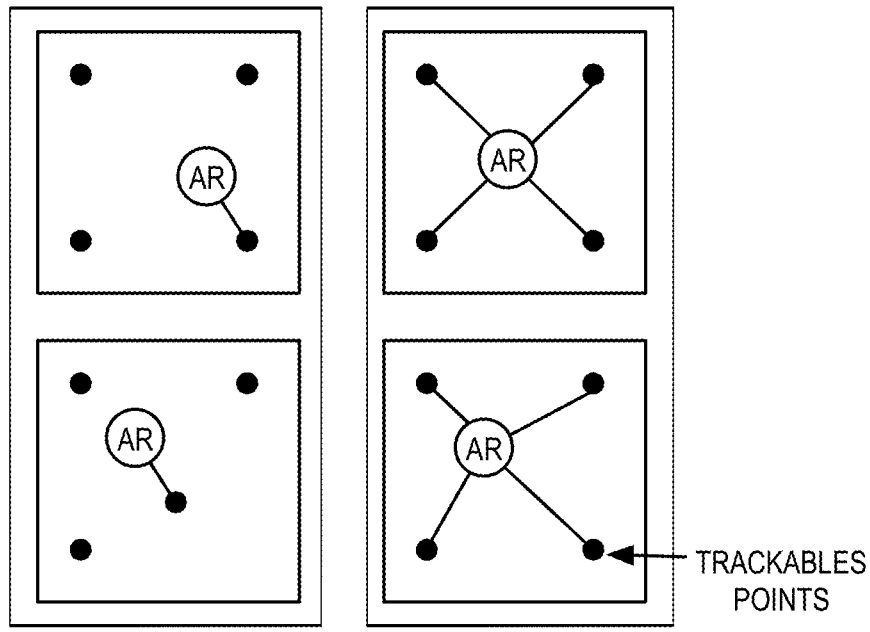
FIG. 17 is a schematic diagram showing how the LockAR system refines illustrative COFIG groups' relative position data.

FIG. 17 shows how the LockAR system refines COFIG groups' relative position data. Each measurement adds a new connection or refines existing one. As a connection is improved, it may also alter some or all connections within the COFIG group. Within a COFIG group all connections are somewhat elastic.

COFIGs are groups that can be composed of both Trackables and other "child" COFIG groups, and store their positions and translations relative to one another in a coordinate system. In COFIG groups that contain Trackables, each Trackable has a COFIG coordinate and orientation assigned to it, with the distance and relative orientation between the COFIG coordinates of two Trackables in the group approximating the distance and relative orientation of those two Trackables in real life. This approximation is the result of the COFIG coordinates of the Trackables relaxing relative to each other over time as devices measure their relative positions. The higher the number of measurements recorded, the higher the accuracy of the relative positioning will be. COFIG groups can also function recursively, containing other child COFIG groups. In this case, the child COFIG groups have COFIG coordinates and orientations (each with uncertainty values) assigned to them. These COFIG coordinates and orientations translate the coordinates and orientations of the elements inside the child COFIG groups, so that the approximate relative positions of these elements can be calculated inside the "parent" COFIG space.

COFIG coordinates and orientations for Trackables are made through relaxation. Initially, when a COFIG group is made, it assumes that the coordinates and orientations of its elements exist in the global frame, which is commonly, though not necessarily, the GPS coordinate system. However, when a device makes a measurement between Trackables that are elements of two different COFIG groups, this changes. If both COFIG groups are not already elements in a larger, parent COFIG group, then they create a new parent COFIG group, which has both of the child COFIG groups as elements, and uses the measured relative position and orientation between the two Trackables to calculate the relative positions and orientations of the two child COFIG groups inside the parent COFIG space. The uncertainty value for these positions and orientations is calculated from the uncertainty values of the positions and orientations of the Trackables inside the child COFIG groups, as well as the uncertainty value of the measurement. One way to do this would be to add the uncertainties for each dimension together, and have those become the uncertainties for each dimension of the position and orientation of the child COFIG groups.

As COFIG groups can be elements of other COFIG groups, it is possible for them to form a hierarchy with a tree-like structure. This hierarchy can have rules for merging COFIG groups, merging the contents of a COFIG group into a higher or lower COFIG group, and re-balancing. Because there is a hierarchy, it is possible for a Trackable inside a child COFIG group to have a measurement taken, giving its relationship to a Trackable inside a different child COFIG group, but within the same "ancestral" COFIG group. Calculating the expected measurement and the uncertainty in that expectation is done by traveling up the tree from each Trackable to its parent COFIG group to that COFIG group's parent COFIG group, and so on; transforming the Trackable's coordinates, orientation, and uncertainty into the parent COFIG group by adding its position, orientation, and uncertainty to the position, orientation, and uncertainty of the child COFIG group it is in. This continues until the two Trackables have their relative positions, orientations, and uncertainties inside their lowest common ancestor COFIG group, where they can be compared.

In the situation above, there are several possible procedures to implement updates to the positional data (the list that follows in not exhaustive). The simplest is to find the lowest common ancestor COFIG group they are both a part of, treat the measurement taken as a measurement between their respective child COFIG groups within that ancestor COFIG group, and update those child COFIG groups' relative positions, orientations, and uncertainties accordingly. For instance, with reference to FIG. 29, the lowest common ancestor COFIG group between Trackables A and B would be COFIG group E.

If a measurement was made between Trackables A and B, COFIG groups C and D would have their positions and orientations changed. A slightly more sophisticated implementation would be to calculate the suggested change to the position, orientation, and uncertainty of both Trackables, and then distribute these changes evenly amongst all COFIG groups in the paths from the Trackables up to, but excluding, the lowest common ancestor COFIG group.

These changes take into account the change in orientation as you go down COFIG levels. An even more sophisticated approach would be to distribute these changes along the paths of COFIG groups weighted according to the inverse of the uncertainty in those COFIG groups, possibly weighting each dimension individually. For instance, in the diagram above, if there was a needed change in the x dimension of +14 for Trackable A, Trackable A had an uncertainty of 5, and COFIG group C had an uncertainty of 2, then their inverses would be 0.2 and 0.5, making their share of change 0.2/0.7 (0.2857 . . . ) and 0.5/0.7 (0.7142) respectively This means that Trackable A's x dimension value would change by +4, and COFIG group C's x dimension value would change by +10, resulting in a total change in Trackable A's x dimension of +14.

Robustness

In order to mitigate the damage from erroneous data, such as data generated from malfunctioning sensors, software bugs, and user hacking; there is a minimal allowed uncertainty. Filters can exist in LockAR implementations, to catch this type of data-generating behavior, such as computational intelligence classifiers and smoothing functions (i.e., Kalman filters and higher order Markov chains). This cannot be relied on to catch all such behavior, and is computationally intensive, so minimum uncertainty parameters for measurements are a reliable, computationally undemanding, secondary measure to improve robustness.

GPS Relaxation

In addition to the relative positions between Trackables given by their COFIG coordinates, each Trackable also has a GPS/global coordinate associated with it at creation, as well as an uncertainty associated with this estimated GPS (EGPS) coordinate. This means that whenever a Trackable is viewed, its EGPS coordinate relaxes a little, reducing it's uncertainty, based on the EGPS coordinate that the viewing device gives it. A Trackable's EGPS coordinate can also relax based on the distance to another Trackable and that Trackable's EGPS coordinates, as measured by a device. This allows for the accuracy of the EGPS position of the Trackable to increase over time, while the COFIG system separately increases the accuracy of the relative positions of Trackables.

Tethering

Virtual objects, such as augmented reality content, can be placed and positioned in the real world by associating or "tethering" them to one or more Trackables. Untethered AR content can also benefit from the LockAR system by using the increased accuracy with which a device can globally position itself. This helps both in placing AR content accurately, as well as in viewing AR content in the right place. Tethering AR content allows the accuracy of its global position to increase over time, as well as the accuracy of COFIG coordinates. The most basic way to tether AR content is for the user to select a Trackable, and to position the AR content relative to it. This tethers the AR content to that specific Trackable, at a specific distance and orientation. As the EGPS and COFIG positions of the Trackable relax, so do the EGPS and COFIG positions of the AR content tethered to it, as the AR content always maintains the same orientation and distance from the Trackable in both EGPS and COFIG space. The uncertainty in the AR content's position in EGPS or COFIG space is derived from combining the uncertainty of the position of the Trackable it is tethered to, to the device's uncertainty in the relative position of that Trackable at the time of content placement. The creation of a tether can happen automatically. For example, if a user creates a piece of AR content and positions it in the world, the device could automatically generate a Trackable from the surrounding environment and tether the AR content to it. Alternatively, the device could look at its current best estimates of positions of nearby Trackables, and automatically choose one of them to be the tethering Trackable, based on various attributes such as, the device's current uncertainty in the Trackable's position, the robustness of that Trackable, and that Trackable's stored uncertainty in its own COFIG position.

It is also possible to tether AR content to multiple Trackables. This has the benefit of increased robustness, so that if there is a problem with any one of the individual Trackables, such as their removal or change, the position of the AR content will still be able to improve and ignore COFIG drift. COFIG drift is when points in a COFIG group become less accurate relative to GPS and to their previous COFIG coordinates, as they become more accurate relative to each other. This can be an issue if a Trackable becomes inactive, as its COFIG coordinates will not change, nor will the calculated COFIG coordinates of AR content tethered to it. This can result in the AR content being displayed incorrectly relative to the real world, because the device's estimate of its position and orientation in COFIG space is incorrect. When AR content is tethered to multiple Trackables, either during creation or editing, it gains estimated position and orientation information about the relationships between itself and the Trackables it is tethered to. This information is based on the device's best guess of the positions of those Trackables, which in turn is based on sensor data, as well as their COFIG positions. This estimated position and orientation information only changes if it is manually edited by a user with the relevant permissions. When the AR content calculates its position in COFIG or global coordinate space, it does so by calculating its estimated position according to each Trackable it is tethered to, and then combining those to get its final estimated position. The estimated positions can be combined in many ways, such as by averaging them, averaging them weighted by their inverse uncertainty, and by merging their Gaussian distributions using an update technique. The process of combining Gaussian distributions begins with an arbitrary estimate as the prior probability, which is then updated using one of the other estimated positions, and the resulting distribution is then updated by combining arbitrary estimated positions with it, until all estimated positions outside of the starting distribution have been used to update. Tethering to multiple Trackables can also occur automatically by algorithmically choosing the Trackables according to the criteria as described above, or manually, by having a user explicitly select or create multiple Trackables.

LockAR Areas

Figure 12:
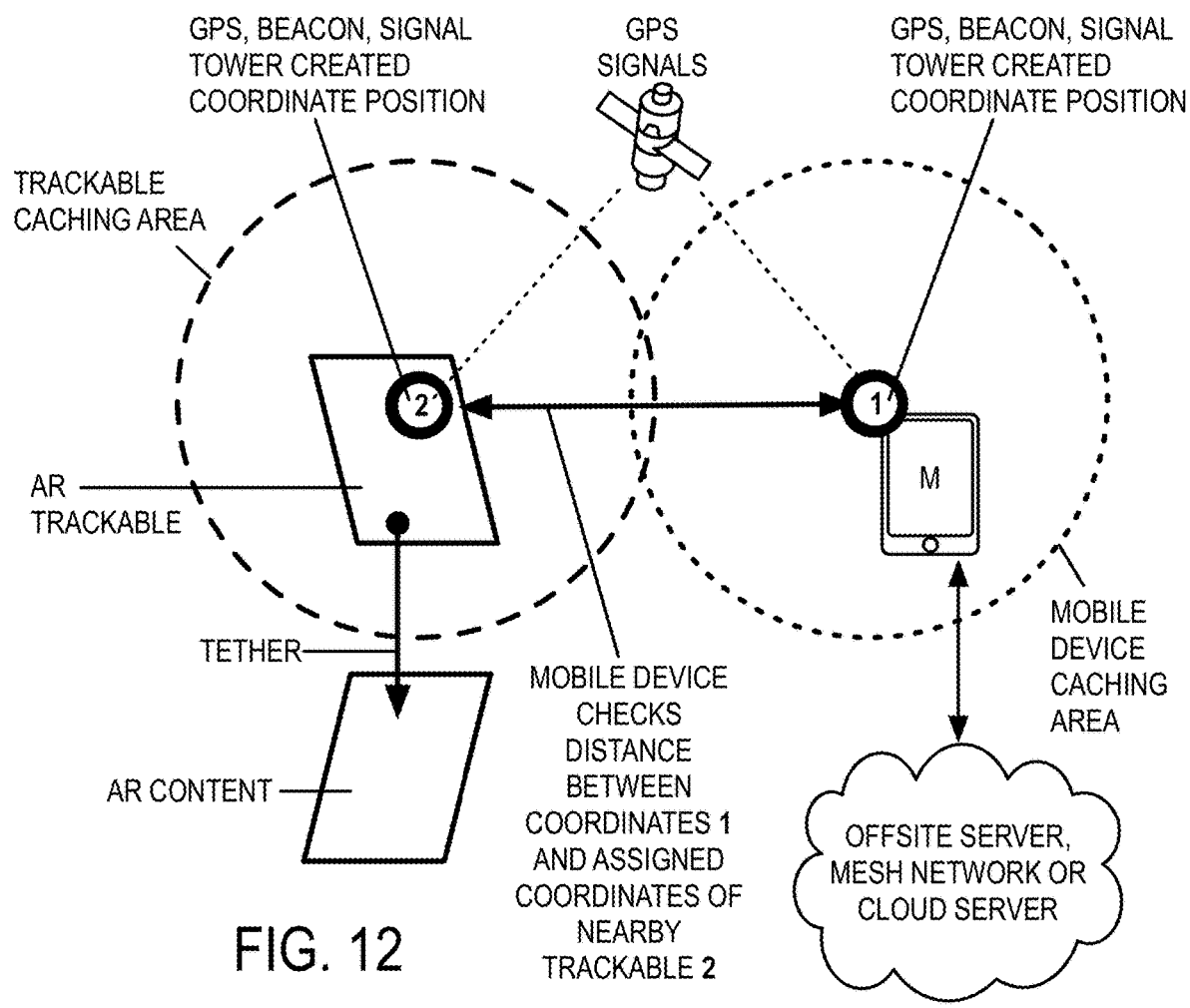
FIG. 12 is a schematic overview diagram showing how an illustrative Mobile Digital Device (MDD) may locate and position AR content using a Trackable Caching Area and a MDD Caching Area to determine when to download content.

FIG. 12 is an overview diagram defining selected terms. It shows how a Mobile Digital Device (MDD) locates and positions AR content. Specifically using a "Trackable Caching Area" and a "MDD Caching Area" to decide when to download content. Positioning of MDD can be done via GPS or similar beacon system.

Figure 13:
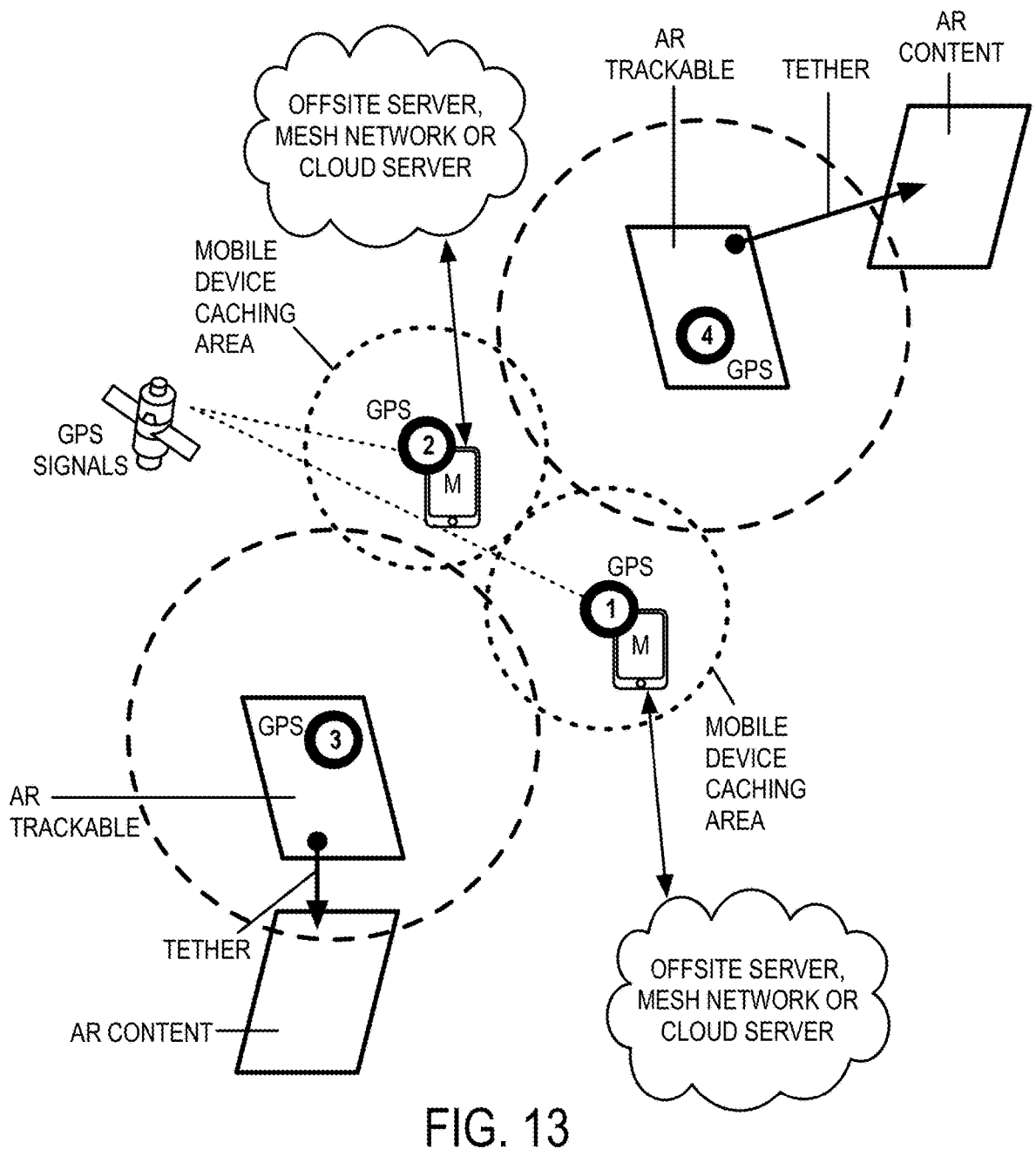
FIG. 13 is a schematic overview diagram expanding the diagram of FIG. 12 to show a case including multiple MDDs and multiple Trackables.

FIG. 13 is an overview diagram expanding on the concept of FIG. 12, to illustrate the case of multiple MDDs and multiple Trackables.

Figure 14:
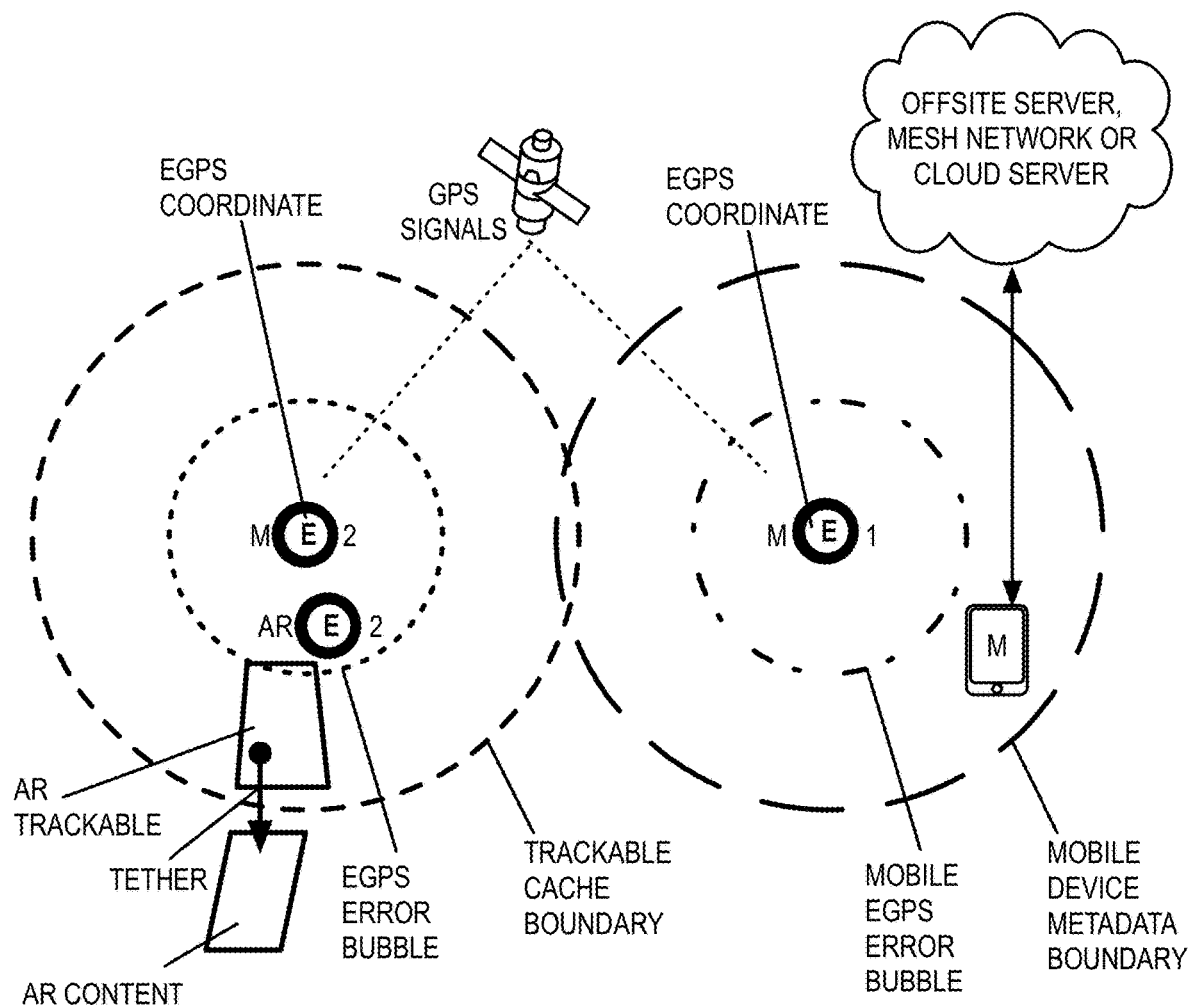
FIG. 14 depicts an illustrative embodiment of the system of FIG. 12, using a MDD Metadata Area rather than a MDD Caching Area.

FIG. 14 shows a specific embodiment of FIG. 12, using a "MDD Metadata Area" rather than a "MDD Caching Area" as well as estimated GPS (EGPS) coordinates and their associated error areas to provide greater positioning accuracy. Note how an MDD is used as an EGPS data source to provide initial position data for the AR content.

One use of LockAR is to position AR content for creation and viewing against the backdrop of the real world, or a virtual representation of the real world. This section is written with regards to AR content, but applies to Trackables as well. As a user moves through the world with a LockAR enabled AR application, the application queries the server and GPS at regular intervals, such as once per minute, as well as querying if the dead reckoning or pedestrian dead reckoning (PDR) from the device's internal motion sensors indicates that the device has moved farther than a set distance from the location where the device last queried the server or GPS. The periods of time and distance for querying the server and the GPS can vary and be tracked independently. It is also possible that they can be manually or algorithmically altered. In addition, the server can send push notifications to the device if new AR content appears within its range. Whenever the server is queried, it checks to see if the device's "meta-data area" intersects with the "meta-data area" of any AR content. When a device's meta-data area intersects with the meta-data area of a piece of AR content, the device downloads the meta-data for that AR content. This meta-data consists of the content's estimated position, as well as its various associated areas (in order: meta-data, caching, viewing, and error) and other meta-data. In one implementation the meta-data area must contain at a minimum, all points that comprise the "caching area" of that device or AR content. When the caching areas of the device and AR content intersect, the device downloads all the data needed to display the AR content, (or use the Trackable) as well as getting updated if that data changes. A large caching area can allow AR content or Trackables to be used in areas where there is no network access available to the device, or used consistently in areas where network access is spotty. In one implementation the caching area must contain at a minimum, all points that comprise the "viewing area" of that device or AR content. When the viewing areas of the device and AR content intersect, the device begins to display the AR content (or actively seek out the Trackable). In one implementation the viewing area must contain at a minimum, all points that comprise the "error area" of that device or AR content. In some implementations the metadata area will not need to contain all points in the caching area, the caching area will not need to include all the points in the viewing area, and or the viewing area will not need to include all of the points of the error area.

The error area is a sphere (or ellipsoid) with a radius (or semi-axes) calculated from the uncertainty in position of the device or AR content. This calculation is done by setting a level of confidence in the position of the device or AR content, which is expressed as a percentage, such as a 99% certainty, that the mobile device is within this distance of its estimated position. Using this desired level of confidence, together with the uncertainty value, it is trivial to calculate the radius (or semi-axes) of the error area. The length of the error radius (or semi-axis) is equal to the length of the radius of a sphere centered on the estimated position, that it is certain the device is within, to a set confidence percentage. For example, if a mobile device has its confidence level set to 99%, with an uncertainty (represented as a standard deviation) in its GPS position of 10 meters, then the radius of the error area will be 25.76 meters Meta-data, caching, and viewing areas are defined areas of arbitrary shape and size surrounding a mobile device or an instance of AR content. The device uses global coordinates, as well as COFIG coordinates if possible. If the device's area intersects with the AR content's area in either global or COFIG space, the area's effects are triggered. There is no explicit event which occurs when the device's error area intersects with the AR content's error area.

Implementations of this technology do not need to define all the areas explicitly. A device explicitly defining "subset" of the areas functions identically to a device explicitly defining all the areas, but implicitly defines the explicitly undefined areas to be their minimum allowed size. For instance, if a Trackable and a device only use error areas, when the Trackable's error area intersects with the device's error area, all the events (meta-data download, cache download, and viewing) will occur. These areas can be manually or algorithmically created, and can be dynamic or static, though they always use the device's, Trackable's, or AR content's coordinates as their origin point. For instance, one implementation could be having areas be spheres, defined by a distance, with the radius of each area being the radius of its minimum allowed size, plus the distance that defines it. This implementation has very fast intersection checking.

Mobile Position Orientation Points (MPOPs)

Figure 18:
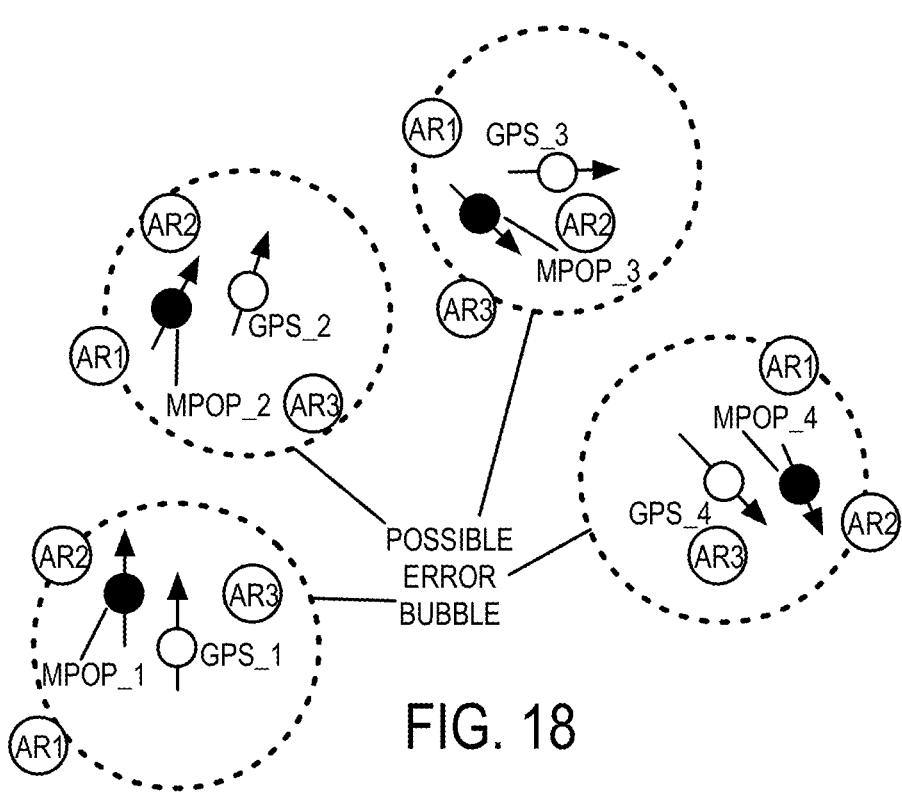
FIG. 18 is a schematic overview of mobile position orienting points MPOPs.

FIG. 18 is an overview of mobile position orientation points (MPOPs), a method of associating a COFIG group to a moving position (e.g., within a moving environment). FIG. 18 shows details on how MPOP data is gathered and distributed, and how they can be used to properly align and orient Trackables and the associated AR content that move positions. It shows how an MPOP takes into account EGPS coordinates, as well as Error Areas when used to position AR content.

An MPOP is a type of top-tier COFIG group that gives GPS coordinates to its descendent Trackables, by using one or more GPS beacons as reference points. This allows Trackables and their associated surrounding Areas to be created and used, even if the Trackable is located on, or is itself, a moving object.

The MPOP can use a layer of filtering and predictive processing to increase the accuracy of, and decrease the uncertainty in, its EGPS position.

When the MPOP assigns EGPS coordinates to a Trackable, those EGPS coordinates have uncertainty equal to the MPOP's uncertainty, plus the Trackable's uncertainty in its position an in MPOP space. This allows the Error Areas of Trackables in an MPOP to increase and decrease dynamically in response to events that alter the MPOP's uncertainty in its EGPS position, such as the GPS being temporarily offline, or other malfunctions.

FIG. 18 shows an MPOP and three Trackables associated to it, at four different points in time. At each of these points, the figure shows the EGPS position and direction of the MPOP, the GPS position and direction from the GPS beacon, the EGPS positions of the three associated Trackables, and the uncertainty in the MPOP's EGPS position visualized as an error area.

MPOPs facilitate mobile LockAR. With MPOPs, moving Trackables can be positioned in global space, as well as in COFIG space, allowing them work with the rest of LockAR. MPOPs share many similarities to COFIG groups, but there are three key differences. Firstly, MPOPs cannot be contained within COFIG groups. Secondly, MPOPs are intentionally created; and all of the Trackables that exist inside them have been intentionally designated to be there. MPOP coordinates can be manually assigned to Trackables, or automatically generated by taking the estimated global coordinates of the Trackable, and using the inverse of the MPOPs current conversion factor, converting the global coordinates to MPOP coordinates. Even after creation, the MPOP coordinates of Trackables can improve, by using their estimated global coordinates as they're tracked, as well as the MPOP coordinates of other Trackables when a measurement is taken between them, similar to the how EGPS is improved. All of the COFIG groups that are created based on those Trackables are automatically added to the MPOP as well. These COFIG groups cannot contain Trackables that are outside of the MPOP. Thirdly, MPOPs have a dynamic conversion factor between their coordinates and orientations and one or more global coordinate systems (such as GPS). This dynamic conversion factor is based on a set conversion factor between the MPOP coordinates and orientations and one or more global coordinate sources, such as GPS enabled smart phones or ship navigational systems like GNSS and LORAN. Essentially, the Trackables within MPOPs have their GPS coordinates assigned to them by the MPOP, as the MPOP knows where they are in relation to a GPS located beacon. This allows even mobile Trackables to be given GPS coordinates, and to know which other Trackables they can build COFIG groups with. There can be a layer of processing between the global coordinate sources and the MPOP coordinate space, where the direction of the object can be extracted by taking the derivative of the position, as well as applying smoothing and predictive processing (by use of Kalman filters, etc), in order to more accurately estimate the position of the MPOP. However, even after this processing, there is still uncertainty in the MPOP's global coordinates. When the MPOP assigns global coordinates to a Trackable, those global coordinates have an uncertainty equal to, the MPOP's uncertainty plus the Trackable's uncertainty in its position in MPOP coordinates. In addition to Trackables, MPOPs can also contain COFIG groups as their children.

Figure 19:
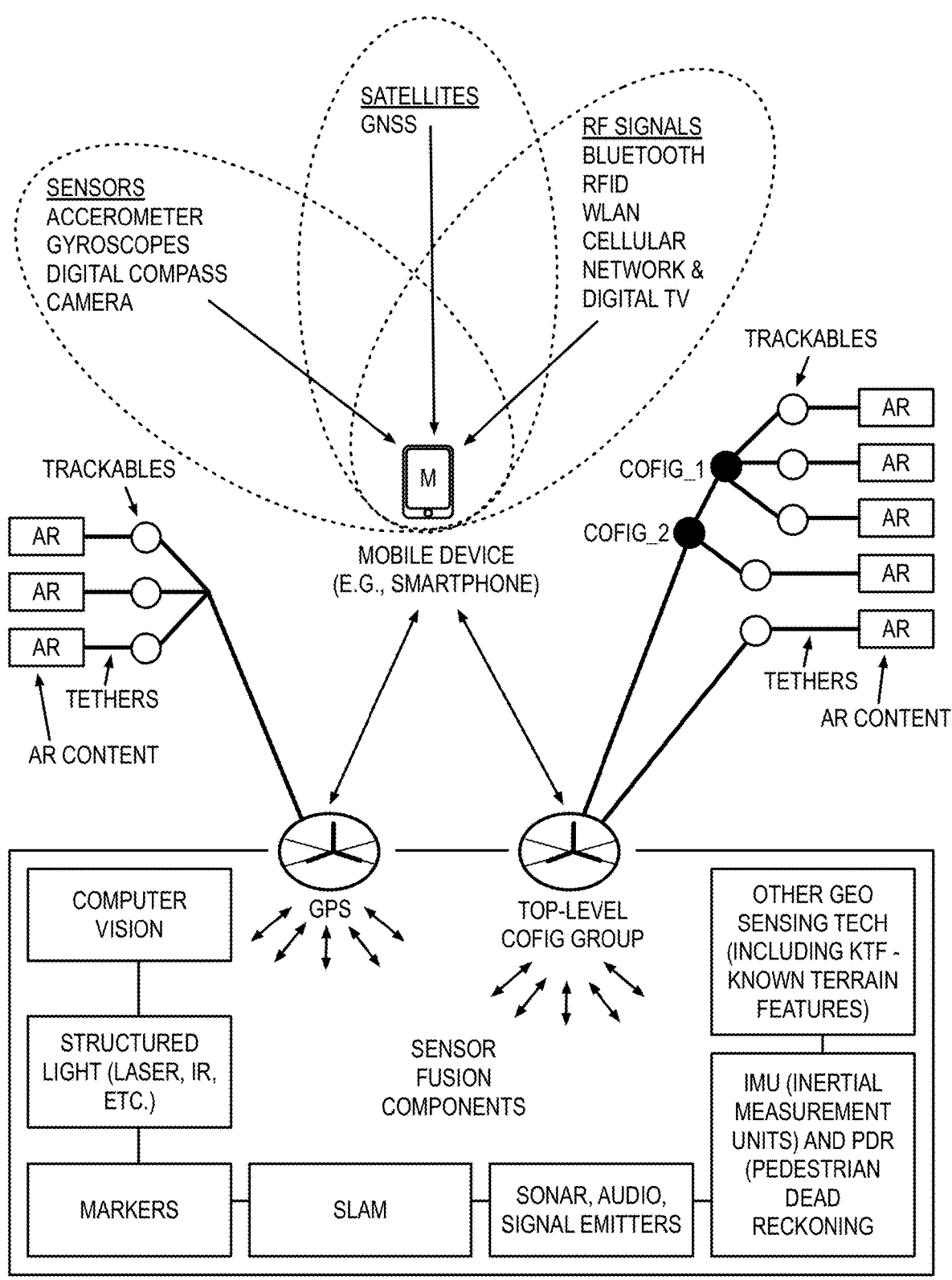
FIG. 19 is a schematic diagram showing how LockAR uses a myriad of illustrative sensors in concert to achieve sensor fusion.

FIG. 19 is a diagram showing how LockAR uses a myriad of sensors in concert to achieve sensor fusion. It shows how various inputs and input types can be used with one another, and cross-compared to achieve an accurate understanding of its location, from which Trackables can be placed and followed, allowing for the accurate positioning and orientation for AR content.

Figure 20A:
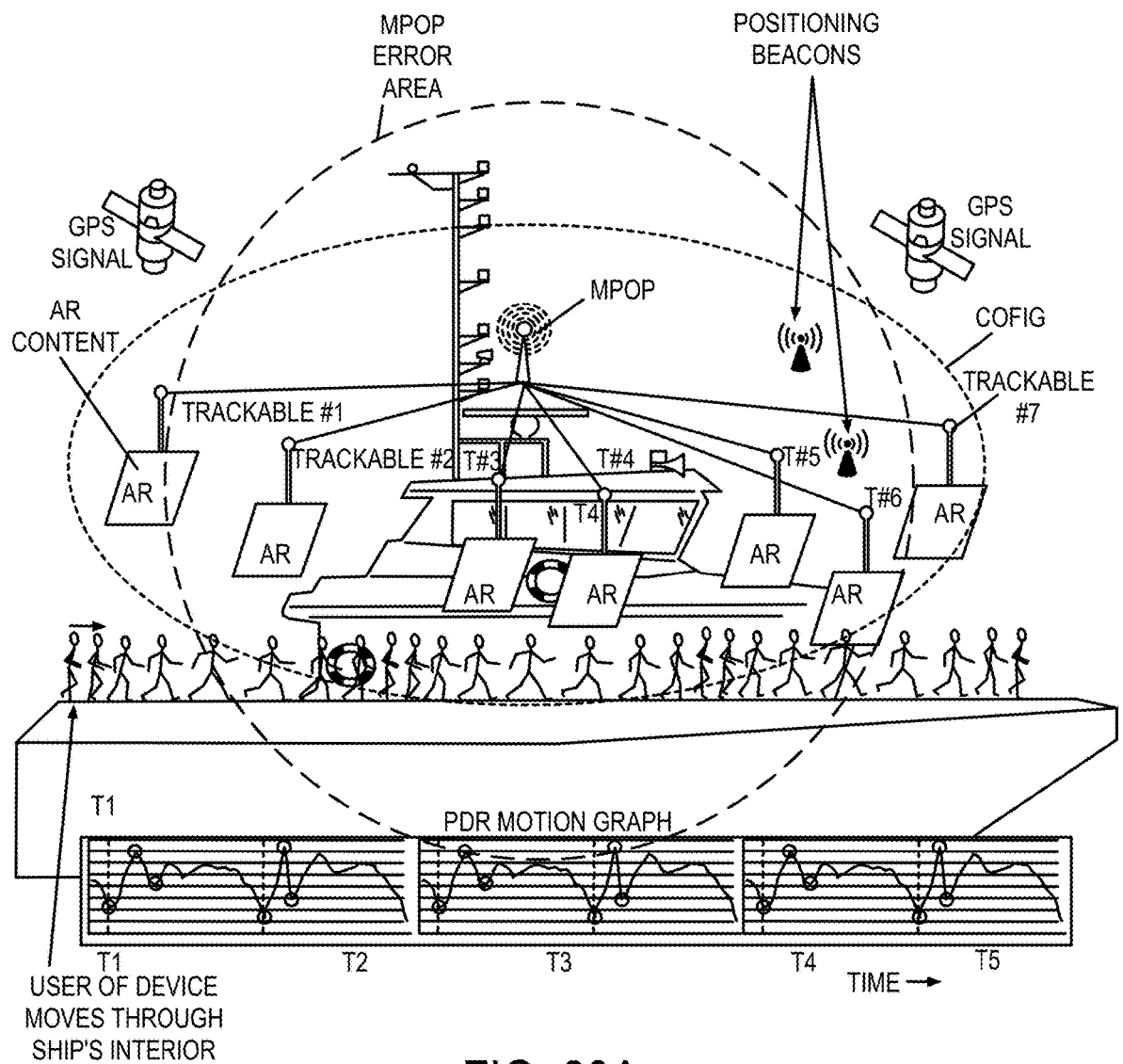
FIG. 20A-20B is a schematic diagram showing a complex illustrative use case of multiple pieces of AR content in a COFIG group, being displayed to a user moving through the space.
Figure 20B:
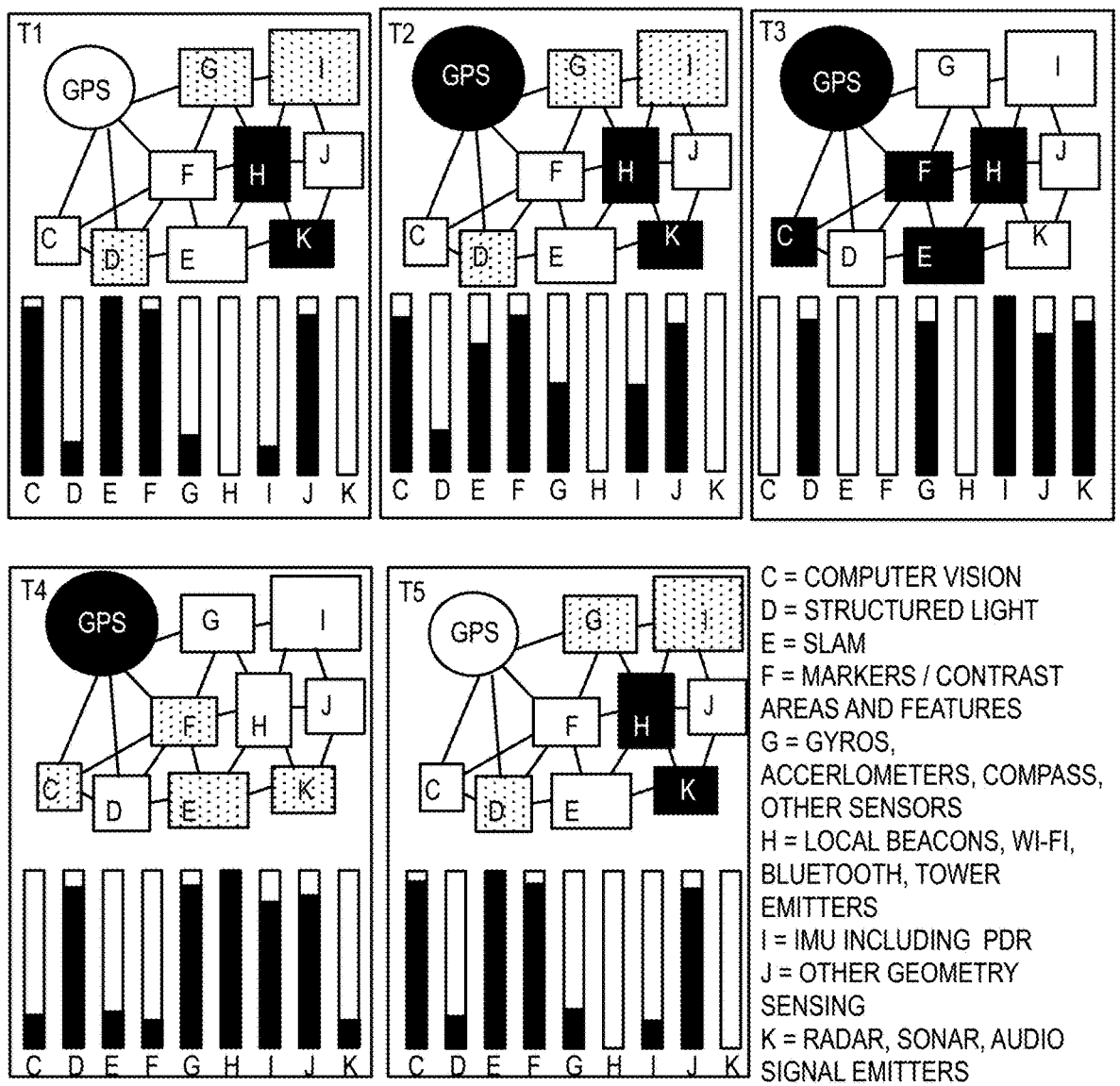

FIG. 20A-20B collectively form a diagram showing a complex use case of multiple pieces of AR content in a COFIG group, being displayed to a user moving through the space. It also shows how LockAR uses a multitude of sensors and their associated measurements to accurately position this AR content, and how the overall sensor matrix adapts to the given environment. It also shows how an MPOP can be used to align the COFIG group containing the Trackables tethered to AR content with a moving object, in this case a ship.

Figure 21:
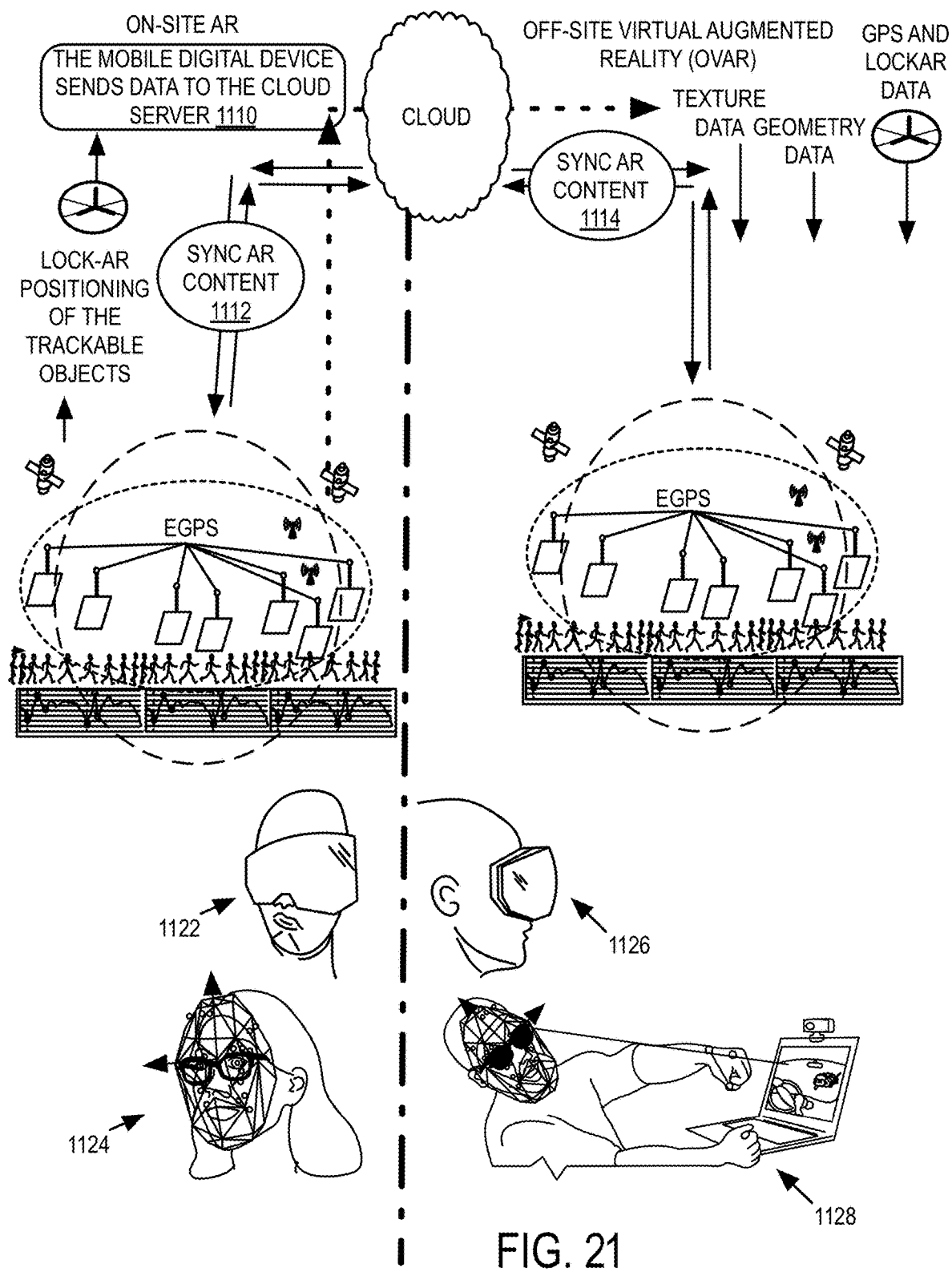
FIG. 21 is a schematic diagram that shows an illustrative system in which LockAR integrates with ovAR, in accordance with aspects of the present disclosure.

FIG. 21 is a diagram that shows how LockAR integrates with ovAR to create and enhance location and positional data in a virtual space, aligning it as close as possible to the on-site experience. It also indicates possible off-site digital devices (OSDDs), as well as alternate methods of input, both on-site and off-site, for the AR application.

A core utility of LockAR lies in using COFIG groups and uncertainty values to create an increasing web of accurately positioned Trackables, in its rules governing the evolution of the COFIG hierarchy, and its uncertainty updates techniques. The web can reach a global size, and its uses are many and varied. The most obvious use, which is discussed in the document above, is in augmented reality to correctly position AR content and users. Other examples of how it could be used include: to produce a geographical representation of an area (when used in concert with other technologies), to create an enhanced GPS system, or as mapping and navigational assistance for robots. The basic functionality could also be extended to map arbitrary n-dimensional data-sets, which opens up the potential for use in data-mining applications as well as machine learning and reinforcement learning possibilities. In addition to this core utility, LockAR has additional features to incorporate moving objects, raise robustness, and improve even more on the AR use case.

IV. Offsite Virtual Augmented Reality (ovAR)

Figure 30:
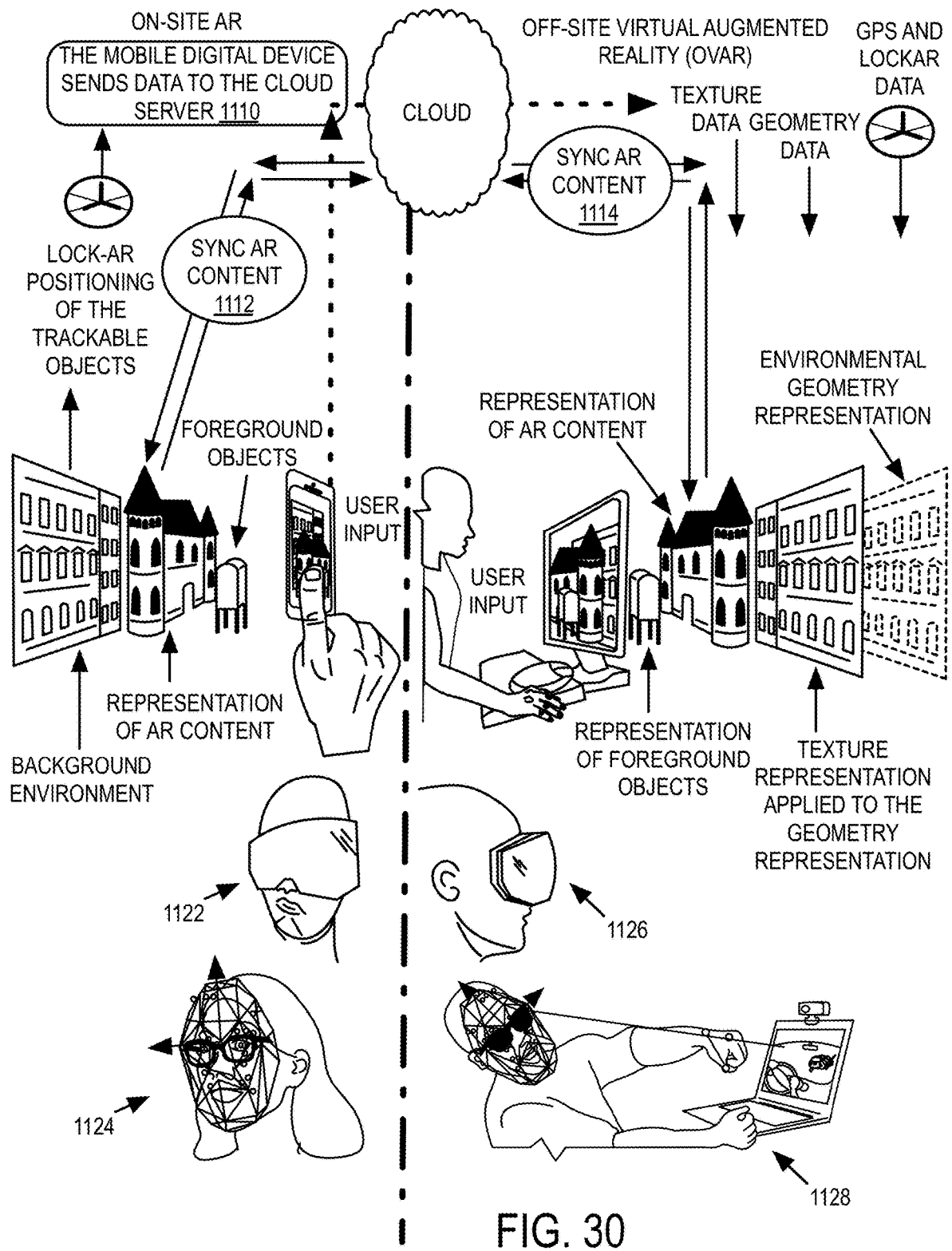
FIG. 30 is a flow diagram showing a mechanism for creating an offsite virtual augmented reality (ovAR) representation for an offsite device, according to an embodiment of the invention.

FIG. 30 is a flow diagram showing a mechanism for creating a virtual representation of onsite augmented reality for an offsite device (ovAR). As FIG. 30 illustrates, the onsite device (e.g., an MDD) sends data, which may include the positions, geometry, and bitmap image data of the objects of the real-world scene, to the offsite device (e.g., an OSDD). The onsite device also sends data (e.g., positions, geometry, and/or bitmap image data) relating to the other real-world objects it sees, including foreground objects, to the offsite device. For example, as indicated at 1110, the mobile digital device (MDD) sends data to the cloud server. This data may include geometry data acquired using methods such as SLAM or structured light sensors, texture data, and/or LockAR positioning data (e.g., calculated from GPS, PDR, gyroscope, compass, and accelerometer data), among other sensor measurements. As also indicated at 1112, AR content is synchronized at or by the onsite device by dynamically receiving and sending edits and new content. This information about the environment enables the offsite device to create a VR representation (i.e., ovAR) of the real-world locations and scenes. For example, as indicated at 1114, AR content is synchronized at or by the offsite device by dynamically receiving and sending edits and new content.

When the onsite device detects a user input to add a piece of augmented reality content (e.g., an AR object or item) to the scene, it sends a message to the server system, which distributes this message to the offsite devices. The onsite device further sends position, geometry, and bitmap image data of the AR content to the offsite devices. The illustrated offsite device updates its ovAR scene to include the new AR content. The offsite device dynamically determines the occlusions between the background environment, the foreground objects and the AR content, based on the relative positions and geometry of these elements in the virtual scene. The offsite device can further alter and change the AR content and synchronize the changes with the onsite device. Alternatively, the change to the augmented reality on the onsite device can be sent to the offsite device asynchronously. For example, when the onsite device cannot connect to a good Wi-Fi network or has poor cell phone signal reception, the onsite device can send the change data later when the onsite device has a better network connection.

The onsite and offsite devices can be, e.g., heads-up display devices or other AR/VR devices with the ability to convey the AR scene, as well as more traditional computing devices, such as desktop computers. In some embodiments, the devices can transmit user "perceptual computing" input (such as facial expression and gestures) to other devices, as well as use it as an input scheme (e.g. replacing or supplementing a mouse and keyboard), possibly controlling an avatar's expression or movements to mimic the user's. The other devices can display this avatar and the change in its facial expression or gestures in response to the "perceptual computing" data. As indicated at 1122, possible other mobile digital devices (MDDs) include, but are not limited to, camera enabled VR devices and heads up display (HUD) devices. As indicated at 1126, possible other offsite digital devices (OSDDs) include, but are not limited to, VR devices and heads up display (HUD) devices. As indicated at 1124, various digital devices, sensors, and technologies, such as perceptual computing and gestural interfaces, can be used to provide input to the AR application. The application can use these inputs to alter or control AR content and avatars, in a way that is visible to all users. As indicated at 1126, various digital devices, sensors, and technologies, such as perceptual computing and gestural interfaces, can also be used to provide input to ovAR.

The ovAR simulation on the offsite device does not have to be based on static predetermined geometry, textures, data, and GPS data of the location. The onsite device can share the information about the real-world location in real time. For example, the onsite device can scan the geometry and positions of the elements of the real-world location in real time, and transmit the changes in the textures or geometry to offsite devices in real time or asynchronously. Based on the real-time data of the location, the offsite device can simulate a dynamic ovAR in real time. For example, if the real-world location includes moving people and objects, these dynamic changes at the location can also be incorporated as part of the ovAR simulation of the scene for the offsite user to experience and interact with including the ability to add (or edit) AR content such as sounds, animations, images, and other content created on the offsite device. These dynamic changes can affect the positions of objects and therefore the occlusion order when they are rendered. This allows AR content in both onsite and offsite applications to interact (visually and otherwise) with real-world objects in real time.

Figure 31A:
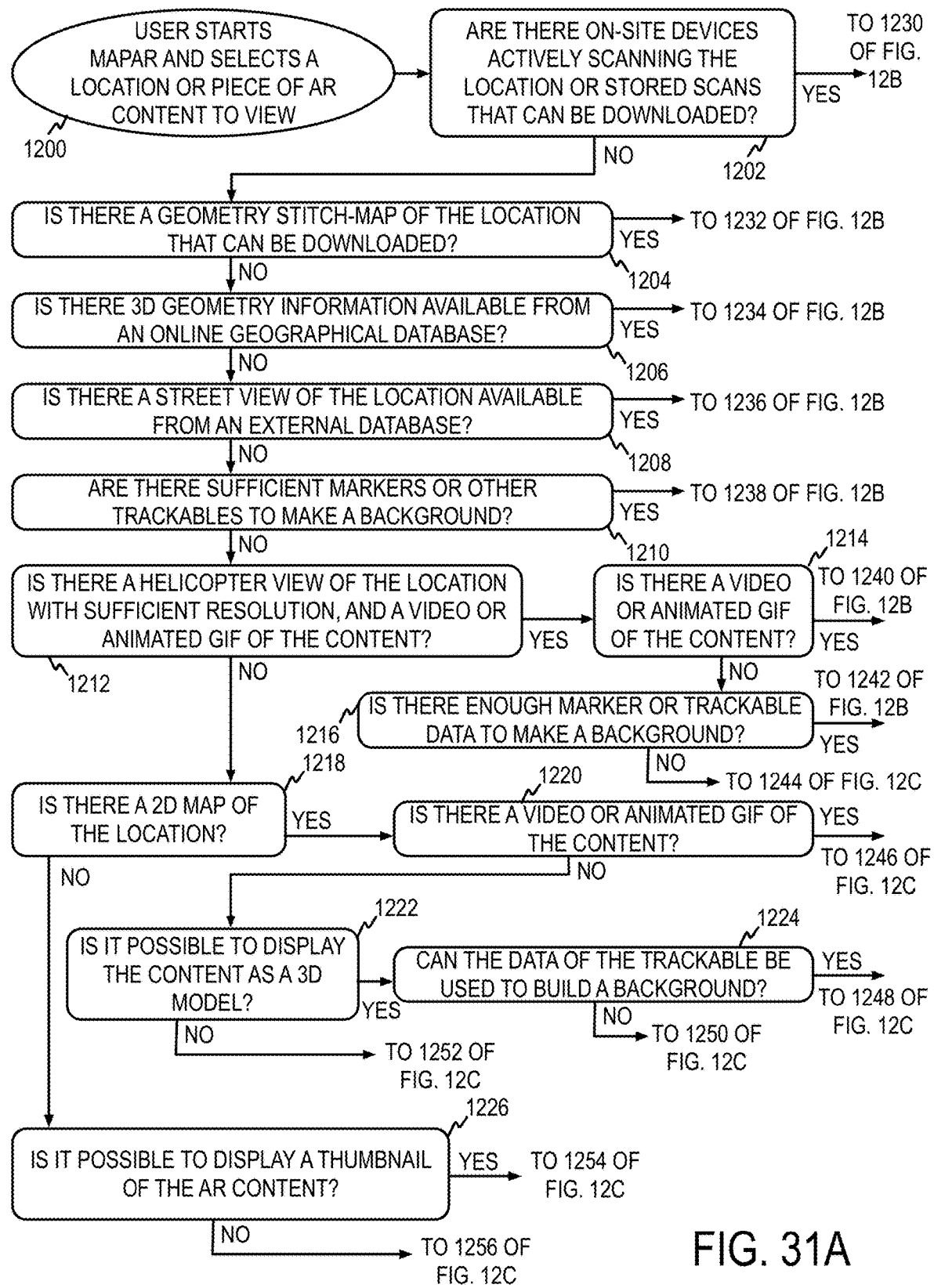
Figure 31B:
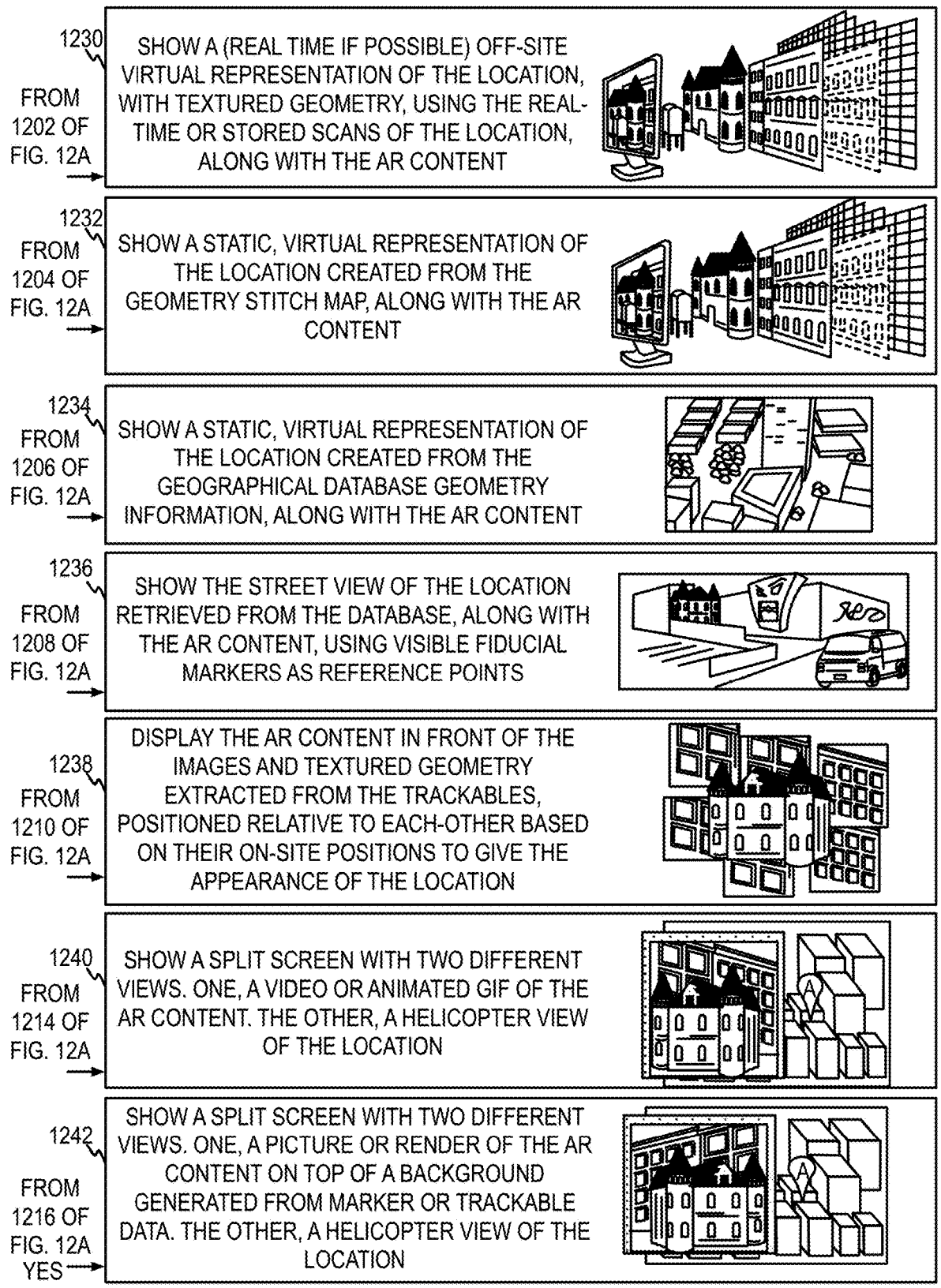

FIGS. 31A, 31B, and 31C depict a flow diagram showing a process of deciding the level of geometry simulation for an offsite virtual augmented reality (ovAR) scene. The offsite device can determine the level of geometry simulation based on various factors. The factors can include, e.g., the data transmission bandwidth between the offsite device and the onsite device, the computing capacity of the offsite device, the available data regarding the real-world location and AR content, etc. Additional factors can include stored or dynamic environmental data, e.g., scanning and geometry creation abilities of onsite devices, availability of existing geometry data and image maps, offsite data and data creation capabilities, user uploads, as well as user inputs, and use of any mobile device or offsite systems.

As FIGS. 31A, 31B, and 31C illustrate, the offsite device looks for the highest fidelity choice possible by evaluating the feasibility of its options, starting with the highest fidelity and working its way down. While going through the hierarchy of locating methods, which to use will be partially determined by the availability of useful data about a location for each method, as well as whether a method is the best way to display the AR content on the user's device. For example, if the AR content is too small, the application will be less likely to use Google Earth, or if the AR marker can't be "seen" from street view, the system or application would use a different method. Whatever option it chooses, ovAR synchronizes AR content with other onsite and offsite devices so that if a piece of viewed AR content changes, the offsite ovAR application will change what it displays as well.

At 1200, a user may start an application configured to present a digital map overview of an area, e.g., with indicators showing positions of AR content. This application may be referred to herein as MapAR. Through an interface of the application, the user may select a location or a piece of AR content to view. At 1202, the offsite device first determines whether there are any onsite devices actively scanning the location, or if there are stored scans of the location that can be streamed, downloaded or accessed by the offsite device. If so, at 1230, the offsite device creates and displays a real-time virtual representation of the location, using data about the background environment and other data available about the location including the data about foreground objects, AR content, and displays it to the user. In this situation, any onsite geometry change can be synchronized in real time with the offsite device. The offsite device would detect and render occlusion and interaction of the AR content with the object and environmental geometry of the real-world location.

If there are no onsite devices actively scanning the location, at 1204, the offsite device next determines whether there is a geometry stitch map of the location that can be downloaded. If so, at 1232, the offsite device creates and displays a static virtual representation of the location using the geometry stitch map, along with the dynamic AR content. Otherwise, at 1206, the offsite device continues evaluating, and determines whether there is any 3D geometry information for the location from any source such as an online geographical database (e.g., GOOGLE EARTH™). If so, at 1234, the offsite device retrieves the 3D geometry from the geographical database and uses it to create the simulated AR scene, and then incorporates the proper AR content into it. For instance, point cloud information about a real world location could be determined by cross referencing satellite mapping imagery and data, street view imagery and data, and depth information from trusted sources, or by using photogrammetry techniques applied to photographic images that have sufficient parallax taken at the location. Using the point cloud created by this method, a user could position AR content, such as images, objects, or sounds, relative to the actual geometry of the location. This point cloud could, for instance, represent the rough geometry of a structure, such as a user's home. The AR application could then provide tools to allow users to accurately decorate the location with AR content. This decorated location could then be shared, allowing some or all onsite devices and offsite devices to view and interact with the decorations.

If at a specific location this method proves too unreliable to be used to place AR content or to create an ovAR scene, or if the geometry or point cloud information is not available, the offsite device continues, and determines, at 1208, whether a street view of the location is available from an external map database (e.g., GOOGLE MAPS™). If so, at 1236, the offsite device displays a street view of the location retrieved from the map database, along with the AR content. If there is a recognizable fiducial marker available, the offsite device displays the AR content associated with the marker in the proper position in relation to the marker, as well as using the fiducial marker as a reference point to increase the accuracy of the positioning of the other displayed pieces of AR content.

If a street view of the location is not available or is unsuitable for displaying the content, then the offsite device determines, at 1210, whether there are sufficient markers or other Trackables around the AR content to make a background out of them. If so, at 1238, the offsite device displays the AR content in front of images and textured geometry extracted from the Trackables, positioned relative to each other based on their onsite positions to give the appearance of the location.

Otherwise, at 1212, the offsite device determines whether there is a helicopter view of the location with sufficient resolution from an online geographical or map database (e.g., GOOGLE EARTH™ or GOOGLE MAPS™). If so, at 1240, the offsite device shows a split screen with two different views, in one area of the screen, a representation of the AR content, and in the other area of the screen, a helicopter view of the location. The representation of the AR content in one area of the screen can take the form of a video or animated gif of the AR content if there is such a video or animation is available, as determined at 1214; otherwise, the representation can use the data from a marker or another type of Trackable to create a background, and show a picture or render of the AR content on top of it at 1242. If there are no markers or other Trackables available, as determined at 1216, the offsite device can show a picture of the AR data or content at 1244 within a balloon which is pointing to the location of the content, on top of the helicopter view of the location.

If there is not a helicopter view with sufficient resolution, the offsite device determines if, at 1218, there is a 2D map of the location and a video or animation (e.g., GIF animation) of the AR content, as determined at 1220, the offsite device shows the video or animation of the AR content over the 2D map of the location at 1246. If there is not a video or animation of the AR content, the offsite device determines whether it is possible to display the content as a 3D model on the device at 1222, and if so, whether it can use data from Trackables to build a background or environment at 1224. If so, it displays a 3D, interactive model of the AR content over a background made from the Trackable's data, on top of the 2D map of the location at 1248. If it is not possible to make a background from the Trackable's data, it simply displays a 3D model of the AR content over a 2D map of the location at 1250. Otherwise, if a 3D model of the AR content cannot be displayed on the user's device for any reason, the offsite device determines, at 1222, whether there is a thumbnail view of the AR content. If so, the offsite device shows the thumbnail of the AR content over the 2D map of the location at 1252. If there is not a 2D map of the location, the device simply displays a thumbnail of the AR content at 1254 if possible as determined at 1226. And if that is not possible, it displays an error informing the user that the AR content cannot be displayed on their device at 1256.

Even at the lowest level of ovAR representation, the user of the offsite device can change the content of the AR event. The change will be synchronized with other participating devices including the onsite device(s). It should be noted that "participating" in an AR event can be as simple as viewing the AR content in conjunction with a real world location or a simulation of a real world location, and that "participating" does not require that a user has or uses editing or interaction privileges.

The offsite device can make the decision regarding the level of geometry simulation for an offsite virtual augmented reality (ovAR) automatically (as detailed above) or based on a user's selection. For example, a user can choose to view a lower/simpler level of simulation of the ovAR if they wish.

V. Platform for an Augmented Reality Sharing Ecosystem

Systems disclosed herein may include a platform, a common structure, and/or a pipeline that allows multiple creative ideas and creative events to co-exist at once. As a common platform, the system may be part of a larger AR ecosystem. The system may provide an API interface for any user to programmatically manage and control AR events and scenes within the ecosystem. In addition, the system may provide a higher level interface to graphically manage and control AR events and scenes. The multiple different AR events can run simultaneously on a single user's device, and multiple different programs can access and use the ecosystem at once. Examples of AR platforms and aspects thereof that may be suitable for use with systems and methods of the present disclosure are described in U.S. Provisional Patent Application No. 62/371,750, the entirety of which is incorporated herein by reference.

VI. Exemplary Digital Data Processing Apparatus

Figure 32:
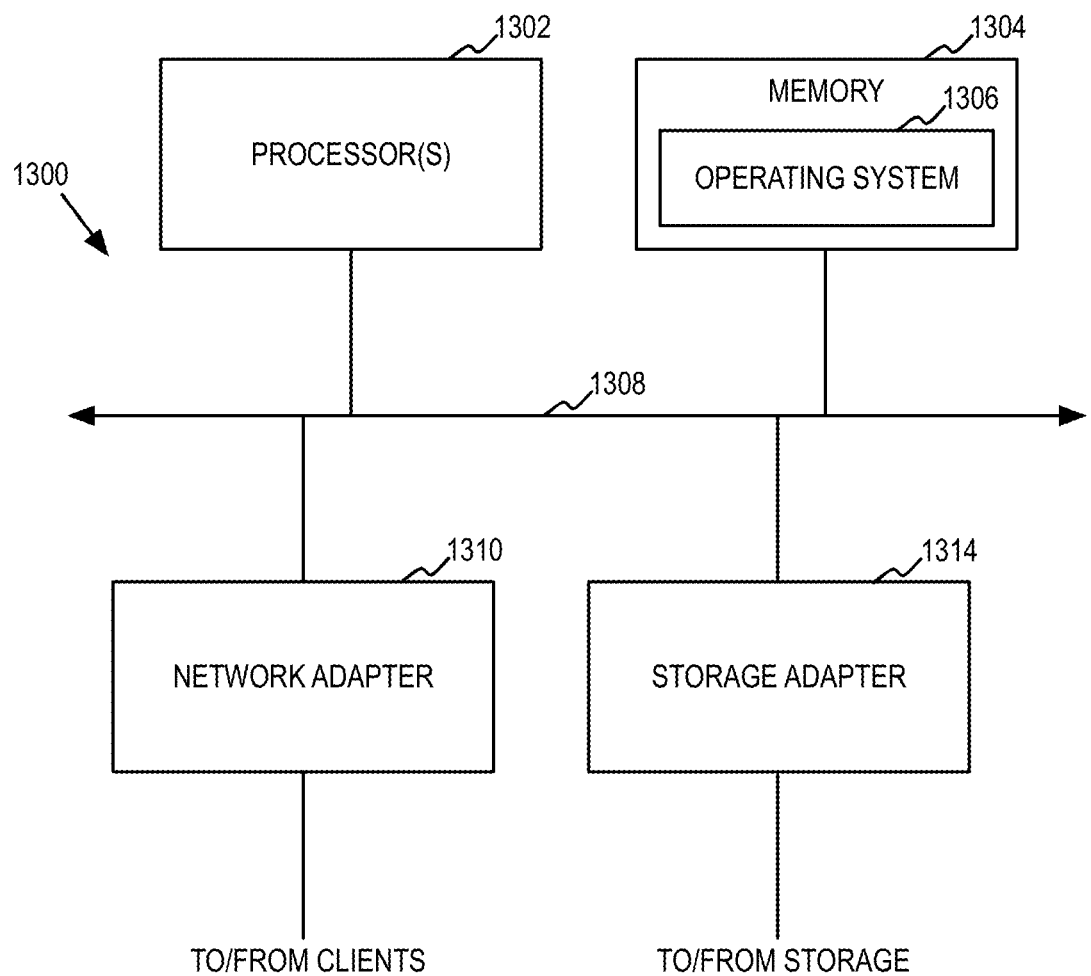
FIG. 32 is a block schematic diagram of a digital data processing apparatus, according to an embodiment of the invention.

FIG. 32 is a high-level block diagram illustrating an example of hardware architecture of a computing device 1300 that performs attribute classification or recognition, in various embodiments. The computing device 1300 executes some or all of the processor executable process steps that are described below in detail. In various embodiments, the computing device 1300 includes a processor subsystem that includes one or more processors 1302. Processor 1302 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 1300 can further include a memory 1304, a network adapter 1310 and a storage adapter 1314, all interconnected by an interconnect 1308. Interconnect 1308 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The computing device 1300 can be embodied as a single- or multi-processor storage system executing a storage operating system 1306 that can implement a high-level module, e.g., a storage manager, to logically organize the information as a hierarchical structure of named directories, files and special types of files called virtual disks (hereinafter generally "blocks") at the storage devices. The computing device 1300 can further include graphical processing unit(s) for graphical processing tasks or processing non-graphical tasks in parallel.

The memory 1304 can comprise storage locations that are addressable by the processor(s) 1302 and adapters 1310 and 1314 for storing processor executable code and data structures. The processor 1302 and adapters 1310 and 1314 may, in turn, comprise processing elements and/or logic circuitry configured to execute the software code and manipulate the data structures. The operating system 1306, portions of which is typically resident in memory and executed by the processors(s) 1302, functionally organizes the computing device 1300 by (among other things) configuring the processor(s) 1302 to invoke. It will be apparent to those skilled in the art that other processing and memory implementations, including various computer readable storage media, may be used for storing and executing program instructions pertaining to the technology.

The memory 1304 can store instructions, e.g., for a body feature module configured to locate multiple part patches from the digital image based on the body feature databases; an artificial neural network module configured to feed the part patches into the deep learning networks to generate multiple sets of feature data; a classification module configured to concatenate the sets of feature data and feed them into the classification engine to determine whether the digital image has the image attribute; and a whole body module configured to process the whole body portion.

The network adapter 1310 can include multiple ports to couple the computing device 1300 to one or more clients over point-to-point links, wide area networks, virtual private networks implemented over a public network (e.g., the Internet) or a shared local area network. The network adapter 1310 thus can include the mechanical, electrical and signaling circuitry needed to connect the computing device 1300 to the network. Illustratively, the network can be embodied as an Ethernet network or a WiFi network. A client can communicate with the computing device over the network by exchanging discrete frames or packets of data according to predefined protocols, e.g., TCP/IP.

The storage adapter 1314 can cooperate with the storage operating system 1306 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information.

VII. AR Vectors

Figure 33:
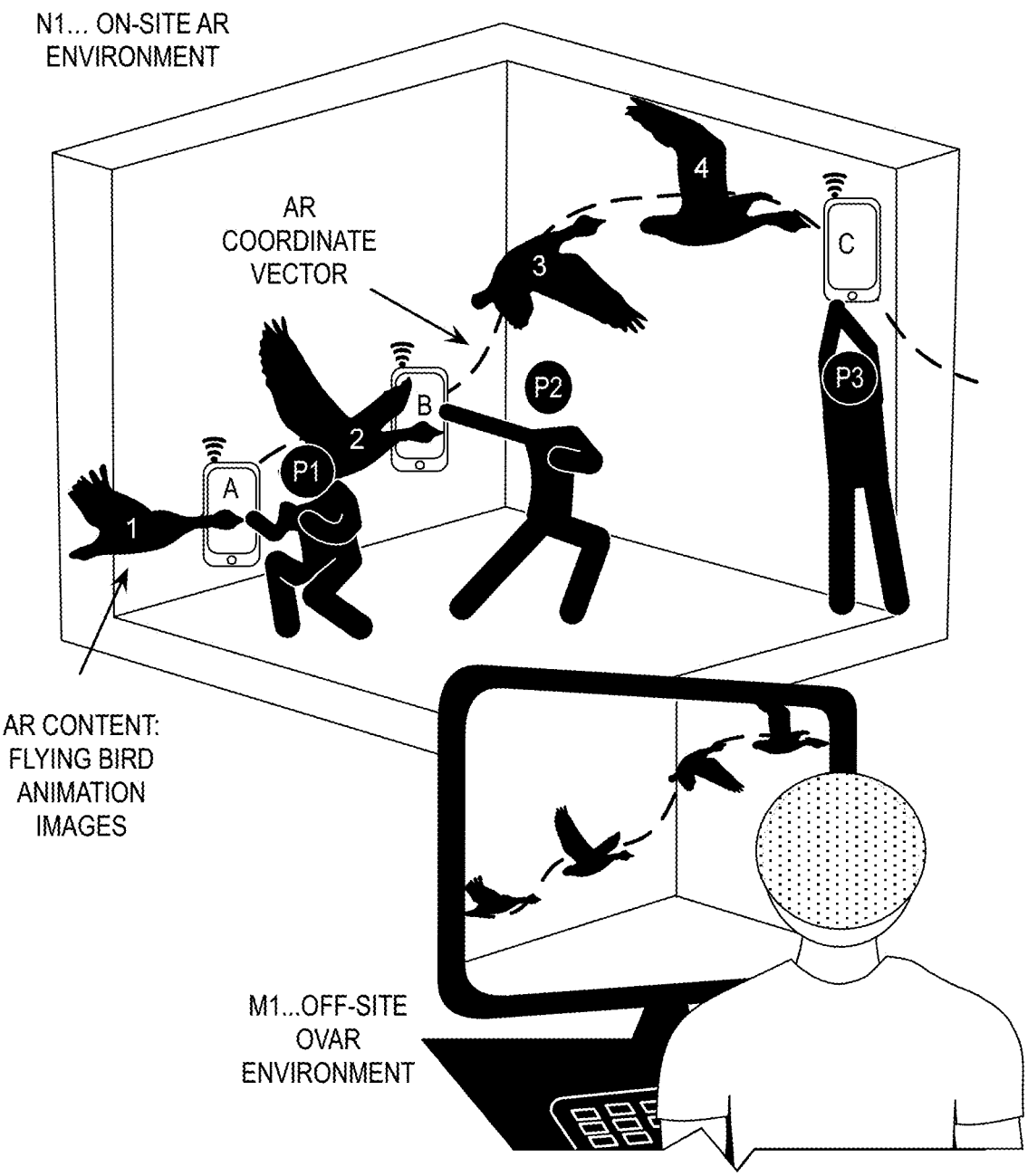

FIG. 33 is an illustrative diagram showing an AR Vector being viewed both onsite and offsite simultaneously. FIG. 33 depicts a user moving from position 1 (P1) to position 2 (P2)

to position 3 (P3), while holding a MDD enabled with sensors, such as compasses, accelerometers, and gyroscopes, that have motion detection capabilities. This movement is recorded as a 3D AR Vector. This AR Vector is initially placed at the location where it was created. In FIG. 33, the AR bird in flight follows the path of the Vector created by the MDD.

Both offsite and onsite users can see the event or animation live or replayed at a later time. Users then can collaboratively edit the AR Vector together all at once or separately over time.

An AR Vector can be represented to both onsite and offsite users in a variety of ways, for example, as a dotted line, or as multiple snapshots of an animation. This representation can provide additional information through the use of color shading and other data visualization techniques.

An AR Vector can also be created by an offsite user. Onsite and offsite users will still be able to see the path or AR manifestation of the AR Vector, as well as collaboratively alter and edit that Vector.

FIG. 15 is another illustrative diagram showing in N1 an AR Vector's creation, and in N2 the AR Vector and its data being displayed to an offsite user. FIG. 15 depicts a user moving from position 1 (P1) to position 2 (P2) to position 3 (P3), while holding a MDD enabled with sensors, such as compasses, accelerometers, and gyroscopes, that have motion detection capabilities. The user treats the MDD as a stylus, tracing the edge of existing terrain or objects. This action is recorded as a 3D AR Vector placed at the specific location in space where it was created. In the example shown in FIG. 15, the AR Vector describes the path of the building's contour, wall, or surface. This path may have a value (which can take the form of an AR Vector) describing the distance offsetting the AR Vector recorded from the AR Vector created. The created AR Vector can be used to define an edge, surface, or other contour of an AR object. This could have many applications, for example, the creation of architectural previews and visualizations.

Both offsite and onsite users can view the defined edge or surface live or at a later point in time. Users then can collaboratively edit the defining AR Vector together all at once or separately over time. Offsite users can also define the edges or surfaces of AR objects using AR Vectors they have created. Onsite and offsite users will still be able to see the AR visualizations of these AR Vectors or the AR objects defined by them, as well as collaboratively alter and edit those AR Vectors.

In order to create an AR Vector, the onsite user generates positional data by moving an onsite device. This positional data includes information about the relative time each point was captured at, which allows for the calculation of velocity, acceleration, and jerk data. All of this data is useful for a wide variety of AR applications including but not limited to: AR animation, AR ballistics visualization, AR motion path generation, and tracking objects for AR replay. The act of AR Vector creation may employ IMU by using common techniques such as accelerometer integration. More advanced techniques can employ AR Trackables to provide higher quality position and orientation data. Data from Trackables may not be available during the entire AR Vector creation process; if AR Trackable data is unavailable, IMU techniques can provide positional data.

Beyond simply the IMU, almost any input, (for example, RF trackers, pointers, laser scanners, etc.) can be used to create onsite AR Vectors. The AR Vectors can be accessed by multiple digital and mobile devices, both onsite and offsite, including ovAR. Users then can collaboratively edit the AR Vectors together all at once or separately over time.

Both onsite and offsite digital devices can create and edit AR Vectors. These AR Vectors are uploaded and stored externally in order to be available to onsite and offsite users. These changes can be viewed by users live or at a later time.

The relative time values of the positional data can be manipulated in a variety of ways in order to achieve effects, such as alternate speeds and scaling. Many sources of input can be used to manipulate this data, including but not limited to: midi boards, styli, electric guitar output, motion capture, and pedestrian dead reckoning enabled devices. The AR Vector's positional data can also be manipulated in a variety of ways in order to achieve effects. For example, the AR Vector can be created 20 feet long, then scaled by a factor of 10 to appear 200 feet long.

Multiple AR Vectors can be combined in novel ways. For instance, if AR Vector A defines a brush stroke in 3d space, AR Vector B can be used to define the coloration of the brush stroke, and AR Vector C can then define the opacity of the brush stroke along AR Vector A.

AR Vectors can be distinct elements of content as well; they are not necessarily tied to a single location or piece of AR content. They may be copied, edited, and/or moved to different coordinates.

The AR Vectors can be used for different kinds of AR applications such as: surveying, animation, light painting, architecture, ballistics, sports, game events, etc. There are military uses of AR Vectors; such as coordination of human teams with multiple objects moving over terrain, etc.

VIII. Other Embodiments

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

Figure 35:
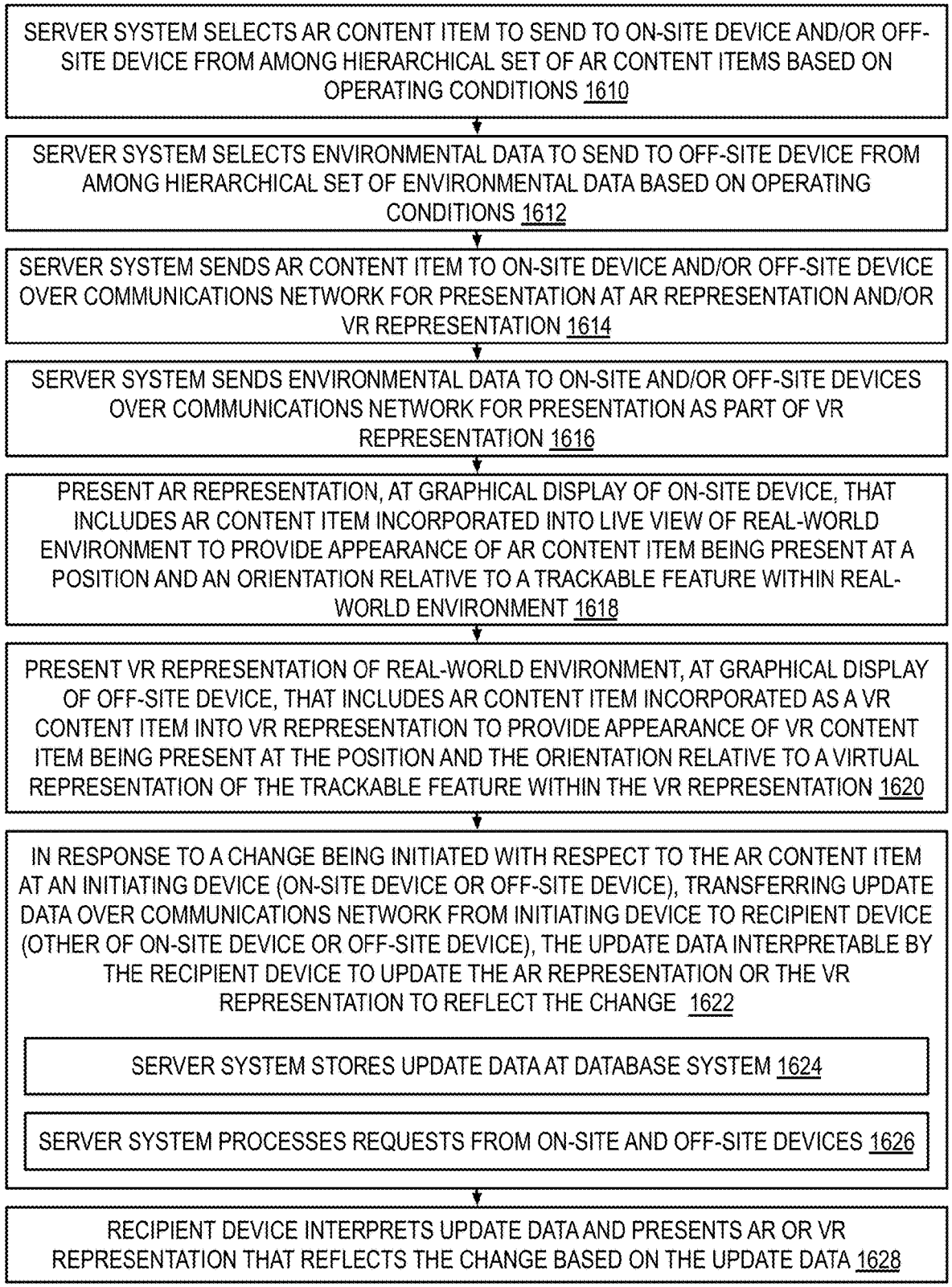
FIG. 35 is a flow diagram depicting an example method performed by a computing system that includes an onsite computing device, a server system, and an offsite computing device.
Figure 36:
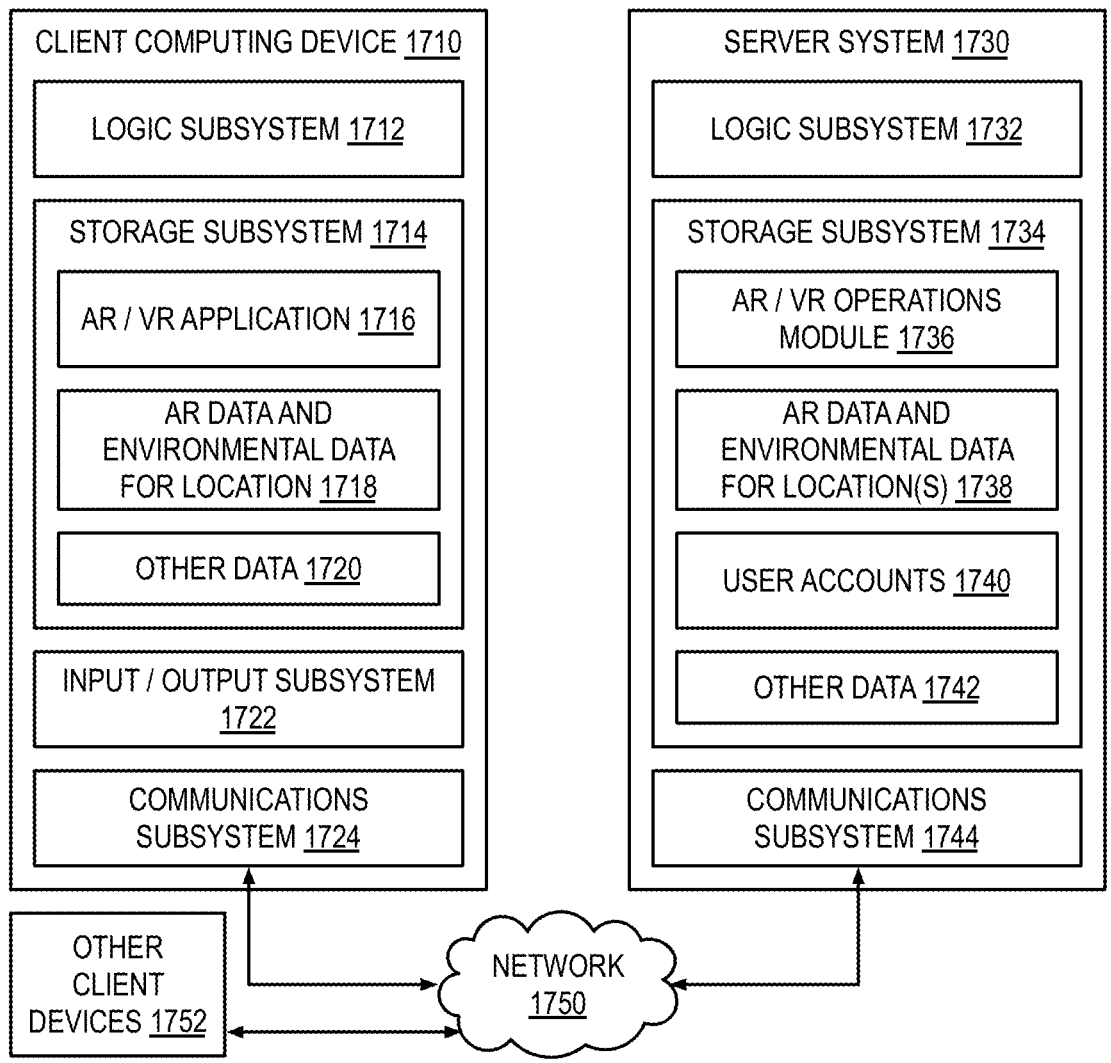
FIG. 36 is a schematic diagram depicting an example computing system.

In view of the preceding subject matter, FIGS. 35 and 36 depict additional non-limiting examples of features of a method and system for implementing a shared AR experience. The example methods may be performed or otherwise implemented by a computing system of one or more computing devices, such as depicted in FIG. 36, for example. In FIGS. 35 and 36, computing devices include onsite computing devices, offsite computing devices, and a server system that includes one or more server devices. Onsite and offsite computing devices may be referred to as client device with respect to a server system.

Referring to FIG. 35, the method at 1618 includes presenting an AR representation, at a graphical display of an onsite device, that includes an AR content item incorporated into a live view of a real-world environment to provide an appearance of the AR content item being present at a position and an orientation relative to a trackable feature within the real-world environment. In at least some examples, the AR content item may be a three-dimensional AR content item in which the position and the orientation relative to the trackable feature is a six-degree-of-freedom vector within a three-dimensional coordinate system.

The method at 1620 includes presenting a virtual reality (VR) representation of the real-world environment, at a graphical display of an offsite device, that includes the AR content item incorporated as a VR content item into the VR representation to provide an appearance of the VR content item being present at the position and the orientation relative to a virtual representation (e.g., a virtual AR representation) of the trackable feature within the VR representation. In some examples, perspective of the VR representation at the offsite device is independently controllable by a user of the offsite device relative to a perspective of the AR representation. In an example, the AR content item may be an avatar that represents a virtual vantage point or focus of a virtual third-person vantage point within the VR representation presented at the offsite device.

The method at 1622 includes, in response to a change being initiated with respect to the AR content item at an initiating device of the onsite device or the offsite device, transferring update data over a communications network from the initiating device that initiated the change to a recipient device of other of the onsite device or the offsite device. The initiating device sends the update data to a target destination, which may be a server system or the recipient device. The initiating device updates the AR representation or the VR representation based on the update data to reflect the change.

The update data defines the change to be implemented at the recipient device. The update data is interpretable by the recipient device to update the AR representation or the VR representation to reflect the change. In an example, transferring the update data over the communications network may include receiving the update data over the communications network at a server system from the initiating device that initiated the change, and sending the update data over the communications network from the server system to the recipient device. Sending the update data from the server system to the recipient device may be performed in response to receiving a request from the recipient device.

The method at 1624 includes, the server system storing the update data at a database system. The server system may retrieve the update data from the database system before sending the update data to the recipient device—e.g., responsive to a request or a push event. For example, at 1626, the server system processes requests from onsite and offsite devices. In an example, the change being initiated with respect to the AR content item includes one or more of: a change to a position of the AR content item relative to the trackable feature, a change to an orientation of the AR content item relative to the trackable feature, a change to an appearance of the AR content item, a change to metadata associated with the AR content item, removal of the AR content item from the AR representation or the VR representation, a change to the behavior of the AR content item, a change to the state of the AR content item, and/or a change to the state of a subcomponent of the AR content item.

In some examples, the recipient device may be one of a plurality of recipient devices that includes one or more additional onsite devices and/or one or more additional offsite devices. In this example, the method may further include transferring the update data over the communications network from the initiating device that initiated the change to each of the plurality of recipient devices (e.g., via the server system). At 1628, the recipient device(s) interpret the update data and present AR (in the case of onsite devices) or VR (in the case of offsite device) representations that reflect the change with respect to the AR content item based on the update data.

The initiating device and the plurality of recipient devices may be operated by respective users that are members of a shared AR experience group. The respective users may log into respective user accounts at a server system via their respective devices to associate with or dissociate from the group.

The method at 1616 includes sending environmental data from the server system to the onsite device and/or the offsite device over the communications network. The environmental data sent to the onsite device may include a coordinate system within which the AR content item is defined and bridging data that defines a spatial relationship between the coordinate system and the trackable feature within the real-world environment for presentation of the AR representation. The environmental data sent to the offsite device may include textural data and/or geometry data representations of the real-world environment for presentation as part of the VR representation. The method at 1612 further includes selecting, at the server system, the environmental data sent to the offsite device from among a hierarchical set of environmental data based on operating conditions including one or more of: a connection speed of the communications network between the server system and the onsite device and/or the offsite device, a rendering capability of the onsite device and/or the offsite device, a device type of the onsite device and/or the offsite device, and/or a preference expressed by the AR application of the onsite device and/or the offsite device. The method may further include capturing textural images of the real-world environment at the onsite device, transferring the textural images over the communications network from the onsite device to the offsite device as textural image data, and presenting the textural images defined by the textural image data at the graphical display of the offsite device as part of the VR representation of the real-world environment.

The method at 1610 includes selecting, at the server system, the AR content item sent to the onsite device and/or the offsite device from among a hierarchical set of AR content items based on operating conditions. The hierarchical set of AR content items may include scripts, geometry, bitmap images, video, particle generators, AR motion vectors, sounds, haptic assets, and meta-data at various qualities. The operating conditions may include one or more of a connection speed of the communications network between the server system and the onsite device and/or the offsite device, a rendering capability of the onsite device and/or the offsite device, a device type of the onsite device and/or the offsite device, and/or a preference expressed by the AR application of the onsite device and/or the offsite device. The method at 1614 includes sending the AR content item from the server system to the onsite device and/or to the offsite device over the communications network for presentation as part of the AR representation and/or the VR representation.

FIG. 36 depicts an example computing system 1700. Computing system 1700 is a non-limiting example of a computing system that may implement the methods, processes, and techniques described herein. Computing system 1700 includes a client device 1710. Client device 1710 is a non-limiting example of an onsite computing device and an offsite computing device. Computing system 1700 further includes a server system 1730. Server system 1730 includes one or more server devices that may be co-located or distributed. Server system 1730 is a non-limiting example of the various servers described herein. Computing system 1700 may include other client devices 1752, which may include onsite and/or offsite device with which client device 1710 may interact.

Client device 1710 includes a logic subsystem 1712, a storage subsystem 1714, an input/output subsystem 1722, and a communications subsystem 1724, among other components. Logic subsystem 1712 may include one or more processor devices and/or logic machines that execute instructions to perform task or operations, such as the methods, processes, and techniques described herein. When logic subsystem 1712 executes instructions, such as a program or other instruction set, the logic subsystem is configured to perform the methods, processes, and techniques defined by the instructions. Storage subsystem 1714 may include one or more data storage devices, including semiconductor memory devices, optical memory devices, and/or magnetic memory devices. Storage subsystem 1714 may hold data in non-transitory form where it may be retrieved from or written to by logic subsystem 1712. Examples of data held by storage subsystem include executable instructions, such as an AR or VR application 1716, AR data and environmental data 1718 within the vicinity of a particular location, and other suitable data 1720. AR or VR application 1716 is a non-limiting example of instructions that are executable by logic subsystem 1712 to implement the client-side methods, processes, and techniques described herein.

Input/output subsystem 1722 includes one or more input devices such as a touch-screen, keyboard, button, mouse, microphone, camera, other on-board sensors, etc. Input/output subsystem 1722 includes one or more output devices, such as a touch-screen or other graphical display device, audio speakers, haptic feedback device, etc. Communications subsystem 1724 includes one or more communications interfaces, including wired and wireless communications interfaces for sending and/or receiving communications to or from other devices over a network 1750. Communications subsystem 1724 may further include a GPS receiver or other communications interfaces for receiving geo-location signals.

Server system 1730 also includes a logic subsystem 1732, storage subsystem 1734, and a communications subsystem 1744. Data stored on storage subsystem 1734 of the server system includes an AR/VR operations module that implements or otherwise performs the server-side methods, processes, and techniques described herein. Module 1736 may take the form of instructions, such as software and/or firmware that are executable by logic subsystem 1732. Module 1736 may include one or more sub-modules or engines for implementing specific aspects of the disclosed subject matter. Module 1736 and a client-side application (e.g., application 1716 of client device 1710) may communicate with each other using any suitable communications protocol, including application program interface (API) messaging. Module 1736 may be referred to as a service hosted by the server system from the perspective of client devices. Storage subsystem may further include data such as AR data and environmental data for many locations 1738. Data 1738 may include one or more persistent virtual and/or augmented reality models that persist over multiple sessions. Previously described data 1718 at client computing device 1710 may be a subset of data 1738. Storage subsystem 1734 may also have data in the form of user accounts 1740 for user login, enabling user state to persist over multiple sessions. Storage subsystem 1734 may store other suitable data 1742.

As a non-limiting example, server system 1730 hosts, at module 1736, an augmented reality (AR) service configured to: send environmental and AR data to an onsite device over a communications network that enables the onsite device to present an augmented reality AR representation, at a graphical display of the onsite device, that includes an AR content item incorporated into a live view of a real-world environment to provide an appearance of the AR content item being present at a position and an orientation relative to a trackable feature within the real-world environment; send environmental and AR data to an offsite device over the communications network that enables the offsite device to present a virtual reality (VR) representation of the real-world environment, at a graphical display of the offsite device, that includes the AR content item incorporated as a VR content item into the VR representation to provide an appearance of the VR content item being present at the position and the orientation relative to a virtual representation of the trackable feature within the VR representation; receive update data over the communications network from an initiating device of the onsite device or the offsite device that initiated a change with respect to the AR content item, the update data defining the change with respect to the AR content item; and send the update data over the communications network from the server system to a recipient device of the other of the onsite device or the offsite device that did not initiate the change, the update data interpretable by the recipient device to update the AR representation or the VR representation to reflect the change.

IX. Additional Examples and Illustrative Combinations

This section describes additional aspects and features of AR sharing systems, and related methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

In an example implementation of the disclosed subject matter, a computer-implemented method for providing a shared augmented reality experience may include receiving, at an onsite device in proximity to a real-world location, a location coordinate of the onsite device. In this example or in any other example disclosed herein, the method may further include sending, from the onsite device to a server, a request for available AR content and for position and geometry data of objects of the real-world location based on the location coordinate. In this example or in any other example disclosed herein, the method may further include receiving, at the onsite device, AR content as well as environmental data including position and geometry data of objects of the real-world location. In this example or in any other example disclosed herein, the method may further include visualizing, at the onsite device, an augmented reality representation of the real-world location by presenting augmented reality content incorporated into a live view of the real-world location. In this example or in any other example disclosed herein, the method may further include forwarding, from the onsite device to an offsite device remote to the real-world location, the AR content as well as the position and geometry data of objects in the real-world location to enable the offsite device to visualize a virtual representation of the real-world by creating virtual copies of the objects of the real-world location. In this example or in any other example disclosed herein, the offsite device may incorporate the AR content in the virtual representation. In this example or in any other example disclosed herein, the method may further include synchronizing a change to the augmented reality representation on the onsite device with the virtual augmented reality representation on the offsite device. In this example or in any other example disclosed herein, the method may further include synchronizing a change to the virtual augmented reality representation on the offsite device with the augmented reality representation on the onsite device. In this example or in any other example disclosed herein, the change to the augmented reality representation on the onsite device may be sent to the offsite device asynchronously. In this example or in any other example disclosed herein, the change to the virtual AR representation on the offsite device may be sent to the onsite device asynchronously. In this example or in any other example disclosed herein, the synchronizing may comprise receiving, from an input component of the onsite device, a user instruction to create, alter, move or remove augmented reality content in the augmented reality representation; updating, at the onsite device, the augmented reality representation based on the user instruction; and forwarding, from the onsite device to the offsite device, the user instruction such that the offsite device can update its virtual representation of the augmented reality scene according to the user instruction. In this example or in any other example disclosed herein, the method may further include receiving, at the onsite device from the offsite device, a user instruction for the offsite device to create, alter, move or remove augmented reality content in its virtual augmented reality representation; and updating, at the onsite device, the augmented reality representation based on the user instruction such that the status of the augmented reality content is synchronized between the augmented reality representation and the virtual augmented reality representation. In this example or in any other example disclosed herein, the method may further include capturing environmental data including but not limited to live video of the real-world location, live geometry and existing texture information, by the onsite device. In this example or in any other example disclosed herein, the method may further include sending, from the onsite device to the offsite device, the textural image data of the objects of the real-world location. In this example or in any other example disclosed herein, the synchronizing may comprise synchronizing a change to the augmented reality representation on the onsite device with multiple virtual augmented reality representations on multiple offsite devices and multiple augmented reality representations on other onsite devices. In this example or in any other example disclosed herein, the augmented reality content may comprise a video, an image, a piece of artwork, an animation, text, a game, a program, a sound, a scan or a 3D object. In this example or in any other example disclosed herein, the augmented reality content may contain a hierarchy of objects including but not limited to shaders, particles, lights, voxels, avatars, scripts, programs, procedural objects, images, or visual effects, or wherein the augmented reality content is a subset of an object. In this example or in any other example disclosed herein, the method may further include establishing, by the onsite device, a hot-editing augmented reality event by automatically or manually sending invitations or allowing public access to multiple onsite or offsite devices. In this example or in any other example disclosed herein, the onsite device may maintain its point of view of the augmented reality at the location of the onsite device at the scene. In this example or in any other example disclosed herein, the virtual augmented reality representation of the offsite device may follow the point of view of the onsite device. In this example or in any other example disclosed herein, the offsite device may maintain its point of view of the virtual augmented reality representation as a first person view from the avatar of the user of the offsite device in the virtual augmented reality representation, or as a third person view of the avatar of the user of the offsite device in the virtual augmented reality representation. In this example or in any other example disclosed herein, the method may further include capturing, at the onsite or offsite device, a facial expression or a body gesture of a user of said device; updating, at said device, a facial expression or a body positioning of the avatar of the user of the device in the augmented reality representation; and sending, from the device to all other devices, information of the facial expression or the body gesture of the user to enable the other devices to update the facial expression or the body positioning of the avatar of the user of said device in the virtual augmented reality representation. In this example or in any other example disclosed herein, the communications between the onsite device and the offsite device may be transferred through a central server, a cloud server, a mesh network of device nodes, or a peer-to-peer network of device nodes. In this example or in any other example disclosed herein, the method may further include forwarding, by the onsite device to another onsite device, the AR content as well as the environmental data including the position and the geometry data of the objects of the real-world location, to enable the other onsite device to visualize the AR content in another location similar to the real-world location proximate to the onsite device; and synchronizing a change to the augmented reality representation on the onsite device with another augmented reality representation on the other onsite device. In this example or in any other example disclosed herein, the change to the augmented reality representation on the onsite device may be stored on an external device and persists from session to session. In this example or in any other example disclosed herein, the change to the augmented reality representation on the onsite device may persist for a predetermined amount of time before being erased from the external device. In this example or in any other example disclosed herein, the communications between the onsite device and the other onsite device are transferred though an ad hoc network. In this example or in any other example disclosed herein, the change to the augmented reality representation may not persist from session to session, or from event to event. In this example or in any other example disclosed herein, the method may further include extracting data needed to track real-world object(s) or feature(s), including but not limited to geometry data, point cloud data, and textural image data, from public or private sources of real world textural, depth, or geometry information, e.g. GOOGLE STREET VIEW™, GOOGLE EARTH™, and NOKIA HERE™; using techniques such as photogrammetry and SLAM.

In an example implementation of the disclosed subject matter, a system for providing a shared augmented reality experience may include one or more onsite devices for generating augmented reality representations of a real-world location. In this example or any other example disclosed herein, the system may further include one or more offsite devices for generating virtual augmented reality representations of the real-world location. In this example or any other example disclosed herein, the augmented reality representations may include content visualized and incorporated with live views of the real-world location. In this example or any other example disclosed herein, the virtual augmented reality representations may include the content visualized and incorporated with live views in a virtual augmented reality world representing the real-world location. In this example or any other example disclosed herein, the onsite devices may synchronize the data of the augmented reality representations with the offsite devices such that the augmented reality representations and the virtual augmented reality representations are consistent with each other. In this example or any other example disclosed herein, the offsite devices may synchronize the data of the virtual AR representations with the onsite devices, such that the virtual AR representations and the augmented reality representations are consistent with each other. In this example or any other example disclosed herein, there may be zero offsite devices, and the onsite devices communicate through either a peer-to-peer network, a mesh network, or an ad hoc network. In this example or any other example disclosed herein, an onsite device may be configured to identify a user instruction to change data or content of the onsite device's internal representation of AR. In this example or any other example disclosed herein, the onsite device may be further configured to send the user instruction to other onsite devices and offsite devices of the system so that the augmented reality representations and the virtual augmented reality representations within the system reflect the change to the data or content consistently in real time. In this example or any other example disclosed herein, an offsite device may be configured to identify a user instruction to change the data or content in the virtual augmented reality representation of the offsite device. In this example or any other example disclosed herein, the offsite device may be further configured to send the user instruction to other onsite devices and offsite devices of the system so that the augmented reality representations and the virtual augmented reality representations within the system reflect the change to the data or content consistently in real time. In this example or any other example disclosed herein, the system may further include a server for relaying and/or storing communications between the onsite devices and the offsite devices, as well as the communications between onsite devices, and the communications between offsite devices. In this example or any other example disclosed herein, the users of the onsite and offsite devices may participate in a shared augmented reality event. In this example or any other example disclosed herein, the users of the onsite and offsite devices may be represented by avatars of the users visualized in the augmented reality representations and virtual augmented reality representations; and wherein augmented reality representations and virtual augmented reality representations visualize that the avatars participate in a shared augmented reality event in a virtual location or scene as well as a corresponding real-world location.

In an example implementation of the disclosed subject matter, a computer device for sharing augmented reality experiences includes a network interface configured to receive environmental, position, and geometry data of a real-world location from an onsite device in proximity to the real-world location. In this example or any other example disclosed herein, the network interface may be further configured to receive augmented reality data or content from the onsite device. In this example or any other example disclosed herein, the computer device further may include an offsite virtual augmented reality engine configured to create a virtual representation of the real-world location based on the environmental data including position and geometry data received from the onsite device. In this example or any other example disclosed herein, the computer device may further include a render engine configured to reproduce the augmented reality content in the virtual representation of reality such that the virtual representation of reality is consistent with the augmented reality representation of the real-world location (AR scene) created by the onsite device. In this example or any other example disclosed herein, the computer device may be remote to the real-world location. In this example or any other example disclosed herein, the network interface may be further configured to receive a message indicating that the onsite device has altered the augmented reality overlay object in the augmented reality representation or scene. In this example or any other example disclosed herein, the data and content render engine may be further configured to alter the augmented reality content in the virtual augmented reality representation based on the message. In this example or any other example disclosed herein, the computer device may further include an input interface configured to receive a user instruction to alter the augmented reality content in the virtual augmented reality representation or scene. In this example or any other example disclosed herein, the overlay render engine may be further configured to alter the augmented reality content in the virtual augmented reality representation based on the user instruction. In this example or any other example disclosed herein, the network interface may be further configured to send an instruction from a first device to a second device to alter an augmented reality overlay object in an augmented reality representation of the second device. In this example or any other example disclosed herein, the instruction may be sent from the first device which is an onsite device to the second device which is an offsite device; or the instruction may be sent from the first device which is an offsite device to the second device which is an onsite device; or the instruction may be sent from the first device which is an onsite device to the second device which is an onsite device; or the instruction may be sent from the first device which is an offsite device to the second device which is an offsite device. In this example or any other example disclosed herein, the position and geometry data of the real-world location may include data collected using any or all of the following: fiducial marker technology, simultaneous localization and mapping (SLAM) technology, global positioning system (GPS) technology, dead reckoning technology, beacon triangulation, predictive geometry tracking, image recognition and or stabilization technologies, photogrammetry and mapping technologies, and any conceivable locating or specific positioning technology. These methods may be used on or by first or third party sources.

In an example implementation of the disclosed subject matter, a method for sharing augmented reality positional data and the relative time values of that positional data includes receiving, from at least one onsite device, positional data and the relative time values of that positional data, collected from the motion of the onsite device. In this example or any other example disclosed herein, the method may further include creating an augmented reality (AR) three-dimensional vector based on the positional data and the relative time values of that positional data. In this example or any other example disclosed herein, the method may further include placing the augmented reality vector at a location where the positional data was collected. In this example or any other example disclosed herein, the method may further include visualizing a representation of the augmented reality vector with a device. In this example or any other example disclosed herein, the representation of the augmented reality vector may include additional information through the use of color shading and other data visualization techniques. In this example or any other example disclosed herein, the AR vector may define the edge or surface of a piece of AR content, or otherwise may act as a parameter for that piece of AR content. In this example or any other example disclosed herein, the included information about the relative time that each point of positional data was captured at, on the onsite device allows for the calculation of velocity, acceleration and jerk data. In this example or any other example disclosed herein, the method may further include creating from the positional data and the relative time values of that positional data, objects and values including but not limited to an AR animation, an AR ballistics visualization, or a path of movement for an AR object. In this example or any other example disclosed herein, the device's motion data that may be collected to create the AR vector is generated from sources including, but not limited to, the internal motion units of the onsite device. In this example or any other example disclosed herein, the AR vector may be created from input data not related to the device's motion, generated from sources including but not limited to RF trackers, pointers, or laser scanners. In this example or any other example disclosed herein, the AR vector may be accessible by multiple digital and mobile devices, wherein the digital and mobile device can be onsite or offsite. In this example or any other example disclosed herein, the AR vector is viewed in real time or asynchronously. In this example or any other example disclosed herein, one or more onsite digital devices or one or more offsite digital devices can create and edit the AR vector. In this example or any other example disclosed herein, creations and edits to the AR vector can be seen by multiple onsite and offsite users live, or at a later time. In this example or any other example disclosed herein, creation and editing, as well as viewing creation and editing, can either be done by multiple users simultaneously, or over a period of time. In this example or any other example disclosed herein, the data of the AR vector may be manipulated in a variety of ways in order to achieve a variety of effects, including, but not limited to: changing the speed, color, shape, and scaling. In this example or any other example disclosed herein, various types of input can be used to create or change the AR Vector's positional data vector, including, but not limited to: midi boards, styli, electric guitar output, motion capture, and pedestrian dead reckoning enabled devices. In this example or any other example disclosed herein, the AR Vector positional data can be altered so that the relationship between the altered and unaltered data is linear. In this example or any other example disclosed herein, the AR vector positional data can be altered so that the relationship between the altered and unaltered data is nonlinear. In this example or any other example disclosed herein, the method may further include a piece of AR content, which uses multiple augmented reality vectors as parameters. In this example or any other example disclosed herein, the AR vector can be a distinct element of content, independent of a specific location or piece of AR content. They can be copied, edited and/or moved to different positional coordinates. In this example or any other example disclosed herein, the method may further include using the AR vector to create content for different kinds of AR applications, including but not limited to: surveying, animation, light painting, architecture, ballistics, training, gaming, and national defense.

A0. A computer-implemented method for providing a shared augmented reality (AR) experience, the method comprising:

communicating, from a server to an onsite device in proximity to a real-world location, a data bundle comprising a first data set consisting of an available AR content item, a second data set consisting of initial trackable data, and a third data set consisting of initial position and geometry data relating to one or more physical features of the real-world location, based on a location coordinate of the onsite device, wherein the initial trackable data comprises information relating to one or more trackable features that are disposed at the real-world location and findable by the onsite device;

capturing imaging information of the real-world location using an imaging sensor of the onsite device;

visualizing, using the onsite device, an onsite AR representation of the real-world location by presenting the available AR content item incorporated into a live view of the real-world location;

updating at least one data set of the data bundle to generate an updated data bundle, using the onsite device;

communicating the updated data bundle from the onsite device to a remote offsite device via the server; and visualizing, at the offsite device and using the updated data bundle, a virtual reality (VR) representation of the real-world location by creating virtual copies of the one or more physical features of the real-world location and incorporating the AR content item into the VR representation to generate an offsite virtual AR representation.

A1. The method of A0, wherein updating the at least one data set comprises updating the trackable data using the captured imaging information from the onsite device.

A2. The method of A0, wherein updating the at least one data set comprises updating the position and geometry data using the captured imaging information from the onsite device.

A3. The method of A0, wherein updating the at least one data set comprises changing at least one aspect of the AR content item using the onsite device.

A4. The method of A0, wherein the trackable data comprises a point cloud having associated feature descriptors.

A5. The method of A4, further comprising: determining the initial trackable data using third-party sources.

A6. The method of A5, wherein determining the initial trackable data using third-party sources comprises cross-referencing two or more data sources relating to the real-world location.

A7. The method of A5, wherein the third-party sources include additional position and geometry data created from images of the real-world location using photogrammetry image processing technology.

A8. The method of A0, wherein the one or more trackable features comprise a fiducial marker.

A9. The method of A0, wherein the server comprises a server cluster.

A10. The method of A0, wherein the imaging sensor comprises a camera.

A11. The method of A0, wherein the imaging sensor comprises a structured light sensor.

A12. The method of A0, further comprising:

editing, using the offsite device, at least one aspect of the AR content item to create an edited AR content item;

communicating data comprising the edited AR content item from the offsite device to the onsite device via the server; and updating the onsite AR representation at the onsite device using the data comprising the edited AR content item.

A13. The method of A0, wherein updates to the data bundle are communicated between the onsite device and the offsite device in real-time.

A13A. The method of A0, wherein updates to the data bundle are communicated between the onsite device and the offsite device asynchronously.

A14. The method of A3, wherein changing the AR content item comprises:

receiving, from an input component of the onsite device, an onsite user instruction to edit the AR content item in the onsite AR representation; and updating, at the onsite device, the AR representation based on the onsite user instruction.

A15. The method of A14, wherein the onsite user instruction to edit the AR content item comprises an instruction to create, alter, move, or remove the AR content item.

A16. The method of A0, further comprising:

receiving, at the onsite device from the offsite device, an offsite user instruction to create a second AR content item; and updating, at the onsite device, the onsite AR representation based on the offsite user instruction, such that the second AR content item is presented at a synchronized position and having a synchronized state in both the onsite AR representation and the offsite virtual AR representation.

A17. The method of A0, further comprising synchronizing a change to the onsite AR representation of the onsite device with a plurality of offsite virtual AR representations on respective offsite devices and with a plurality of other onsite AR representations on respective other onsite devices.

A18. The method of A0, wherein the AR content item comprises a 3D object.

A19. The method of A0, wherein the AR content item contains a hierarchy of AR objects.

A20. The method of A0, further comprising establishing, by the onsite device, an event in which one or more other devices are given permission to change the AR content item.

A21. The method of A20, wherein the one or more other devices comprise at least one other onsite device.

A22. The method of A20, wherein establishing the event includes sending one or more invitations to the other devices.

A23. The method of A0, wherein the offsite device maintains and follows a point of view (POV) of the onsite device when visualizing the offsite virtual AR representation.

A24. The method of A0, wherein the offsite device utilizes an offsite POV that is independent of the POV of the onsite device.

A25. The method of A24, wherein the POV of the offsite virtual AR representation comprises a first-person view from a virtual avatar of a user of the offsite device in the offsite virtual AR representation, wherein the virtual avatar is incorporated into the onsite AR representation.

A26. The method of A24, wherein the POV of the offsite virtual AR representation comprises a third-person view of a virtual avatar of a user of the offsite device in the offsite virtual AR representation, wherein the virtual avatar is incorporated into the onsite AR representation.

A27. The method of A0, wherein communication between the onsite device and the offsite device is conducted over a network.

A28. The method of A27, wherein the network comprises a server.

A29. The method of A27, wherein the network is ad hoc.

A30. The method of A0, wherein the onsite device is a first onsite device of a plurality of onsite devices, the method further comprising:

communicating, from the first onsite device to a second one of the plurality of onsite devices, the AR content item and the updated position and the geometry data relating to the physical objects of the real-world location;

visualizing, using the second onsite device, the AR content item in the real-world location from a point of view proximate the first onsite device to create a second onsite AR representation; and synchronizing changes to the AR content item between the first onsite device and the second onsite device.

A31. The method of A0, further comprising storing information corresponding to the at least one changed aspect of the AR content item on a storage device, such that changes to the AR content item persists between sessions.

A32. The method of A31, wherein the stored information persists for a selected amount of time before being erased from the external storage device.

B0. A system for providing a shared augmented reality (AR) experience, the system comprising:

one or more onsite devices each having an imaging sensor and configured to generate an AR representation of a real-world location by presenting AR content incorporated into a respective live view of the real-world location;

one or more offsite devices remote to the real-world location, each of the one or more offsite devices configured to generate a respective virtual AR representation of the real-world location by presenting the AR content incorporated into a respective virtual reality (VR) view of the real-world location; and one or more processors in communication with stored instructions configured to synchronize each of the one or more onsite devices with each of the one or more offsite devices, such that the AR representations and the virtual AR representations are substantially consistent with each other, the stored instructions being executable by the one or more processors to:

obtain updated environmental data, including updated trackable data, updated position data, and updated geometry data, by capturing imagery of the real-world location using the imaging sensor of the onsite device, produce changed AR content in response to user input, make the changed AR content and the updated environmental data available to the one or more onsite devices and to the one or more offsite devices, and use the one or more offsite devices to produce the virtual AR representation of the real-world location by presenting the changed AR content incorporated into the respective VR view of the real-world location, characteristics of the VR view being based on the updated environmental data.

C0. A computer-implemented method for providing a shared augmented reality (AR) experience, the method comprising:

receiving, at an onsite device in proximity to a real-world location, a location coordinate of the onsite device;

sending, from the onsite device to a server, a request for AR content and first information based on the location coordinate of the onsite device, the first information including data defining a spatial relationship between the AR content and a trackable in the real-world location, and initial position and geometry data of one or more physical features in the real-world location;

receiving the first information at the onsite device;

capturing imaging data of the real-world location using an imaging sensor of the onsite device;

visualizing, at the onsite device, an AR representation of the real-world location by presenting the AR content incorporated into a live view of the real-world location using the first information;

updating the first information, using the captured imaging data, to create second information including an updated spatial relationship between the AR content and the trackable, and updated position and geometry data of the one or more physical features in the real-world location;

sending the AR content and the second information to an offsite device remote to the real-world location;

visualizing, using the offsite device, a virtual reality (VR) representation of the real-world location by creating virtual copies of the physical features of the real-world location using the second information, wherein the offsite device incorporates the AR content into the VR representation, creating a virtual AR representation of the real-world location; and synchronizing a change made to the AR representation by the onsite device with the virtual AR representation of the offsite device.

D0. A computer-implemented method for providing a shared augmented reality (AR) experience, the method comprising:

receiving at an onsite sensing device in proximity to a real-world location, from a server, initial trackable data relating to a trackable present at the real-world location, and initial position and geometry data relating to one or more physical features of the real-world location, based on a location coordinate of the onsite sensing device;

capturing on-location data of the real-world location using a sensor of the onsite sensing device;

generating updated trackable data and updated position and geometry data using the on-location data captured by the onsite sensing device;

sending, from the onsite sensing device to the server, the updated trackable data and the updated position and geometry data;

sending, from the server to an offsite computing device remote to the real-world location, the updated trackable data and the updated position and geometry data, based on a request for information relating to the real-world location;

visualizing, at the offsite computing device remote to the real-world location, a virtual reality (VR) representation of the real-world location, including creating virtual copies of the one or more physical features of the real-world location based on the updated position and geometry data;

creating AR content at the offsite computing device and incorporating the AR content into the VR representation to produce an offsite virtual AR representation;

calculating a spatial relationship including a relative position, an orientation, and a scale of the AR content relative to the updated trackable data;

communicating the AR content created at the offsite computing device and the calculated spatial relationship from the offsite computing device to an onsite AR device; and visualizing, at the onsite AR device, an onsite AR representation of the real-world location, including presenting the AR content overlaid on a live view of the real-world location, wherein the AR content is positioned relative to the updated trackable data using the calculated spatial relationship D1. The method of D0, further comprising:

synchronizing the status of the AR content between the onsite AR representation and the offsite virtual AR representation.

D2. The method of D1, wherein the offsite device is a first offsite device of a plurality of offsite devices, the method further comprising:

synchronizing a change in the AR content between the first offsite device and a second one of the plurality of offsite devices.

D3. The method of D0, wherein the onsite device is a first onsite device of a plurality of onsite devices disposed at the real-world location, the method further comprising:

communicating the AR content and the calculated spatial relationship from the offsite device to a second one of the plurality of onsite devices; and updating a second onsite AR representation of the second onsite device to include the AR content.

D4. The method of D3, further comprising causing the first onsite device to cease communication with the offsite device and all other onsite devices, wherein the AR content persists in the second onsite AR representation.

D5. The method of D3, wherein the first and second onsite devices are disposed in the real-world location at different, mutually exclusive times.

D6. The method of D0, wherein the initial trackable data comprises a point cloud with associated feature descriptors, the method further comprising:

determining the initial tracking data by cross-referencing satellite mapping image data, street view image data, and depth information from third-party sources; and generating the VR representation of the one or more physical objects by overlaying the street view image data onto geometry generated from the depth information.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computer-implemented method for providing related augmented reality and virtual reality experiences, the method comprising:

presenting, at a display of an onsite device disposed at a real-world location, an augmented reality (AR) representation of the real-world location including an AR content item incorporated into a live view of the real-world location such that the AR content item appears to be present at the real-world location at a predetermined position and orientation relative to a trackable feature disposed at the real-world location;

capturing, using an imaging sensor of the onsite device, imagery of the real-world location;

receiving, at an offsite device remote from the real-world location, environmental data based on the captured imagery of the real-world location, and positioning data representing a spatial position of one or more real-world objects present at the real-world location; and presenting at a display of the offsite device, based on the received environmental data and positioning data, a virtual reality (VR) representation of the real-world location, wherein presenting the VR representation of the real-world location includes creating, at the offsite device, a simulation of the real-world location including a virtual representation of the AR content item disposed at the predetermined position and orientation relative to a virtual representation of the trackable feature.

2. The method of claim 1, wherein the positioning data includes respective sets of World Geodetic System coordinates of each of the one or more real-world objects present at the real-world location, and wherein creating the simulation of the real-world location at the offsite device includes creating virtual copies of the one or more real-world objects and positioning the virtual copies within the VR representation based on the World Geodetic System coordinates.

3. The method of claim 1, wherein the environmental data based on the captured imagery of the real-world location includes textural data and geometry data representing the real-world location, and wherein creating the simulation of the real-world location at the offsite device includes creating a background based on the textural data and geometry data.

4. The method of claim 1, wherein capturing the imagery of the real-world location using the imaging sensor of the onsite device includes scanning the real-world location using the imaging sensor and transmitting the environmental data based on the captured imagery to the offsite device in real time, and wherein presenting the VR representation at the offsite device includes dynamically updating the VR representation based on the environmental data.

5. The method of claim 4, wherein transmitting the environmental data to the offsite device includes transmitting the environmental data to the offsite device via a server.

6. The method of claim 1, further comprising updating the VR representation and the AR representation to incorporate a change in the AR content item.

7. The method of claim 6, wherein the change in the AR content item comprises a change to an appearance of the AR content item.

8. The method of claim 1, wherein the VR representation is viewable at the offsite device from a point of view (POV) independent of a POV of the onsite device.

9. The method of claim 8, wherein the VR representation includes a virtual avatar of a user of the offsite device, the POV of the VR representation comprises a first-person view from the virtual avatar, and the virtual avatar is incorporated into the AR representation.

10. The method of claim 1, further comprising:
at a server system, selecting the AR content item from among a hierarchical set of AR content items based on one or more of:
 a connection speed of a communications network between the server system and the onsite device,
 a rendering capability of the onsite device,
 a device type of the onsite device, and
 a preference expressed in an AR application of the onsite device; and
at the onsite device, receiving the AR content item from the server system for presentation in the AR representation.

11. The method of claim 1, further comprising selecting, at the offsite device, a fidelity level for the VR representation, and wherein creating the simulation of the real-world location includes creating the simulation in accordance with the selected fidelity level.

12. The method of claim 1, wherein the imaging sensor of the onsite device comprises a structured light sensor.

13. A computer-implemented method for providing related augmented reality and virtual reality experiences, the method comprising:
generating a virtual reality (VR) representation of a real-world location at an offsite computing device remote from the real-world location;
generating an augmented reality (AR) view of the real-world location, at an onsite computing device disposed at the real-world location, by overlaying an AR object on a live view captured by the onsite computing device such that the AR object appears to be present at a predetermined position and orientation in the real-world location;
capturing environmental data identifying locations of one or more features of the real-world location using the onsite computing device;
receiving, at the offsite computing device, the captured environmental data and first data representing the AR object; and
updating the VR representation of the real-world location, based on the captured environmental data, and incorporating the AR object into the VR representation, based on the first data representing the AR object, such that the AR object appears to be present at the predetermined position and orientation within the VR representation.

14. The method of claim 13, wherein the predetermined position and orientation of the AR object are defined by a six-degree-of-freedom (DOF) vector relative to a trackable feature findable by the onsite computing device at the real-world location, the method further comprising:
receiving, at the onsite computing device, the six-DOF vector, trackable data enabling the onsite computing device to identify the trackable feature, and second data representing the AR object;
identifying the trackable feature; and
calculating a position of the onsite computing device relative to the trackable feature;
wherein overlaying the AR object on the live view includes rendering the AR object based on the six-DOF vector.

15. The method of claim 13, wherein incorporating the AR object into the VR representation includes rendering an occlusion between the AR object and a virtual representation of a feature of the real-world location within the VR representation.

16. A computer-implemented method for providing a shared augmented reality (AR) experience, the method comprising:
visualizing, at an offsite device remote from a real-world location, a virtual reality (VR) representation of the real-world location by creating virtual copies of one or more physical features of the real-world location;
communicating, from a server to an onsite device in proximity to the real-world location, a data bundle comprising:
 a first data set consisting of an available AR content item having a predetermined spatial relationship defined in the real world with respect to at least one trackable feature disposed at the real-world location and findable by the onsite device, such that the available AR content item has a predetermined real-world position and orientation defined by a real-world position of the at least one trackable feature and the predetermined spatial relationship, a second data set consisting of initial trackable data comprising information relating to the at least one trackable feature, and a third data set consisting of initial position and geometry data relating to the one or more physical features of the real-world location, based on a location coordinate of the onsite device;

capturing imaging information of the real-world location using an imaging sensor of the onsite device;

visualizing, using the onsite device, an onsite AR representation of the real-world location by presenting the available AR content item incorporated into a live view of the real-world location at the predetermined real-world position and orientation;

updating at least one data set of the data bundle to generate an updated data bundle, using the onsite device;

communicating the updated data bundle from the onsite device to the remote offsite device via the server; and updating the VR representation using the updated data bundle and incorporating the available AR content item into the VR representation to generate an offsite virtual AR representation, such that the offsite virtual AR representation represents the available AR content item as appearing at the predetermined real-world position and orientation.

17. The method of claim 16, wherein incorporating the available AR content item into the VR representation includes rendering an occlusion between the available AR content item and a virtual representation of a feature of the real-world location within the VR representation.

18. The method of claim 16, wherein updating the at least one data set comprises updating the position and geometry data using the captured imaging information from the onsite device.

19. The method of claim 16, wherein updating the at least one data set comprises changing at least one aspect of the AR content item using the onsite device.

20. The method of claim 16, further comprising storing information corresponding to the updated data bundle on a storage device, such that updates to the at least one data set of the data bundle persist between sessions.

* * * * *